US012701524B2

(12) United States Patent (10) Patent No.: US 12,701,524 B2
Liu et al. (45) Date of Patent: Aug. 4, 2026

(54) SYSTEM AND METHOD FOR UPLINK AND DOWNLINK IN MULTI-POINT COMMUNICATIONS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 18/295,565

(22) Filed: Apr. 4, 2023

(65) Prior Publication Data

US 2023/0239823 A1 Jul. 27, 2023

Related U.S. Application Data

(63) Continuation of application No. PCT/US2021/071998, filed on Oct. 22, 2021.

(60) Provisional application No. 63/138,236, filed on Jan. 15, 2021, provisional application No. 63/104,388, filed on Oct. 22, 2020.

(51) Int. Cl.
*H04W 56/00* (2009.01)
*H04L 5/00* (2006.01)

(52) U.S. Cl.
CPC ....... *H04W 56/0045* (2013.01); *H04L 5/0035* (2013.01); *H04L 5/0051* (2013.01)

(58) Field of Classification Search
CPC ....... H04B 7/022; H04B 7/024; H04L 5/0035; H04W 56/004; H04W 56/0045
See application file for complete search history.

(56) References Cited

U.S. PATENT DOCUMENTS

| | | | |
|---|---|---|---|
| 2015/0230268 A1 | 8/2015 | Chen et al. | |
| 2019/0053182 A1* | 2/2019 | Choi ..................... | H04W 72/21 |
| 2019/0349867 A1 | 11/2019 | MolavianJazi et al. | |

(Continued)

FOREIGN PATENT DOCUMENTS

| | | |
|---|---|---|
| CN | 105981325 A | 9/2016 |
| EP | 3609097 A1 | 2/2020 |

OTHER PUBLICATIONS

Samsung, "Enhancements on multi-TRP inter-cell oeration," 3GPP TSG RAN WG1 #102; R1-2006130, e-Meeting, Aug. 17-28, 2020, 3 pages.

(Continued)

*Primary Examiner* — Pao Sinkantarakorn
(74) *Attorney, Agent, or Firm* — Slater Matsil, LLP

(57) ABSTRACT

A user equipment (UE) may receive first configuration information of a carrier of a serving cell, including a first association of a first group of uplink (UL) signals or channels on the carrier in the serving cell with a first UL timing advance group (TAG) of the UE, and second configuration information of the carrier including a second association of a second group of UL signals or channels on the carrier with a second UL TAG of the UE. The UE may transmit a UL signal/channel in the first group of UL signals or channels according to a TA value of the first UL TAG, and transmit a UL signal/channel in the second group of UL signals or channels according to a TA value of the second UL TAG.

28 Claims, 14 Drawing Sheets

(56)     References Cited

U.S. PATENT DOCUMENTS

| | | | |
|---|---|---|---|
| 2021/0185670 A1* | 6/2021 | Taherzadeh Boroujeni ................ | |
| | | | H04W 72/0446 |
| 2021/0235397 A1* | 7/2021 | Zhang ............... | H04W 56/0045 |
| 2022/0248358 A1* | 8/2022 | Laddu ................. | H04W 56/001 |
| 2022/0304036 A1* | 9/2022 | Zhang ................... | H04L 5/0048 |
| 2023/0087223 A1* | 3/2023 | Jang ..................... | H04L 1/1896 |
| | | | 370/329 |
| 2023/0189180 A1* | 6/2023 | Yuan ................ | H04W 56/0045 |
| | | | 370/350 |
| 2023/0232481 A1* | 7/2023 | Park ..................... | H04L 5/0055 |
| | | | 370/329 |

OTHER PUBLICATIONS

Ericsson, "Update IE ServingCellConfigCommonSIB," 3GPP TSG-RAN5 Meeting #86-e, R5-200953, Feb. 17-28, 2020, 2 pages.

* cited by examiner

| Numerology | SCS (kHz) | Normal CP (µs) |
|---|---|---|
| 0 | 15 | 4.69 |
| 1 | 30 | 2.34 |
| 2 | 60 | 1.17 |
| 3 | 120 | 0.59 |
| 4 | 240 | 0.29 |
| 5 | 480 | 0.15 |

Non-serving Cell SSB Configuration

| Functionality | ID1 | ID2 | ID3 | ID4 | ID5 | ID6 | ID7 |
|---|---|---|---|---|---|---|---|
| | CSI-RS sequence generation | PDCCH DMRS sequence generation | PDCCH scrambling/randomizatio n | PDSCH DMRS sequence generation | PDSCH scrambling | PUSCH DMRS sequence generation | PUSCH scrambling |
| 1st Group of IDs | ID1,1 | ID2,1 | ID3,1 | ID4,1 | ID5,1 | ID6,1 | ID7,1 |
| 2nd Group of IDs | ID1,2 | ID2,2 | ID3,2 | ID4,2 | ID5,2 | ID6,2 | ID7,2 |
| 3rd Group of IDs | ID1,3 | ID2,3 | ID3,3 | ID4,3 | ID5,3 | ID6,3 | ID7,3 |

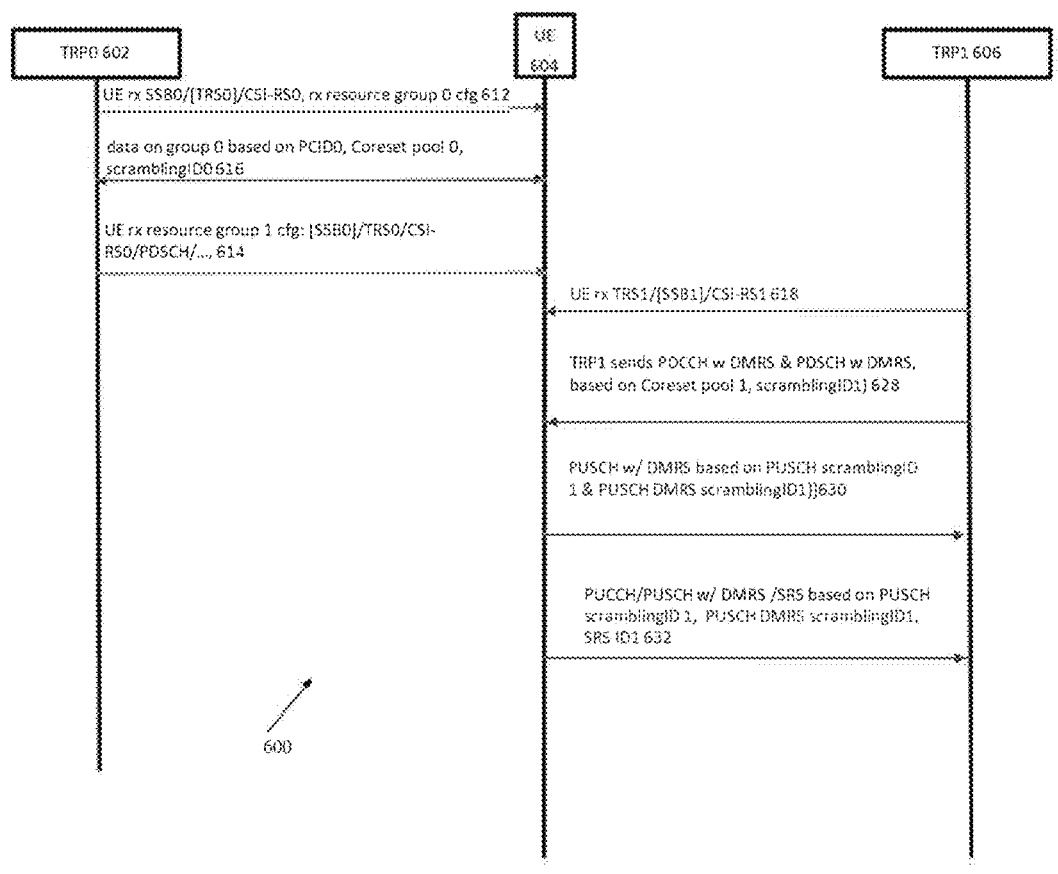

FIG. 6

| | TRP0 | TRP1 | TRPs tightly-synched | TRPs w/fast backhaul | S-DCI / M-DCI | # resource groups |
|---|---|---|---|---|---|---|
| Scenario 1 | Cell w/ SSB | TRP w/o SSB | Y | Y | S | 1 (or 2) |
| Scenario 2 | Cell w/ SSB | TRP w/o SSB | Y | Y | M | 1 (or 2) |
| Scenario 3 | Cell w/ SSB | TRP w/o SSB | Y | N | M | 2 (or 1) |
| Scenario 4 | Cell w/ SSB | TRP w/o SSB | N | N | M | 2 |
| Scenario 5 | Cell w/ SSB | Cell w/ SSB | Y | Y | S | 2 |
| Scenario 6 | Cell w/ SSB | Cell w/ SSB | Y | Y | M | 2 |
| Scenario 7 | Cell w/ SSB | Cell w/ SSB | Y | N | M | 2 |
| Scenario 8 | Cell w/ SSB | Cell w/ SSB | N | N | M | 2 |

700

Covers Dual Connectivity

FIG. 7

M-TRP with one SSB, TRS 930 may or may not rely on SSB 924 or TRS 922 for timing, M-DCI for intra-groups scheduling

1

SYSTEM AND METHOD FOR UPLINK AND DOWNLINK IN MULTI-POINT COMMUNICATIONS

CROSS-REFERENCE TO RELATED APPLICATIONS

This application is a continuation of International Patent Application No. PCT/US2021/071998, filed on Oct. 22, 2021, entitled "System and Method for Uplink and Downlink in Multi-Point Communications," which claims the benefit of U.S. Provisional Application No. 63/104,388, filed on Oct. 22, 2020, entitled "System and Method for Uplink and Downlink in Multi-Point Communications," and U.S. Provisional Application No. 63/138,236, filed on Jan. 15, 2021, entitled "System and Method for Uplink and Downlink in Multi-Point Communications," which applications are hereby incorporated herein by reference in their entireties.

TECHNICAL FIELD

The present disclosure relates generally to wireless communications, and, in particular embodiments, to a system and method for uplink and downlink in multi-point communications.

BACKGROUND

Current generation wireless communications systems provide high data rates for mobile communications devices to enable a rich multi-media environment for users of the mobile communications devices. Consequently, the complexity of wireless communications networks and access points to the users continues to increase, along with the need for efficient and robust methods for UEs communicating with multiple transmit-receive points (TRPs).

SUMMARY

According to a first aspect, a method for wireless communications is provided. The method comprises receiving, by a user equipment (UE), first configuration information of a bandwidth part (BWP) in a carrier for a serving cell, the first configuration information comprising a first group of parameters of the BWP in the carrier for the serving cell, the first group of parameters comprising a first physical cell identifier (PCI) of the serving cell; receiving, by the UE, second configuration information, the second configuration information comprising a second group of parameters for the BWP in the carrier; receiving, by the UE, a first DL signal or channel based on the first group of parameters; receiving, by the UE, a second DL signal or channel based on the second group of parameters; transmitting, by the UE, a first UL signal or channel based on the first group of parameters and according to a first timing advance (TA) offset value and a first timing acquired from the first DL signal or channel; and transmitting, by the UE, a second UL signal or channel based on the second group of parameters and according to a second TA offset value and a second timing acquired from the second DL signal or channel.

In a first implementation form of the method according to the first aspect, the second group of parameters comprises a second PCI.

In a second implementation form of the method according to the first aspect or any preceding implementation form of the first aspect, the second PCI is different from the first PCI of the serving cell.

In a third implementation form of the method according to the first aspect or any preceding implementation form of the first aspect, the second PCI is different from a PCI of any serving cell configured for the UE on any carrier.

In a fourth implementation form of the method according to the first aspect or any preceding implementation form of the first aspect, the first UL signal or channel is configured for a first TAG, the second UL signal or channel is configured for a second TAG, and the transmitting a first UL signal or channel according to a first timing advance (TA) offset value indicated for the first TAG and a first timing acquired from the first DL signal or channel further comprises: determining the first timing based on the first DL signal or channel; determining a first transmission timing using the first timing as a reference plus a time offset based on the first TA offset value; transmitting the first UL signal or channel based on the first transmission timing; and wherein the transmitting a second UL signal or channel based on the second group of parameters and according to a second TA offset value indicated for the second TAG and a second timing acquired from the second DL signal or channel further comprises: determining the second timing based on the second DL signal or channel; determining a second transmission timing using the second timing as a reference plus a time offset based on the second TA offset value; and transmitting the second UL signal or channel based on the second transmission timing.

In a fifth implementation form of the method according to the first aspect or any preceding implementation form of the first aspect, the serving cell is associated with the first PCI and a first synchronization signal block (SSB) transmitted on the carrier or a different carrier, and the first DL signal or channel is quasi-co-located (QCLed) to the first SSB, or is QCLed to a downlink reference signal that is QCLed to the first SSB, and the first UL signal or channel is configured with a pathloss/spatial-relation DL RS that is the first SSB, or QCLed to the first SSB, or QCLed to a DL RS that is QCLed to the first SSB.

In a sixth implementation form of the method according to the first aspect or any preceding implementation form of the first aspect, the second DL signal or channel is QCLed to a second CSI-RS for tracking (TRS) transmitted on the carrier or a different carrier or to a downlink reference signal that is QCLed to the second TRS, and the second UL signal or channel is configured with a pathloss/spatial-relation DL RS that is the second TRS or QCLed to the second TRS.

In a seventh implementation form of the method according to the first aspect or any preceding implementation form of the first aspect, the second DL signal or channel is QCLed to a second CSI-RS for tracking (TRS) transmitted on the carrier or a different carrier, to a second SSB transmitted on the carrier or a different carrier associated with a cell that has the second PCI, or to a downlink reference signal that is QCLed to the second TRS, wherein the second TRS is QCLed to the second SSB, and the second UL signal or channel is configured with a pathloss/spatial-relation RS that is the second SSB or the second TRS, or QCLed to a DL RS that is QCLed to the second TRS or the second SSB.

According to a second aspect, a method for wireless communications is provided. The method comprises: receiving, by a user equipment (UE), first configuration information of a bandwidth part (BWP) in a carrier of a serving cell, the first configuration information comprising a first group of parameters of the BWP in the carrier of the serving cell and the first group of parameters comprising a first physical cell identifier (PCI) of the serving cell; and receiving, by the UE, second configuration information of the carrier, the second configuration information comprising a second group of parameters for the BWP in the carrier, the second group of parameters comprising a second PCI different from a PCI of any serving cell of the UE, the second group of parameters also comprising a second synchronization signal block (SSB) configuration, the second SSB configuration comprising at least a second SSB transmission power indication, periodicity indication, and without carrier frequency, subcarrier spacing, or system frame number (SFN) offset, and the second SSB is associated with the second PCI.

In a first implementation form of the method according to the second aspect, the method further comprises: calculating, by the UE, an estimated pathloss in accordance with at least the second SSB transmission power indication; and transmitting, by the UE, a UL signal or channel in accordance with the estimated pathloss and the second group of parameters.

In a second implementation form of the method according to the second aspect or any preceding implementation form of the second aspect, the serving cell is associated with the first PCI and a first synchronization signal block (SSB) transmitted on the carrier or a different carrier, the first SSB is configured with at least a first SSB transmission power indication, periodicity indication, and carrier frequency, and the BWP is configured with subcarrier spacing, and a first DL signal or channel based on the first group of parameters is quasi-co-located (QCLed) to the first SSB, or is QCLed to a downlink reference signal that is QCLed to the first SSB, and a first UL signal or channel based on the first group of parameters is configured with a pathloss/spatial-relation DL RS that is QCLed to the first SSB, or QCLed to the first SSB, or QCLed to a DL RS that is QCLed to the first SSB.

In a third implementation form of the method according to the second aspect or any preceding implementation form of the second aspect, the method further comprises: calculating, by the UE, an estimated pathloss in accordance with at least the first SSB transmission power indication; and transmitting, by the UE, a UL signal or channel in accordance with the estimated pathloss and the first group of parameters.

In a fourth implementation form of the method according to the second aspect or any preceding implementation form of the second aspect, a second DL signal or channel based on the first group of parameters is QCLed to a second CSI-RS for tracking (TRS) transmitted on the carrier or a different carrier or to a downlink reference signal that is QCLed to the second TRS, and a second UL signal or channel based on the first group of parameters is configured with a pathloss/spatial-relation DL RS that is the second TRS or QCLed to the second TRS.

According to a third aspect, a user equipment (UE) is provided. The UE comprising: one or more processors; and a non-transitory memory storage comprising instructions that, when executed by the one or more processors, cause the UE to: receive first configuration information of a bandwidth part (BWP) in a carrier for a serving cell, the first configuration information comprising a first group of parameters of the BWP in the carrier for the serving cell, the first group of parameters comprising a first physical cell identifier (PCI) of the serving cell; receive second configuration information, the second configuration information comprising a second group of parameters for the BWP in the carrier; receive a first DL signal or channel based on the first group of parameters; receive a second DL signal or channel based on the second group of parameters; transmit a first UL signal or channel based on the first group of parameters and according to a first timing advance (TA) offset value and a first timing acquired from the first DL signal or channel; and transmit a second UL signal or a UL channel based on the second group of parameters and according to a second TA offset value and a second timing acquired from the second DL signal or channel.

In a first implementation form of the UE according to the third aspect, the second group of parameters comprises a second PCI.

In a second implementation form of the UE according to the third aspect or any preceding implementation form of the third aspect, the second PCI is different from the first PCI of the serving cell.

In a third implementation form of the UE according to the third aspect or any preceding implementation form of the third aspect, the second PCI is different from a PCI of any serving cell configured for the UE on any carrier.

In a fourth implementation form of the UE according to the third aspect or any preceding implementation form of the third aspect, the first UL signal or channel is configured for a first TAG, the second UL signal or channel is configured for a second TAG, and the transmitting a first UL signal or channel according to a first timing advance (TA) offset value indicated for the first TAG and a first timing acquired from the first DL signal or channel further comprises instructions causing the UE to: determine the first timing based on the first DL signal or channel; determine a first transmission timing using the first timing as a reference plus a time offset based on the first TA offset value; transmit the first UL signal or channel based on the first transmission timing; and wherein the transmitting a second UL signal or channel based on the second group of parameters and according to a second TA offset value indicated for the second TAG and a second timing acquired from the second DL signal or channel further comprises instructions causing the UE to: determine the second timing based on the second DL signal or channel; determine a second transmission timing using the second timing as a reference plus a time offset based on the second TA offset value; and transmit the second UL signal or channel based on the second transmission timing.

In a fifth implementation form of the UE according to the third aspect or any preceding implementation form of the third aspect, the serving cell is associated with the first PCI and a first synchronization signal block (SSB) transmitted on the carrier or a different carrier, the first SSB is configured with at least a first SSB transmission power indication, periodicity indication, and carrier frequency, and the BWP is configured with subcarrier spacing, and the first DL signal or channel is quasi-co-located (QCLed) to the first SSB, or is QCLed to a downlink reference signal that is QCLed to the first SSB, and the first UL signal or channel is configured with a pathloss/spatial-relation DL RS that is the first SSB, or QCLed to the first SSB, or QCLed to a DL RS that is QCLed to the first SSB.

In a sixth implementation form of the UE according to the third aspect or any preceding implementation form of the third aspect, further comprises instructions causing the UE to: calculate an estimated pathloss in accordance with at least the first SSB transmission power indication; and transmit a UL signal or channel in accordance with the estimated pathloss and the first group of parameters.

In a seventh implementation form of the UE according to the third aspect or any preceding implementation form of the third aspect, the second DL signal or channel is QCLed to a second CSI-RS for tracking (TRS) transmitted on the carrier or a different carrier or to a downlink reference signal that is QCLed to the second TRS, and the second UL signal or channel is configured with a pathloss/spatial-relation DL RS that is the second TRS or QCLed to the second TRS.

In an eighth implementation form of the UE according to the third aspect or any preceding implementation form of the third aspect, the second DL signal or channel is QCLed to a second CSI-RS for tracking (TRS) transmitted on the carrier or a different carrier, to a second SSB transmitted on the carrier or a different carrier associated with a cell that has the second PCI, or to a downlink reference signal that is QCLed to the second TRS, wherein the second TRS is QCLed to the second SSB, and the second UL signal or channel is configured with a pathloss/spatial-relation RS that is the second SSB or the second TRS, or QCLed to a DL RS that is QCLed to the second TRS or the second SSB.

According to a fourth aspect, a user equipment (UE) is provided. The UE comprises: one or more processors; and a non-transitory memory storage comprising instructions that, when executed by the one or more processors, cause the UE to: receive first configuration information of a bandwidth part (BWP) in a carrier of a serving cell, the first configuration information comprising a first group of parameters of the BWP in the carrier of the serving cell and the first group of parameters comprising a first physical cell identifier (PCI) of the serving cell; receive second configuration information of the carrier, the second configuration information comprising a second group of parameters for the BWP in the carrier, the second group of parameters comprising a second PCI different from a PCI of any serving cell of the UE, the second group of parameters also comprising a second synchronization signal block (SSB) configuration, the second SSB configuration comprising at least an SSB transmission power indication and the second SSB is associated with the second PCI; calculate an estimated pathloss in accordance with at least the second SSB configuration; and transmit a UL signal or channel in accordance with the estimated pathloss and the second group of parameters.

In a first implementation form of the UE according to the fourth aspect, the serving cell is associated with the first PCI and a first synchronization signal block (SSB) transmitted on the carrier or a different carrier, and a first DL signal or channel based on the first group of parameters is quasi-co-located (QCLed) to the first SSB, or is QCLed to a downlink reference signal that is QCLed to the first SSB, and a first UL signal or channel based on the first group of parameters is configured with a pathloss/spatial-relation DL RS that is QCLed to the first SSB, or QCLed to the first SSB, or QCLed to a DL RS that is QCLed to the first SSB.

In a second implementation form of the UE according to the fourth aspect or any preceding implementation form of the fourth aspect, a second DL signal or channel based on the first group of parameters is QCLed to a second CSI-RS for tracking (TRS) transmitted on the carrier or a different carrier or to a downlink reference signal that is QCLed to the second TRS, and a second UL signal or channel based on the first group of parameters is configured with a pathloss/ spatial-relation DL RS that is the second TRS or QCLed to the second TRS.

According to a fifth aspect, a method for wireless communications is provided. The method comprises: transmitting, by a first transmit receive point (TRP) to a user equipment (UE), first configuration information of a bandwidth part (BWP) in a carrier for a serving cell, the first configuration information comprising a first group of parameters of the BWP in the carrier for the serving cell, the first group of parameters comprising a first physical cell identifier (PCI) of the serving cell; transmitting, by a second TRP to the UE, second configuration information, the second configuration information comprising a second group of parameters for the BWP in the carrier; transmitting, by the first TRP to the UE, a first DL signal or channel based on the first group of parameters; transmitting, by the second TRP to the UE, a second DL signal or channel based on the second group of parameters; receiving, by the first TRP from the UE, a first UL signal or channel based on the first group of parameters and according to a first timing advance (TA) offset value and a first timing acquired from the first DL signal or channel; and receiving, by the second TRP from the UE, a second UL signal or channel based on the second group of parameters and according to a second TA offset value and a second timing acquired from the second DL signal or channel.

According to a sixth aspect, a method for wireless communications is provided. The method comprises: transmitting, by a first transmit receive point (TRP) to a user equipment (UE), first configuration information of a bandwidth part (BWP) in a carrier of a serving cell, the first configuration information comprising a first group of parameters of the BWP in the carrier of the serving cell and the first group of parameters comprising a first physical cell identifier (PCI) of the serving cell; and transmitting, by a second TRP to the UE, second configuration information of the carrier, the second configuration information comprising a second group of parameters for the BWP in the carrier, the second group of parameters comprising a second PCI different from a PCI of any serving cell of the UE, the second group of parameters also comprising a second synchronization signal block (SSB) configuration, the second SSB configuration comprising at least an SSB transmission power indication, periodicity indication, and without carrier frequency, subcarrier spacing, or system frame number (SFN) offset, and the second SSB is associated with the second PCI.

An advantage of a preferred embodiment is improved signaling synchronization and reliability in multi-TRP (M-TRP) communications, especially inter-cell M-TRP and intra-cell M-TRP with larger separation, non-ideal backhaul, or imperfect synchronization.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates a table showing example groups of IDs configured for different TRPs according to example embodiments presented herein;

FIG. 6 illustrates a diagram of example messages exchanged and processing performed by devices participating in an M-DCI M-TRP communication according to example embodiments presented herein;

FIG. 7 illustrates a table showing example M-TRP scenarios according to example embodiments presented herein;

In the figures, items in square brackets are optional, and dashed lines are for optional relations/transmissions.

DETAILED DESCRIPTION OF ILLUSTRATIVE EMBODIMENTS

In multiple-TRP (M-TRP) communications, a UE, a transmission or a reception in a serving cell of a carrier or a bandwidth part (BWP, which may be seen as a portion of the carrier that the UE is currently operating on for the carrier) needs to adjust the transmission/reception timing and properties based on with which TRP the transmission/reception is. For example, if the uplink transmission timing for multiple TRPs over the carrier or BWP using the same TA of the TAG associated with the serving cell, it may cause inaccurate uplink timing of the UE in communication with a TRP not co-located (NCLed) with the serving cell of the UE, e.g., when the TRP is not synchronized with the serving cell, when the TRP and the serving cell have a non-ideal backhaul, and/or when the TRP is located far away from the serving cell, and a difference of propagation delays of the UE with the TRP and with the serving cell cannot be neglected in adjusting uplink timing of the UE. The inaccurate uplink timing may negatively affect the UE's physical uplink control channel (PUCCH)/physical uplink shared channel (PUSCH) reliability, spectrum efficiency, and sounding accuracy for uplink/downlink multi-input multi-output (MIMO) channel state information (CSI) acquisition. Thus, the UE needs to be configured with separate TAGs for the serving cell and the NCLed TRP, and applies different TA when transmitting to different TRPs. Similarly, the UE's DL timing maintained via tracking loop should also be adjusted based on which TRP is transmitted to the UE. M-TRP allows the UE to receive from multiple TRPs on possibly overlapping time-frequency resources, and therefore the UE may need to maintain multiple DL tracking loops, one for each NCLed TRP, and apply the associated FFT windows to receive DL transmissions from TRPs respectively. Consequently, the UL/DL signals/channels, or generally, radio resources, may need to be separated into groups, called resource groups (RGs), according to the NCLed TRPs.

Embodiments of the present disclosure provide methods for M-TRP communications of a UE in a serving cell over a carrier/BWP of the serving cell, with separate RGs configured for different TRPs. The embodiment methods improve UL/DL transmission/reception qualities of the UE in the M-TRP communications. Embodiments of the present disclosure also provide methods for configuring the TRPs with separate RGs, and acquiring/obtaining/maintaining timings and association relationships of the separate TAGs by the UE. Details will be provided in the following.

Figure 1:
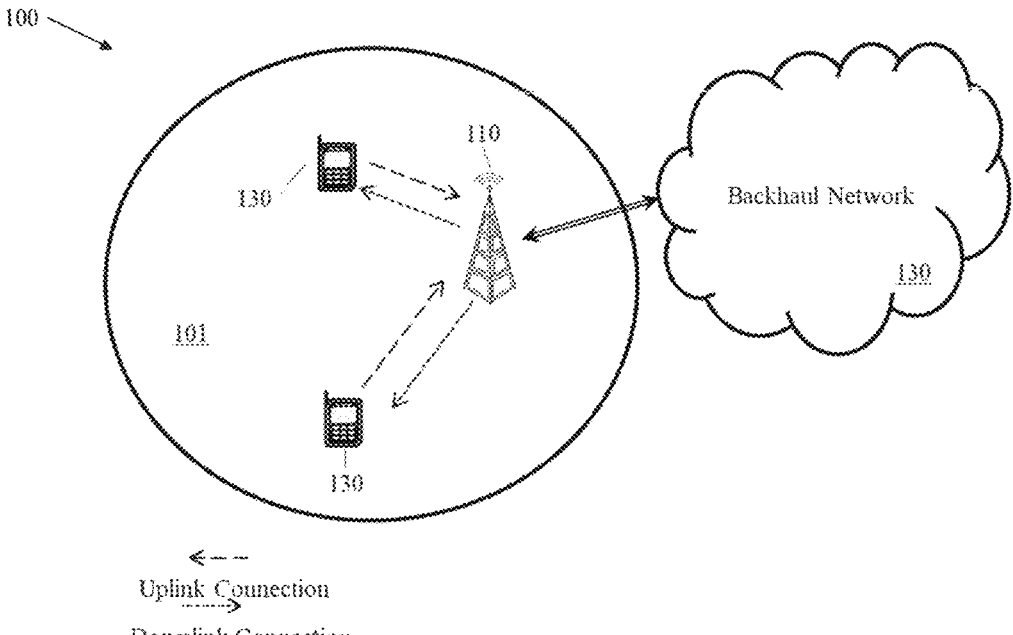
FIG. 1 illustrates a diagram of an embodiment wireless communication system.

FIG. 1 illustrates an example wireless communication system 100. Communication system 100 includes a base station 110 with coverage area 101. The base station 110 serves a plurality of user equipments (UEs), including UEs 120. Transmissions from the base station 110 to a UE is referred to as a downlink (DL) transmission and occurs over a downlink channel (shown in FIG. 1 as a solid arrowed line), while transmissions from a UE to the base station 110 is referred to as an uplink (UL) transmission and occurs over an uplink channel (shown in FIG. 1 as a dashed arrowed line). Data carried over the uplink/downlink connections may include data communicated between the UEs 120, as well as data communicated to/from a remote-end (not shown) byway of a backhaul network 130. Example uplink channels and signals include physical uplink shared channel (PUSCH), physical uplink control channel (PUCCH), an uplink sounding reference signal (SRS), or physical random access channel (PRACH). Services may be provided to the plurality of UEs by service providers connected to the base station 110 through the backhaul network 130, such as the Internet. The wireless communication system 100 may include multiple distributed access nodes 110.

In a typical communication system, there are several operating modes. In a cellular operating mode, communications to and from the plurality of UEs go through the base station 110, while in device to device communications mode, such as proximity services (ProSe) operating mode, for example, direct communication between UEs is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points, transmission points (TPs), transmission-reception points (TRPs), cells, carriers, macro cells, femtocells, pico cells, relays, customer premises equipment (CPE), the network side, the network, and so on. In the present disclosure, the terms "base station" and "TRP" are used interchangeably unless otherwise specified. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, CPEs, relays, Integrated Access and Backhaul (IAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.11a/b/g/n/ac, etc. While it is understood that communication systems may employ multiple access nodes (or base stations) capable of communicating with a number of UEs, only one access node, and two UEs are illustrated in FIG. 1 for simplicity.

Uplink timing may be controlled through timing advance (TA). TA is generally used to compensate for the propagation delay as signal travels between UEs and their serving network nodes, e.g., TRPs. Uplink timing of a UE may be measured by a TRP using an uplink signal or channel, e.g., PUSCH, PUCCH, PRACH or SRS, transmitted by the UE. A TA value may be determined and assigned to the UE based on the measurement. Timing advance commands may be transmitted, e.g., periodically, by the TRP, generally in a medium access control (MAC) command entity (CE). A timing advance command may include a TA value, based on which the UE adjusts its uplink transmission timing to align with the timing at the network side. With proper TA values applied to UL transmissions from UEs in a cell, the UL transmissions of the UEs arrive at the base station at about the same time to facilitate detection and/or decoding of the UL transmissions from the multiple UEs.

Cells are grouped into different timing advance groups (TAGs). Cells having an uplink to which the same TA applies (e.g., cells hosted by the same transceiver) and using the same timing reference cell may be grouped in one TAG. Thus, cells grouped in the same TAG have the same TA. A cell may be assigned to a TAG via radio resource control (RRC) signaling. Thus, a cell is associated with a TAG. Each TAG may update its corresponding TA periodically. When receiving a TA command of a cell associate with a TAG, a UE adjusts its uplink transmission timing, e.g., for transmission of PUCCH, PUSCH, and/or SRS of the cell based on the received TA command of the associated TAG.

In 3GPP 5G NR Release 15 and 16 (R15/16), TAGs are cell based. In one carrier, there is only one serving cell, which is assigned with one TAG. In 3GPP R16, for M-TRP communications, a TRP not configured as a serving cell (e.g., the TRP1 314) is configured with the same TAG of its co-channel cell (e.g., the TRP0 312). serving cell (PCell and/or SCell) is configured, in its IE ServingCellConfig, with a field tag-Id, which uniquely identifies a TAG. For all serving cells configured with the same tag-Id, they belong to the same TAG. The current framework of TA/TAG allows only a serving cell to be configured with a TA/TAG. In one carrier, there can be only one serving cell, and that cell is assigned with one TAG. With Rel-16 M-TRP design, for a TRP not co-located with a serving cell, Rel-16 does not have a separate TA for it and the UE applies the TA of the co-channel serving cell for this TRP. This works fine even for M-TRP scenarios provided that the multiple TRPs are not located far away from one another, are connected by fast backhaul, and are tightly synchronized. However, this has limited applications/deployment scenarios and needs to be enhanced.

When a UE is served by multiple TRPs in a serving cell associated with a TAG in a BWP over a carrier, the UE's uplink transmission timing for all the multiple TRPs in the BWP over the carrier is adjusted using the same TA of the TAG associated with the serving cell. Note that the multiple TRPs over the same carrier operate on the same BWP as specified in Rel-16. Using the same TA of a serving cell for communication with different TRPs may, in some cases, cause inaccurate uplink timing (uplink TA). This may negatively affect the UE's PUCCH/PUSCH reliability, spectrum efficiency, and sounding accuracy for uplink/downlink full multi-input multi-output (MIMO) channel state information (CSI) acquisition. Cyclic prefix (CP) may not be sufficient to cover the propagation delay differences, delay spread, and M-TRP sync inaccuracy.

Likewise, DL timing difference between the M-TRPs (especially inter-cell TRPs) may cause the CP or one FFT insufficient. How well the time/frequency synchronization between the M-TRPs is may depend on the backhaul assumption. If ideal backhaul can be assumed, then likely the timing/frequency differences between the TRPs are negligible; otherwise non-negligible synchronization errors should be considered in the design. Regarding backhaul latency and coordination, generally, at least for inter-cell TRPs, ideal/fast backhaul cannot be assumed. Backhaul latency of a few milliseconds to a couple of tens of milliseconds and semi-static coordination should be considered in the design. Inter-TRP signal delay spread relative to the CP length should also be considered. Depending on the synchronization among the inter-cell TRPs and the relative distances of the TRPs to the UE, the possible assumptions are: 1) The inter-cell signal delay spread is within the CP length but close to the CP length, i.e., even though the inter-TRP signal delay spread is within the CP length, the arrive time difference from the TRPs may still be large.

Figure 2:
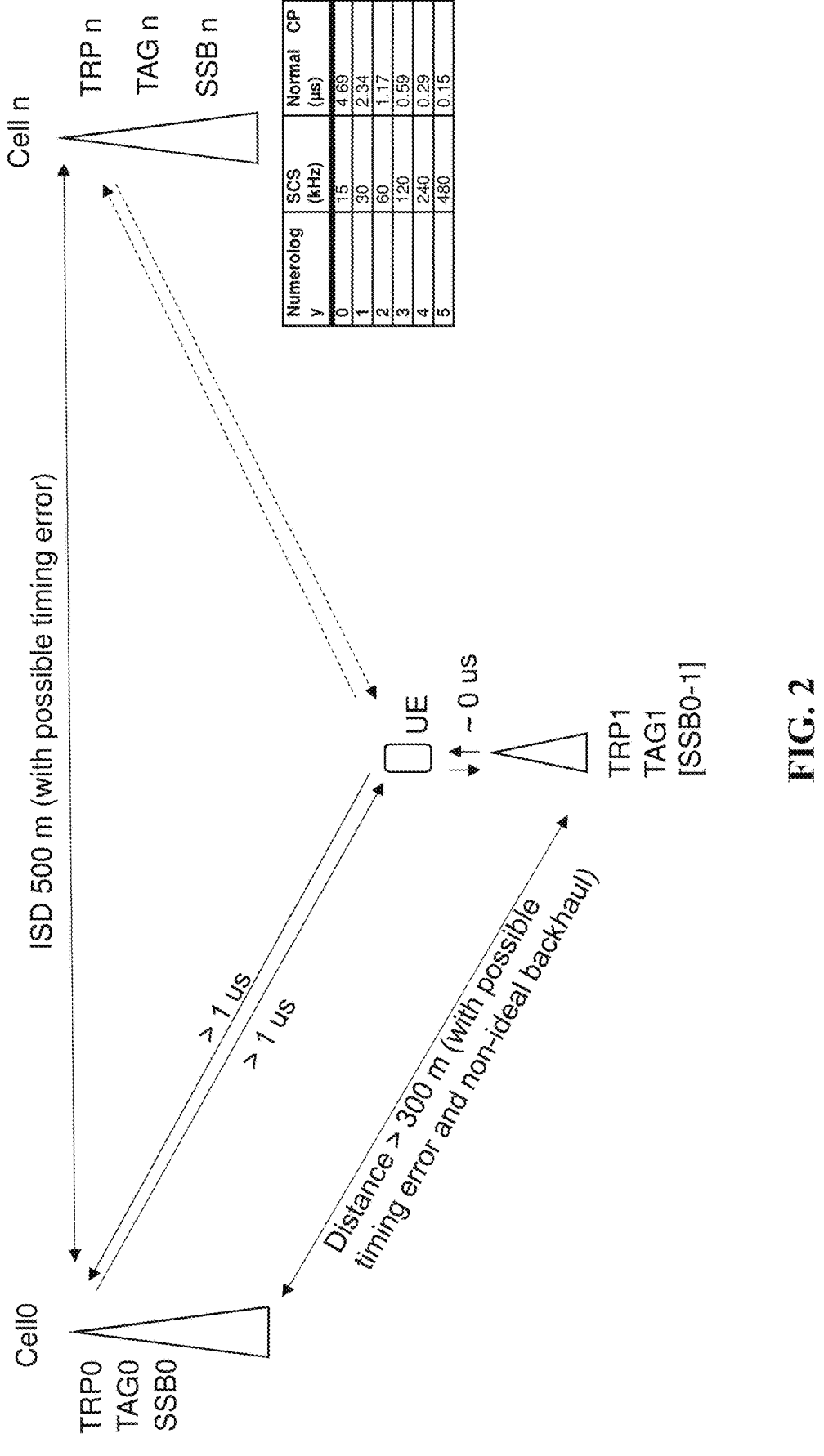
FIG. 2 illustrates a diagram of an example wireless network.

FIG. 2 illustrates a diagram of an example wireless network. In the wireless network, a M-TRP setting is of non-co-located TRPs (e.g., TRP0 and TRP1, and TRP n may serve the UE on the same carrier). A problem may arise in that one DL tracking loop/FFT window and/or one UL TAG may be insufficient, especially for >15 kHz SCS. In one approach, the UE may need to maintain multiple FFT windows and multiple TAGs on the same carrier.

To support inter-cell M-TRP, a synchronization signal block (SSB) may be configured to the UE but not as a Scell:
    TRS is QCLed to the SSB
    The SSB/TRS forms a R17 TAG, even when there is already a co-channel TAG—In one carrier, there may be one serving cell, but multiple TAGs, SSBs, physical cell identifiers (PCIDs) (different from CA/DC). Physical cell identifiers are referred to as either PCIDs or PCIs interchangeably throughout this specification.
    A R17 random access procedure is needed: PUSCH/ DMRS need TRP-specific scrambling ID(s)

For M-TRP without additional SSB configured (e.g., intra-cell):

TRS forms a R17 TAG, even when there is already a co-channel TAG—The signals QCLed to the TRS form a separate TAG, R17 random access procedure is needed in some cases: PUSCH/DMRS need TRP/TRS-specific scrambling ID(s), PDCCH order may indicate RACH to which TRP, via an ID or QCL relation/default relation (cross-TRP PDCCH order).

Figure 3:
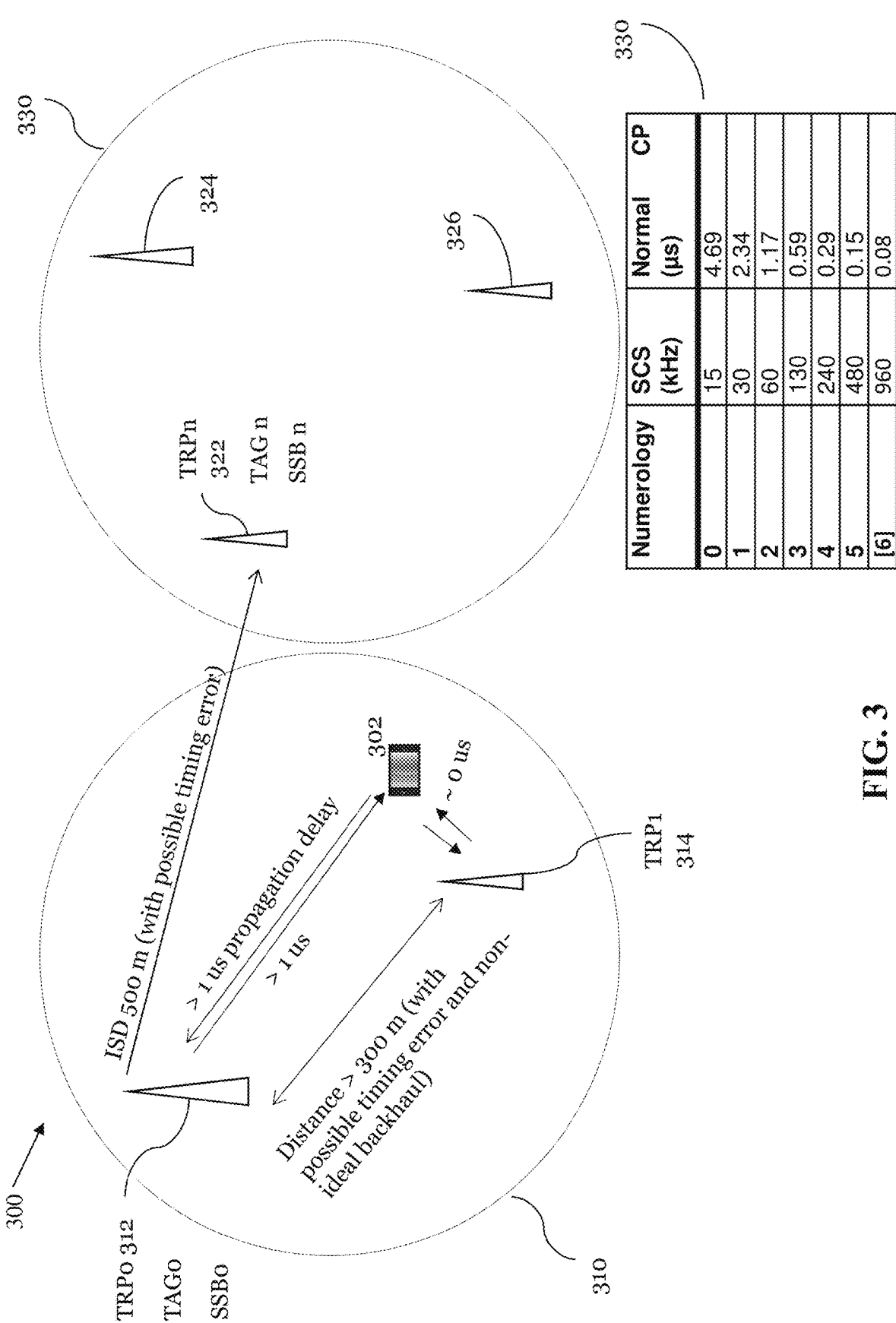
FIG. 3 illustrates a diagram of an embodiment of a wireless network.

FIG. 3 illustrates a diagram of an embodiment wireless network 300, highlighting a scenario causing inaccurate uplink TA and downlink timing. As shown, the wireless network 300 includes a serving cell 310 (or base station) of a UE 302 serving the UE 302 over a carrier. A TRP0 312 operating on a BWP over the carrier is co-located with the base station or cell 310, and broadcasts a PCID/SSB for the cell 310. The TRP0 312 transmits the SSB generated based on the PCID of the cell 310, and thus the PCID is transmitted/broadcast via transmission of the SSB. This is simplified as a TRP transmitting (or broadcasting) PCID/SSB in the following descriptions of the present disclosure for illustrative convenience. The SSB generated based on the PCID of the cell 310 is deemed to be associated with the cell 310 (or the PCID) or to be of the cell 310. A signal unassociated with the cell 310 indicates that the signal is not associated with the PCID of the cell, or not associated with a signal of the cell 310, directly or indirectly (see more detailed description based on quasi co-location below). The TRP0 312 may be configured to operate over one or more carriers/BWPs. The TRP0 312 may be referred to as a co-located TRP of the cell 310. A TRP1 314 is located in the coverage area of the serving cell 310 (with a certain distance from the TRP0 312) and configured to cooperate with the TRP0 312 to serve UEs in the serving cell 310 over the carrier, i.e., providing multi-TRP (m-TRP, or M-TRP) communications over the carrier. The TRP1 314 is within the coverage range of the serving cell 310, assisting the serving cell 310, and not broadcasting the PCID/SSB for the cell 310, and may rely on the serving cell 310 for some functionalities (e.g., control plane functionalities), and thus it is considered as an intra-cell TRP of the cell 310. The TRP1 314 may be referred to as an intra-cell TRP of the cell 310 and co-channeled (i.e., serving over the same carrier) with the TRP0 312. The TRP1 314 may not be co-located with the cell 310 and does not broadcast any PCID or SSB. The TRP1 314 may not be co-located with the TRP0 312. However, in some deployment, e.g., at frequency range 2 (FR2), the TRP1 314 may also broadcast the same PCID as the TRP0 312 does, and transmit a SSB as a reference for timing/beam (e.g., the SSB can be used by a UE for timing synchronization and initial beam acquisition for communication with the TRP1 314) but on a different SSB resource than the SSB transmitted by the TRP0 312. The wireless network 300 also includes a TRPn 322 associated with a cell 320, which may be a neighbor cell of the serving cell 310. As a neighbor cell instead of a serving cell, the TRPn 322 generally does not serve UEs that are served by the cell 310, but may cause interference to the UEs served by cell 310, and it is not configured as a serving cell for the UEs served by the cell 310. This is different from a serving cell transmitting RRC/MAC/PHY layer signals to a UE and maintaining a connection to the UE. TRPs 324, 326 are located in the coverage area of the cell 320 and configured to cooperate with the TRPn 322 to serve UEs of the cell 320 over one or more carriers supported by the TRPn 322. The UE 302 may be served by both the TRP0 312 and TRP1 314 over the same carrier, or over different carriers. Each of the cells 310 and 320 has an associated physical cell identifier (PCID, or PCI) and a synchronization signal block (SSB), based on which UEs synchronize with the respective cell.

As used herein, a TRP being co-located with another TRP (or base station, or cell) indicates that the two TRPs are at the same location and share the same set of antennas, and may, in some cases, even share the same antenna configuration (e.g., the same analog antenna beamforming). A co-located relation between two TRPs may be known to the network side but not be revealed to a UE, i.e., transparent to the UE. In some cases, it may be useful for the UE to know whether two received signals are from the same transmitter (or TRP, or antenna) or not, and QCL assumptions between RS ports of the transmitters may be introduced and signaled to the UE. A TRP being co-channeled with another TRP (or base station, or cell) indicates that they operate on the same carrier in frequency. A standalone TRP transmits a SSB/PCID of a cell (the signal on the SSB is generated based on the PCID), and thus a UE can find it during a cell search/initial access procedure. The UE connects to the standalone TRP/cell after that. A non-standalone TRP does not transmit a SSB/PCID, and thus a UE cannot find it during a cell search/initial access procedure. The UE cannot connect to the non-standalone TRP directly. The UE first connects to a standalone TRP/cell, and then the standalone TRP/cell signals the UE with information about the non-standalone TRP, so that the UE may communicate with the non-standalone TRP.

In this example, the cell 310 is assigned to TAG1 associated with the carrier. The UE 302 may have established a connection with the cell 310 through a random access procedure, and receives a TA command of the TAG1 from the TRP0 312. The TA value in the TA command is generally related to the distance between the TRP0 312 and the UE 302. The UE 302 then transmits uplink signals/channels over the carrier to both the TRP0 312 and TRP1 314 according the TA command, i.e., the same TA value, if they are in the same TAG as in Rel-16, i.e., if they are configured with the same TAG according to Rel-16. However, in a case where the two TRP0 312 and TRP1 314 are located far away from each other, e.g., with a distance greater than 300 m, with non-ideal backhaul (e.g., with a backhaul latency of 10-20 ms or even longer, which may cause them not tightly synchronized with each other) between the TRPs 312, 314, and the UE 302 is closer to the TRP1 314 (e.g., with nearly no propagation delay) than to the TRP0 312 (e.g., with a greater than 1 us propagation delay), uplink timing error may occur when the UE 302 communicates with the TRP1 314 using the TA value of the TAG1, which is assigned based on the TRP0 312. This is because that the TA of the TAG1 is not well suited for TRP1 314 in view of the distance between the TRP1 314 and the TRP0 312, between the TRP1 314 and the UE 302, and between the TRP0 312 and the UE 302. In this case, there is a large propagation delay difference between the TRP1 314 and the UE 302, and between the TRP0 312 and the UE 302. Cyclic prefix (CP) may help mitigate the propagation delay difference to some extent, however, for higher subcarrier spacing (SCS), e.g., greater than 15 kHz, CP is short as shown in the table 330 in FIG. 3 and may not be sufficient to absorb such a large propagation delay difference, resulting in poor uplink timing alignment of the UE 302 with respect to the TRP1 314. Thus, it would be desirous to configure a separate TA value and hence a separate TAG for the UE 302 to communicate with the TRP1 314, although TRP0 312 and TRP1 314 are co-channeled in the same carrier of the serving cell 310 of the UE 302. That is, the TRP0 312 and the TRP1 314 may be associated with different TAGs, so that the UE 302 adjusts its uplink transmission timing differently for communications with the TRP0 312 and the TRP1 314, respectively. The UE 302 may need to perform a random access procedure to acquire the TA of a TAG associated with the TRP1 314 and synchronize with the TRP1 314 that does not have a standalone PCID, especially for SCS greater than 15 kHz. By doing so, more TRPs, especially TRPs far from each other, can be added to the serving TRP pool for the UE 302 and well utilized by the UE 302. Likewise, in the DL, a first transmission from the TRP0 312 and a second transmission from the TRP1 314 may generally arrive at the UE at different timings, and the timing differences may be more pronounced relative to the CP length when the two TRP0 312 and TRP1 314 are located far away from each other, with non-ideal backhaul (e.g., with a backhaul latency of 10-20 ms or even longer, which may cause them not tightly synchronized with each other) between the TRPs 312 and 314, not tightly synchronized between the TRPs 312 and 314, with long delay spread, with short OFDM symbol duration due to large SCS, and so on. One DL tracking loop/FFT window may be insufficient. The UE may need to maintain multiple FFT windows on the same carrier for NCLed TRPs. In addition, since the TRPs are not close to each other, the channel properties (e.g., Doppler shift, Doppler spread, average delay, delay spread, Spatial Rx parameter) between the UE 302 and the TRP0 312 may be quite different from the channel properties between the UE 302 and the TRP1 314, and hence to improve transmission/reception quality, the UE needs to apply different parameters accordingly. For this reason, the UE needs to be signaled with which TRP a transmission/reception is and then adapt.

In some cases, the network may also configure the TRPn 322 to serve the UE 302 over the same carrier, without configuring it as a secondary cell (SCell) of the UE 302, e.g., in order to provide increased network capacity. The TRPn 322 is an inter-cell TRP, as opposed to an intra-cell TRP; however, it may be transparent to the UE. In this case, with Rel-16 design, the UE 302 may still use the TA of the TAG1 for uplink transmission to the TRPn 322, and the FFT window acquired from TRP0 312's RS/SSB for DL reception with the TRPn 322. However, if the TRPn 322 is located far away from the TRP0 312, e.g., greater than 500 meters, and/or if the timing of the TRPn 322 is not tightly synchronized to the TRP0 312, timing error occurs because the timing based on the TRP0 312 is not well suited for TRPn 322 in view of the distance/timing differences between the TRPn 322 and the TRP0 312, and between the TRPn 322 and the UE 302. It would also be desirous to configure a separate TAG, DL timing, and RG for the UE 302 to communicate with the TRPn 322 over the carrier. By doing so, more TRPs, including inter-cell TRPs, can be added to the serving TRP pool for the UE 302 and well utilized by the UE 302.

Embodiments of the present disclosure provide methods for M-TRP communications of a UE in a serving cell over the same carrier/BWP of the serving cell, with separate RGs configured for multiple TRPs in the M-TRP communications. The embodiment methods provide a solution to the problem discussed above with respect to FIG. 3, which improves timing accuracy of the UE in the M-TRP communications. The embodiment methods may be applied to intra-cell M-TRP communications, inter-cell M-TRP communications, or a mix of intra-cell and inter-cell M-TRP communications. In the intra-cell M-TRP communications, all of the multiple TRPs are located within the coverage area of the current serving cell of the UE. Such a TRP of the multiple TRPs may be referred to as a co-cell (or intra-cell) TRP of the serving cell in the disclosure for illustrative convenience, e.g., TRP1 314, and if it also serves the UE by transmitting/receiving data with the UE, it may be called as an intra-cell serving TRP or simply intra-cell TRP of the UE. In the inter-cell M-TRP communications, one or more TRPs may be from another cell different from the serving cell of the UE, and are referred to as inter-cell serving TRPs (or simply inter-cell TRPs) in the disclosure for illustrative convenience. A TRP acting as the serving cell of the UE and broadcasting a PCID/SSB of the serving cell may be referred to as the serving cell of the UE in the disclosure for illustrative convenience, e.g., TRP0 312 broadcasting SSB0 of the cell 310 may be referred to as the "cell", "serving cell", or "base station" for the UE 302. The TRP is thus associated with the serving cell of the UE. Using FIG. 3 as an example, the TRPs that serve the UE 302 may be referred to as serving TRPs of the UE 302, and the TRPs may be intra-cell (e.g., TRP1 314) and/or inter-cell (e.g., TRPn 322), co-located with the cell (e.g., TRP0 312), or non-co-located with the cell (e.g., TRP1 314, and TRPn 322). The intra-cell TRP1 314 may or may not broadcast the PCID/SSB of the serving cell of the UE, but in some deployment, e.g., at FR2, the TRP1 314 may also broadcast the same PCID as the TRP0 312 does, and transmit SSB as a reference for timing/beam but on a different SSB resource than the TRP0 312. The inter-cell TRPn 322 may or may not broadcast a PCID/SSB of a cell, where the inter-cell TRPn 322 is located in a coverage area of the cell. Each TRP may have one or more carriers. For M-TRP scenarios, a UE may also operate with carrier aggregation, i.e., it communicates over multiple carriers with the TRP0 312, and on each of these carriers, the UE may also be served by one or more intra-cell TRPs, such as the TRP1 314 and/or inter-cell TRPs, such as the TRPn 322. That is, the UE may also communicate with those TRPs on multiple carriers.

In some embodiments, in one carrier, there is one serving cell, but there are multiple TAGs, RGs, SSBs, and/or PCIDs configured for a UE. A serving TRP of the UE, e.g., TRP0 312, may be associated with a TAG (or a co-channel TAG, TAG0) and a RG (or a co-channel RG, RG0), e.g., using RRC signaling as conventionally configured, if it is associated with the serving cell 310 of the UE, as discussed above. In what follows, a TA may be seen as a (an optional) parameter associated with a RG, so only RGs are described which also apply to TAG (unless otherwise specified). In an embodiment, a group of UL signals/channels form a UL RG and a group of DL signals/channels form a DL RG, i.e., the RGs are separate for UL and DL. In an embodiment, a group of UL/DL signals/channels form a RG, i.e., no separate RGs for UL and DL. In an embodiment, one UL RG is associated with one DL RG and vice versa. In an embodiment, one UL RG is associated with multiple DL RGs. In an embodiment, one DL RG is associated with multiple UL RGs. In an embodiment, a separate TAG is not configured but a separate RG is configured, and each RG is associated with a TA, which is an alternative approach to configure a separate TAG. In an embodiment, a separate TAG is not configured but a separate UL RG is configured, and each UL RG is associated with a TA. In an embodiment, a separate TAG is configured in parallel to a separate RG, and each TAG is associated with a RG. An intra-cell or inter-cell serving TRP not configured as a serving cell or not co-located with a serving cell of the UE, e.g., TRP1 314, or TRPn 322, may be associated with a separate RG. For a serving TRP not transmitting a SSB, e.g., the TRP1 314, a tracking reference signal (TRS), also referred to as a channel state information-reference signal (CSI-RS) for tracking, of such a serving TRP may be used to form a separate RG, even when there is already a co-channel GG associated with the serving cell, e.g., the cell 310. Uplink/DL signals of the UE that is quasi-co-located (QCLed) to the TRS are associated with the separate RG. Thus, the TRS may be used to form the separate RG. The TRP0 312 may operate on more than one carrier, and the carriers not far away from each other in the frequency domain may belong to the same RG, i.e., RG0. TRP1 314 may also operate on more than one carrier, each of which is co-channelled with one carrier on the TRP0 312, and each of which has a TRS transmitted; all uplink/DL signals of the UE that is quasi co-located (QCLed) to these TRSs of the TRP1 314 are associated with the separate RG. In general, TRSs transmitted from the same/co-located TRP on a same frequency band can be used to define a RG, and TRSs transmitted from non-co-located TRPs may be associated with different RGs. TRP/TRS-specific scrambling ID(s) may be needed for PUSCH and for demodulation reference signal (DMRS) of PUSCH communicated during the random access procedure, as well as TRP/TRS-specific scrambling ID(s) for DMRS of PDSCH, TRP/TRS-specific scrambling ID(s) for physical downlink shared channel (PDSCH), TRP/TRS-specific scrambling ID(s) for DMRS of physical downlink control channel (PDCCH), and TRP/TRS-specific scrambling ID(s) for PDCCH.

The quasi co-location (QCL) types corresponding to each DL RS (more specifically, the port(s) or antenna port(s) of the DL RS) are given by the higher layer parameter qcl-Type in QCL-Info and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. The QCL types may be configured/indicated in transmission configuration indication (TCI) states for a RS. The QCL assumptions are mainly used for DL RS, but can be generalized for UL RS if the association via pathloss RS and spatial relation are specified. The QCL assumption may be specified as: {RS1: QCL Type C to RS2}, {RS1: QCL Type C to RS2 and QCL Type D to RS3}. Then RS1 (destination RS) derives the properties specified according to the QCL types from the associated (i.e., source) RSs (e.g., RS2). Note that the source RS may be a SSB. Note also that the source RS and destination RS may be on the same carrier or different carriers (i.e., cross-carrier QCL).

For an inter-cell serving TRP, e.g., TRPn 322, a SSB of the inter-cell serving TRP may be configured to the UE but not as a SCell of the UE (i.e., the cell associated with the SSB of the inter-cell serving TRP is not one of the serving cells of the UE). A TRS of the inter-cell serving TRP may be used to form a separate RG, even when there is already a co-channel RG associated with the serving cell, e.g., the cell 310. TRP-specific scrambling ID(s) may be needed for PUSCH and for DMRS of PUSCH communicated during the random access procedure, as well as TRP/TRS-specific scrambling ID(s) for DMRS of PDSCH, TRP/TRS-specific scrambling ID(s) for PDSCH, TRP/TRS-specific scrambling ID(s) for DMRS of PDCCH, and TRP/TRS-specific scrambling ID(s) for PDCCH.

A PDCCH may be used to indicate, via a ID or quasi co-location (QCL) relation and/or a default relation, which serving TRP, e.g., the TRP1 314 or the TRPn 322, that a UE needs to receive a PDSCH from or transmit a PUSCH to. Each TRP may be associated with an ID, such as a control resource set (CORESET) pool ID, so that, for example, a PDCCH received on a CORESET with a CORESET pool ID 0 indicates a PUSCH transmission to a TRP associated with the ID 0. In another example, a PDCCH received with a QCL relation/TCI state linking to a SSB or a TRS indicates a PUSCH transmission to a TRP associated with that SSB or TRS.

Taking FIG. 3 as an example, the UE 302 may be synchronized with the TRP0 312 that is the serving cell 310 of the UE 302 over a carrier, and receives a TA command for a first TAG or a first RG, i.e., TAG1 or RG1, that includes the serving cell 310. Thus, the UE 302 is configured with TAG 1 or RG1 for communication with the TRP0 312. A PDCCH order may be transmitted, by the TRP0 312 or the TRP1 314, to the UE 302, including information about random access parameters and triggering/instructing the UE 302 to perform a random access procedure with the TRP1 314, when the base station for the serving cell 310 decides to connect the UE with TRP1 314, or when the base station for the serving cell 310 finds that the TA to the TRP1 314 is lost or inaccurate. The UE 302 may then transmit a RACH preamble to the TRP1 314, and receive, e.g., in a random access response (RAR), a TA command of a second TAG or RG, e.g., TAG2 or RG2, which is associated with the carrier and includes the TRP1 314. Thus, the UE 302 is configured with TAG 2 or RG2 for communication with the TRP1 314. A PDCCH order may also be transmitted, by the TRP0 312 or the TRPn 322, to the UE 302, triggering the UE 302 to perform a random access procedure with the TRPn 322. The UE 302 may transmit a RACH preamble to the TRPn 322, and receive a TA command of a third TAG or RG, e.g., TAG3 or RG3, which is associated with the carrier and includes the TRPn 322. Thus, the UE 302 is configured with TAG 3 or RG3 for communication with the TRPn 322. In an embodiment, each of the TAGs or RGs may be associated with a TAG ID or RG ID uniquely identifying a respective TAG or RG. In an embodiment, each of the TAGs may be associated with a TAG ID uniquely identifying a respective TAG, and the RGs do not have RG ID but are one-to-one associated with the TAGs. After receipt of the TAs of the different TAGs or RGs, i.e., TAG1, TAG2 and TAG3, or RG1, RG2 and RG3, the UE 302 may perform uplink transmission over the carrier with the TRP0 312, TRP1 314 and TRPn 322 according to uplink transmission timing adjusted based on their respective TAs. A TA of an associated TAG or RG may be updated periodically, e.g., about every 20 to 50 ms, for each TAG or RG, and the updated TA may then be sent to the UE 302 in a TA command. The TA command may be carried in a MAC CE. The TA may be updated by the network by measuring an uplink transmission from the UE 302, e.g., SRS. The UE 302 may adjust its uplink transmission timing for a TAG or RG according to the updated TA of the TAG or RG. The UE 302 may thus be served by two or more of the TRP0 312, TRP1 314 and TRPn 322 over the carrier, with each of the TRP0 312, TRP1 314 and TRPn 322 associated with a separate TAG or RG. The separate TAG or RG enables the UE 302 to more accurately adjust its uplink transmission timing with a TRP of the separate TAG or RG.

The UE 302 may receive scheduling information scheduling uplink transmission of the UE with a TRP on a carrier according to a RG associated with the TRP. In some embodiments, the UE 302 may receive first configuration information of the carrier of the serving cell 310 via a RRC configuration signaling. The first configuration information may include/indicate an association between a first group of uplink signals and channels to be transmitted on the carrier by the UE in the serving cell 310 and the RG1, and the RG1 is associated with a first TA value. That is, the first configuration information of the carrier indicates that transmission of the first group of uplink signals and channels by the UE is according to the first TA value of the RG1. The first configuration information may be transmitted by the TRP0 312 to the UE 302. The UE 302 may also receive second configuration information of the carrier, which includes/indicates an association between a second group of uplink signals and channels to be transmitted on the carrier by the UE and the uplink RG2, and the RG2 is associated with a second TA value. That is, the second configuration information of the carrier indicates that transmission of the second group of uplink signals and channels by the UE is according to the second TA value of the RG2. The second configuration information may be transmitted by the TRP0 312 or the TRP1 314 to the UE 302. Similarly, the UE 302 may also receive third configuration information of the carrier, which includes/indicates an association of a third group of uplink signals and channels on the carrier with the uplink RG3, and the RG3 is associated with a third TA value. That is, the third configuration information of the carrier indicates that transmission of the third group of uplink signals and channels by the UE is according to the third TA value of the RG3. The third configuration information may be transmitted by the TRP0 312 or the TRPn 322 to the UE 302. The first, second, and third configuration information of the carrier may be transmitted by the TRP0 312 in one message or separate messages. The UE 302 may then transmit, to the TRP0 312, a UL signal or a UL channel in the first group of UL signals and channels according to the first TA value. The UE 302 may transmit, to the TRP1 314, a UL signal or a UL channel in the second group of UL signals and channels according to the second TA value. The UE 302 may transmit, to the TRPn 322, a UL signal or a UL channel in the third group of UL signals and channels according to the third TA value. The first, second and third groups of UL signals and channels may be configured with a same subcarrier spacing (SCS) within a same BWP. Both the second and the third groups may be configured, or only one of the groups may be configured.

The serving cell 310 is associated with a first PCID and a first SSB. A UL signal or channel in the first group of UL signals and channels may be quasi-co-located (QCLed) to the first SSB, or QCLed to a downlink/uplink reference signal that is QCLed to the first SSB, or is configured with a pathloss RS that is the first SSB or is QCLed to the first SSB, or is configured with a spatial relation RS that is the first SSB or is QCLed to the first SSB. In an embodiment, all UL signal or channel in the first group of UL signals and channels are associated with the first RG.

A UL signal or channel in the second group of UL signals and channels may be QCLed to a TRS of the TRP1 314, or to a downlink/uplink reference signal that is QCLed to the TRS of the TRP1 314, or is configured with a pathloss RS that is the TRS or is QCLed to the TRS of the TRP1 314. In an embodiment, all UL signal or channel in the second group of UL signals and channels are associated with the second TAG. In an embodiment of network deployment, a TRS of the TRP1 314 may be "approximately" QCLed to the first SSB of the serving cell or a TRS of the first SSB, even though the TRP1 314 is not co-located with the TRP0 312 broadcasting the first SSB/PCID, which generally requires that the TRPs are not far away from each other, operate in frequency range 1 (FR1), and serve UEs that do not have high mobility. Still a separate TAG from the TAG for the first SSB/PCID may be beneficial. In an embodiment of network deployment, the TRP1 314 may broadcast the first PCID on a SSB resource different from the first SSB transmitted by TRP0 312, even though the TRP1 314 is not co-located with the TRP broadcasting the first SSB/PCID. A separate RG from the RG for the first SSB/PCID may be configured for the TRP1 314. The SSBs associated with the same PCID but occupy different SSB resources within one SSB burst in FR2 are distinguished via SSB index, and hence each SSB index may be used to define a separate RG if the SSBs with different SSB indexes are transmitted from non-co-located TRPs.

A UL signal or channel in the third group of UL signals and channels may be QCLed to a TRS of the TRPn1 322, QCLed to a second SSB associated with a neighbor cell that has a second PCID different than the first PCID, e.g., the cell 320, or QCLed to a PCID of a cell other than serving cells of the UE 302, or QCLed to a downlink/uplink reference signal that is QCLed to the TRS of the TRPn1 322 or the second SSB, or configured with a pathloss RS that is the TRS of the TRPn1 322 or the second SSB, or that is QCLed to the TRS of the TRPn1 322 or the second SSB. In an embodiment, all UL signal or channel in the third group of UL signals and channels are associated with the third RG.

As discussed above, the embodiment methods associate serving TRPs, which are QCLed to a non-serving cell's SSB directly/indirectly, or which are not QCLed to a serving cell's SSB, or not co-located with a serving cell's TRP(s) transmitting the serving cell's SSB, with RGs separate from the serving cell's TAG, and a UE also needs to perform random access with the serving TRPs to obtain separate TAs. As used herein, a first RS may be QCLed to a second RS/SSB directly, for example, the UE is signaled with a QCL assumption for the first RS that refers to the second RS/SSB for a QCL type, e.g., the UE receives a QCL assumption indicating {the first RS: QCL Type C to the second RS}. A first RS may be QCLed to a second RS/SSB indirectly, for example, the UE is signaled with a QCL assumption for the first RS that refers to one or more RS/SSB, which are further referred to the second RS/SSB for QCL, via one or more QCL assumptions in a concatenated manner, e.g., the UE receives a QCL assumption indicating {the first RS: QCL Type C to a third RS}, {the third RS: QCL Type A to a fourth RS}, and {the fourth RS: QCL Type C to the second RS}. In other words, one QCL assumption defines a relationship/link between a source RS and a destination RS, and multiple QCL assumptions may define a chain of relationships/links that associate a RS, directly using one link or indirectly using multiple links, to another RS/SSB.

Figure 4:
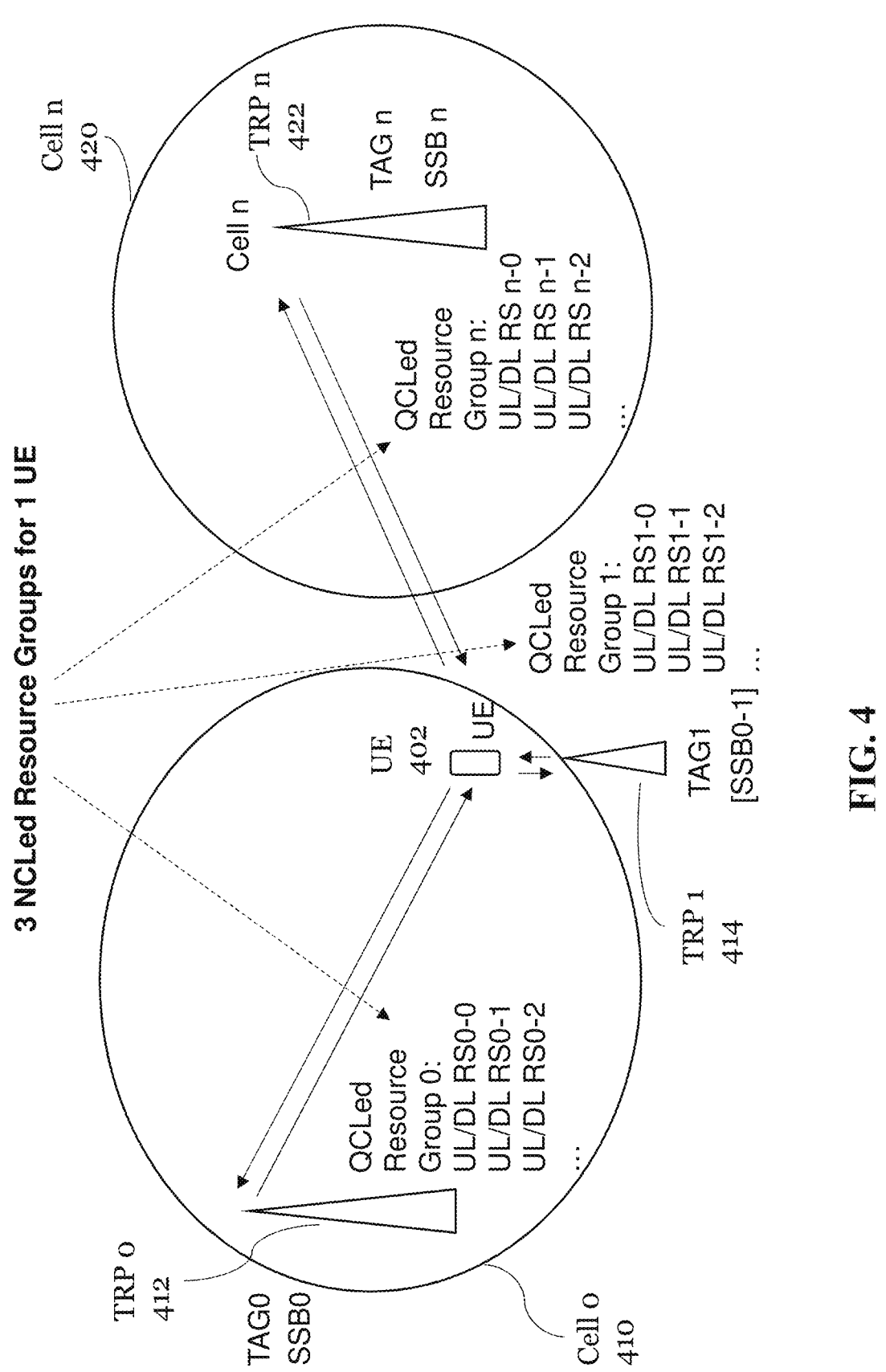
FIG. 4 illustrates an example of resource groups (RGs) according to example embodiments presented herein.

For example, a PDCCH DMRS may be configured/indicated as QCLed to the first SSB of the serving cell or a TRS of the non-serving cell, and a ID is configured for the PDCCH DMRS. Then the UE may receive the PDCCH DMRS with the configured ID, and the DMRS and ID are associated with the TRP of the non-serving cell. The QCL assumptions/relations associate or link all the involved RS, the channels associated with the RS, and IDs associated with the RS/channels, to the QCLed SSB (directly or indirectly via other UL/DL RS), and serve as an implicit way to group the signals/channels/IDs separately according to the TRPs into RGs. See FIG. 4 for an example of the RGs. In each RG, there are a group of signals comprising RSs and possibly SSB. The RGs are for each of the NCLed TRPs, but this is transparent to the UE. The UE is configured with the RGs, and within each RG, the signals are QCLed directly or indirectly with each other. The UE shall not assume QCL relationship across the RGs. In general, each RG should include at least one of a SSB and a TRS. The QCL relationship may be generalized to also include pathloss RS relationship and spatial relationship. Any and all QCL types may be adopted to define a RG.

Figure 4A:
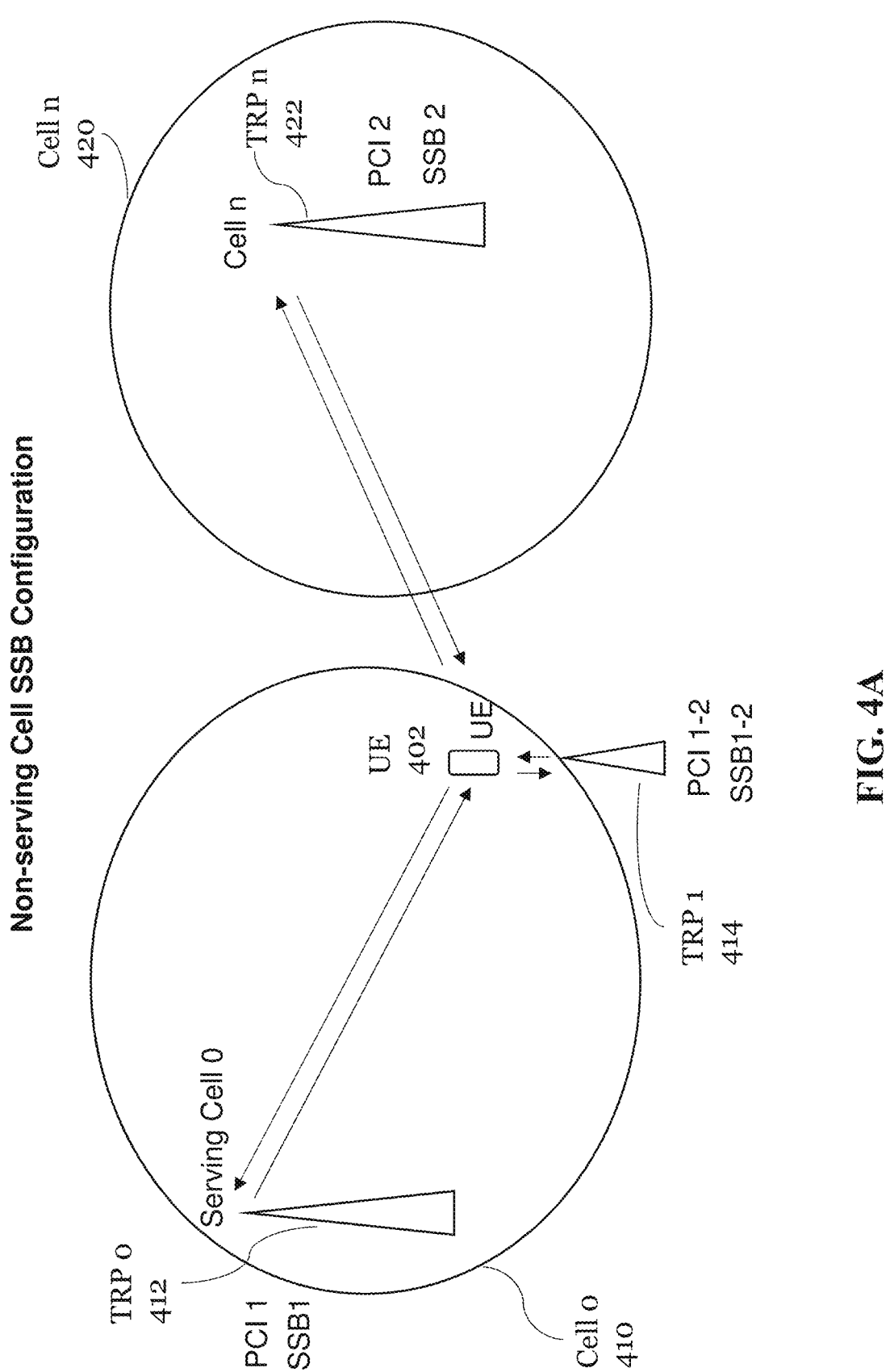
FIG. 4A illustrates an example of PCIs and SSBs according to example embodiments presented herein.

In another embodiment, the UE may calculate an estimated pathloss based on configuration parameters from the UE's serving cell and a non-serving cell differentiated by the PCI of each cell. See FIG. 4A for an example of the UE in a non-serving cell SSB configuration. The UE receives the PCI of its serving cell and receives a second PCI from a non-serving cell, different from a PCI of any serving cell of the UE. The UE also receives from the non-serving cell, a second SSB configuration associated with the second PCI. The second SSB configuration comprises at least an SSB transmission power indication, periodicity indication, and without carrier frequency or subcarrier spacing. In this embodiment, the UE calculates an estimated pathloss in accordance with at least the second SSB transmission power indication and transmits a UL signal or channel in accordance with the estimated pathloss and the second group of parameters. That is, when the UE sends a UL signal or channel to the non-serving cell or any TRP of the non-serving cell, the UE uses the second SSB power value to derive the pathloss toward the non-serving cell, and then calculates the transmission power for the UL signal or channel, and applies the transmission power to the UL signal or channel transmission.

In a new concept for "horizontal resource aggregation" or non-co-location" (NCL) in M-TRP:

In CA, "vertical" carrier-level resources at the same location are aggregated for a UE.

For the new concept, the same carrier is looked at but with non-co-located M-TRP resources in an embodiment.

Multiple non-co-located "horizontal" resources on the same carrier are aggregated for a UE in the embodiment.

This is a new category of resource aggregation.

An aggregated TRP may not have a PCID/SSB (e.g., intra-/inter-cell non-standalone TRP) or may have a PCID/SSB (e.g., a standalone TRP/cell), but in either case the resources provided by them may be differentiated by the UE from its serving cell resources due to the non-co-locality.

In an embodiment, UE assumptions/behavior/capability to support multiple NCLed groups of QCL assumptions/resources linking to multiple SSBs on the same carrier/OFDM symbol may include:

DL:

All DL signals/channels QCLed directly/indirectly to a TRS/SSB, and apply the QCL (including timing) for receiving these signals/channels. R16 uses CORESET pool index, so it has to be linked to TRS/SSB in R17, esp. for larger timing differences such as inter-cell M-TRP.

Support multiple cells (BWPs, SCSs) on one carrier, UE capability for M-TRP DL (w or w/o specifying multiple tracking loops on one carrier), esp. for inter-cell M-TRP.

UL:

All UL signals/channels shall QCL to DL TRS0/SSB0/PL RS0 & apply TAG0 TA.

PL RS should also be QCLed to TRS0/SSB0 (useful in sri PC cfg).

All UL signals/channels shall QCL to TRS1/SSB1/PL RS1 & apply TAG1 TA.

PL RS should also be QCLed to TRS1/SSB1.

Support multiple TRPs on one carrier:

Use signal/channel QCL and UE behaviour to implicitly specify TRPs or "groups."

A more explicit grouping configuration is also possible, based on CORESET pool index and/or equivalently TAG-id.

Applies to all UL, SRS, PUSCH, PUCCH, PTRS, DMRS.

A DCI carrying TPC command needs to specify for which TRP (e.g., via CORESET pool ID implicitly, but then no cross-TRP indication or no good support of GC TPC), not just cell-specific.

Can adopt a design similar to SUL/UL, at least in GC TPC for PUSCH/PUCCH/SRS.

For TPC in UE-specific DCI, in M-DCI case, can use the DCI/TCI state to indicate the loop.

Each TRP may have up to 2 closed-loops.

SRS triggers: cross-TRP triggering and GC triggering.

More open-loop alpha-Po sets.

Collision handling and constraints: simultaneous Tx of PUSCH/PUCCH to M-TRPs may not be supported, antenna switching constraints.

Other related: M-TRP PUCCH/PUSCH/PDCCH repetition for URLLC and QCL/TCI, e.g., intra-group repetition, inter-group repetition, cross-group indication.

In an embodiment for M-TRP UL TA:

UE behavior for TA may also be defined.

Each TA offset may be applied relative to the corresponding DL signal (the first path, the strongest path, or the OFDM symbol starting boundary inferred by the UE).

More generally, the TA offset is the time difference between the UL transmission (UL signal starting time, or UL OFDM symbol starting time) and the corresponding DL signal (the first path, the strongest path, or the OFDM symbol starting boundary inferred by the UE).

There may be different ways for the UE to infer the symbol boundary.

FIGS. 12A-D illustrate example options. For Options 1-3 with only one UL TA offset and/or only one UL TA reference timing, there may exist some cases that a TRP will experience UL receive timing offset much longer (such as twice as long) than the TRP timing synchronization difference or propagation delay difference. Thus, the UL timing issue may be a more severe issue than DL timing issue.

FIG. 5 illustrates a table 500 showing example groups of IDs configured for different TRPs. The table 500 shows three groups of IDs 510, i.e., a first group of IDs for a first group of signals for a first TRP1 associated with a RG1 (and possibly a first beam), a second group of IDs for a second group of signals for a second TRP2 associated with a RG2 (and possibly a second beam), and a third group of IDs for a third group of signals for a third TRP3 associated with a RG3 (and possibly a third beam). Each group of IDs includes ID1-ID7. ID1 520 of these groups is supported in R15/16 for PL CSI-RS. R15/16 generally uses a PCID for ID2-ID7, and requires fast backhaul. Each group of IDs may be pre-configured and re-configured for an associated RG. A UE may transmit or receive with a TRP using a group of IDs associated with a RG of the TRP.

A UE may receive a physical downlink control channel (PDCCH). The PDCCH may be associated with a control resource set (CORESET) with a first CORESET pool index, or has a DMRS that is configured to be QCLed to a SSB or a TRS QCLed to the SSB. The DL RS may be QCLed to the SSB, may be the SSB, may be a CSI-RS QCLed to the SSB or the TRS, or may be a TRS QCLed to the SSB. If the SSB or TRS is associated with a serving cell of the UE, e.g., the cell 310 in FIG. 3, the UE may transmit/receive with the serving cell, and the signals/channels/IDs for the RG of the serving cell over the carrier are used. In this case, the PDCCH may be transmitted by the serving cell of the UE via a TRP associated with the serving cell, such as the TRP0 312.

Embodiments are provided for UE to receive DL transmissions in a M-TRP deployment scenario. As can be seen before, many of the UL related operations depend on DL operations. The following deployment scenario related assumptions are considered. DL timing difference between the M-TRPs (especially inter-cell TRPs) may cause the CP or one FFT insufficient. How well the time/frequency synchronization between the M-TRPs is may depend on the backhaul assumption. If ideal backhaul can be assumed, then likely the timing/frequency differences between the TRPs are negligible; otherwise non-negligible synchronization errors should be considered in the design. Regarding backhaul latency and coordination, generally, at least for inter-cell TRPs, ideal/fast backhaul cannot be assumed. Backhaul latency of a few milliseconds to a couple of tens of milliseconds and semi-static coordination should be considered in the design. Inter-TRP signal delay spread relative to the CP length should also be considered. Depending on the synchronization among the inter-cell TRPs and the relative distances of the TRPs to the UE, the possible assumptions are: 1) The inter-cell signal delay spread is within the CP length but close to the CP length, i.e., even though the inter-TRP signal delay spread is within the CP length, the arrive time difference from the TRPs may still be large. The UE may still need to have the capability of supporting multiple tracking loops and FFT windows in DL in order to improve its signal reception performance. 2) The inter-cell signal delay spread is longer than the CP length, then multiple tracking loops and FFT windows are needed in this case. An embodiment is that multiple tracking loops and FFT windows are used on the same carrier on the same OFDM symbol for a UE to receive PDSCH/PDCCH from multi-TRPs. The standards may specify UE assumptions/behavior under multiple QCL/TCI states so that the UE can correctly use the tracking loop and FFT window to receive a PDCCH/PDSCH. The UE may maintain multiple FFT windows (i.e., DL fine timing synchronization), and apply the FFT windows on the same carrier on the same OFDM symbol based on the multiple TCI states for DL receptions from multiple TRPs, in which a first fine timing/first FFT window is associated with a first TCI state, a first PDCCH/PDSCH, and a first TRP, and a second fine timing/first FFT window is associated with a second TCI state, a second PDCCH/PDSCH, and a second TRP. On the other hand, only the minimum UE assumptions may be specified, such as "the UE assumes multiple QCL assumptions that respectively link to multiple SSBs (directly or indirectly through one or more RS) on the same carrier on the same OFDM symbol based on the multiple TCI states for DL receptions" or "the UE shall have capability to receive simultaneously transmissions associated with more than one RG, wherein each RG may be associated with a DL time and frequency synchronization". At its minimum, for DL, standards may specify only general UE behaviors such as "the UE shall process the M-TRP DL receptions on a carrier based on their associated TCI states". Exactly how the UE operates may not need to be standardized, and whether the UE should support multiple tracking loops and multiple FFT windows can be left for UE implementation. For example, a UE may apply the same receiving timing to DL signals arriving at different timings, or apply different receiving timings to DL signals arriving at different timings. Regardless whether the standards specify UE assumptions and/or behaviors, the UE needs to have the capability to receive inter-cell multi-TRP with delay spread comparable or longer than the CP length if supported in Rel-17, and the capability may be standardized and tested by performance testing, which may be the minimum standard impact for the DL UE assumptions/behavior/capability.

Note that in the prior art, on the same time-frequency resources the QCL assumptions link to at most one SSB directly/indirectly, but here the QCL assumptions link to more than one SSB directly/indirectly to support more general M-TRP operations. The UE can link PDCCH as well as other transmissions/receptions to the inter-cell TRP via the QCL relation linking to the non-serving SSB, and hence the CORESET pool indexes may not need to be explicitly configured in this case. A CORESET configured with TCI state(s) including QCL to the serving SSB directly or indirectly is for the TRP associated with the serving SSB, i.e., effectively assigned with CORESETPoolIndex 0, and a CORESET configured with TCI state(s) including QCL to the non-serving SSB directly or indirectly is for the TRP associated with the non-serving SSB, i.e., effectively assigned with CORESETPoolIndex 1. In an embodiment, the CORESETPoolIndex is used to identify each RG. The UE does not expect a CORESET configured with TCI state(s) including QCL to both the serving SSB and the non-serving SSB, directly or indirectly. To support reception with multiple tracking loops and FFT windows, the UE needs to have the capability to receive inter-cell multi-TRP with delay spread comparable or longer than the CP length, which may require some duplicated hardware. This is in parallel to UL transmissions with the new UE behavior and capability to acquire, maintain, and apply multiple TAs. These capabilities are generally similar to UE CA capability but the aggregation of additional radio resources are on the same carrier, and can be used jointly with CA capabilities, i.e., a UE may support 5 component carriers (CCs), and on each CC it may support 2 TRPs, then the UE needs to have the capability to aggregate 10 PDSCH transmissions simultaneously. All DL signals/channels (PDSCH/PDCCH/DMRS/CSI-RS/CSI-IM/PTRS/etc.) should be QCLed to a TRS/SSB directly or indirectly, and similarly, all UL signals/channels (PUCCH/PUSCH/SRS/DMRS/PTRS/PRACH) should also be QCLed (or via spatial relation, via pathloss RS relation, etc.) to a TRS/SSB and belong to the TAG associated with that TRS/SSB.

FIG. 6 illustrates a diagram 600 of example messages exchanged and processing performed by devices participating in an M-DCI M-TRP communication on one carrier. Diagram 600 shows messages exchanged and processing performed by a TRP0 602, a UE 604, and a TRP1 606. The TRP0 602 is configured as a serving cell (broadcasting SSB0/PCID0 of the serving cell) of the UE 604 over a carrier, and the TRP1 606 is a co-channel serving TRP of the UE 604. Generally, the serving cell broadcasts a SSB0/PCID0 of the serving cell, but in some embodiments for intra-band carrier aggregation (CA), a SCell may not transmit a SSB, and the signals/channels for the SCell are QCLed to a SSB of another serving cell on another carrier within the same frequency band of the same TRP. For example, the UE 604 is configured with two (2) carriers (e.g., carriers A and B) within a band, on carrier A, the UE 604 is configured with a cell A with a first SSB, and on carrier B, the UE is configured with a cell B without SSB (e.g., specified by higher layer parameter scellWithoutSSB). The signals/channels for the cells are transmitted/received by the TRP0 602. The UE 604 receives the first SSB on cell A but not on cell B, and the signals/channels for the cell B are QCLed directly/indirectly with the first SSB on the cell A. Likewise, on the TRP1 606, TRS may not be transmitted on the carrier (e.g., first carrier) but may be transmitted on a second (different) carrier that the TRP1 606 is also operating on and configured to the UE 604, and signals/channels to/from the TRP1 606 on the first carrier may be QCLed directly/indirectly with the TRS transmitted on the second carrier. The SSB0 may be transmitted on the carrier or on a different carrier, and the TRS0 may be transmitted on the carrier or on a different carrier, and other signals/channels may be QCLed to the SSB0 and/or TRS0. The UE 604 may receive a TRS1 or SSB1 from the TRP1 606, and also receive configuration information of a separate RG from the TRP1 606 (step 618). The SSB1 may be transmitted on the carrier or on a different carrier (similar to the above scellWithoutSSB description for the TRP0 602), and the TRS1 may be transmitted on the carrier or on a different carrier (similar to the above description for the TRP1 606 without transmitting a TRS on the carrier), and other signals/channels may be QCLed to the SSB1 and/or TRS1. The UE 604 may monitor CSI-RSs (CSI-RS1) with a CSI-RS ID (CSI-RS ID1) from the TRP1 606 (step 1020). The CSI-RS1 may be scrambled using the CSI-RS ID1. The UE 604 receives a PDCCH order (DCI PDCCH order) associated with a CORESET pool (Coreset pool 1) (step 1024). The PDCCH in 628 may have an associated DMRS and indicate a PDSCH with an associated DMRS, which are transmitted based on the Coreset pool 1 and using a scrambling ID1 of the TRP1 606 (scramblingID1). PUSCH in 630 may have an associated DMRS. The PUSCH is scrambled using a PUSCH scrambling ID (PUSCH scramblingID1), and the DMRS is scrambled using a PUSCH DMRS scrambling ID (PUSCH DMRS scramblingID1). The UE 604 may transmit to the TRP1 606, one or more PUCCHs (scrambled using the PUCCH scramblingID1), PUSCHs (scrambled using the PUSCH scramblingID1) with associated DMRS (scrambled using the PUSCH DMRS scramblingID1), and/or SRS (scrambled using a SRS ID1). In general, the RG0 parameters (e.g., IDs, timings) and RSs (e.g., TRS, CSI-RS, DMRS) and channels (e.g., PDSCH, PUSCH, etc.) are used to communicate with TRP0 602, and the RG1 parameters (e.g., IDs, timings) and RSs (e.g., TRS, CSI-RS, DMRS) and channels (e.g., PDSCH, PUSCH, etc.) are used to communicate with TRP1 606.

The PUSCH scramblingID may be called dataScramblingIdentityPUSCH, and for the M-TRPs they may be called dataScramblingIdentityPUSCH and dataScramblingIdentityPUSCH2 (or AdditionaldataScramblingIdentityPUSCH). In addition, if a higher layer signaling index per CORESET is configured such as CORESETPoolIndex is configured, dataScramblingIdentityPUSCH is associated with a higher layer signaling index per CORESET and is applied to the PUSCH scheduled with a DCI detected on a CORESET with the same higher layer index, e.g., dataScramblingIdentityPUSCH is associated with CORESETPoolIndex being 0 (or no explicit index), and AdditionaldataScramblingIdentityPUSCH is associated with CORESETPoolIndex being 1. The DMRS for the PUSCH may be done likewise, which generally have another set of scrambling identities and now need to be increased for M-TRP PUSCH DMRS.

In Rel-16 design, the SSB of an inter-cell TRP cannot be configured/acquired based on existing standardized mechanisms for serving cells (PCell and SCells) in most of the features. The exception is for the UE sounding procedure for positioning purposes, so that the UE can transmit SRS based on the pathloss to a neighboring/non-serving cell. Some related excerpts from TS38.214 and TS38.331 are:

---

6.2.1.4 UE sounding procedure for positioning purposes

---

When the SRS is configured by the higher layer parameter SRS-PosResource-r16 and if the higher layer parameter spatialRelationInfoPos-r16 is configured, it contains the ID of the configuration fields of a reference RS according to Clause 6.3.2 of [TS 38.331]. The reference RS can be an SRS configured by the higher layer parameter SRS-Resource or SRS-PosResource-r16, CSI-RS, SS/PBCH block, or a DL PRS configured on a serving cell or a SS/PBCH block or a DL PRS configured on a non-serving cell.
The UE is not expected to transmit multiple SRS resources with different spatial relations in the same OFDM symbol.
If the UE is not configured with the higher layer parameter spatialRelationInfoPos-r16 the UE may use a fixed spatial domain transmission filter for transmissions of the SRS configured by the higher layer parameter SRS-PosResource-r16 across multiple SRS resources or it may use a different spatial domain transmission filter across multiple SRS resources.
The UE is only expected to transmit an SRS configured the by the higher layer parameter SRS-PosResource-r16 within the active UL BWP of the UE.
When the configuration of SRS is done by the higher layer parameter SRS-PosResource-r16, the UE can only be provided with a single RS source in spatialRelationInfoPos-r16 per SRS resource for positioning.
For operation on the same carrier, if an SRS configured by the higher parameter SRS-PosResource-r16 collides with a scheduled PUSCH, the SRS is dropped in the symbols where the collision occurs.
The UE does not expect to be configured with SRS-PosResource-r16 on a BWP not configured with PUSCH/PUCCH transmission.

---

SSB-InfoNCell field descriptions

--- physicalCellId
This field specifies the physical cell ID of the neighbour cell for which SSB configuration is provided.
ssb-IndexNcell
This field specifies the index of the SSB for a neighbour cell. See TS 38.213 [13]. If this field is absent, the UE determines the ssb-IndexNcell of the physicalCellId
based on its SSB measurement from the cell.
ssb-Configuration
This field specifies the full configuration of the SSB. If this field is absent, the UE obtains the configuration for the SSB from nr-SSB-Config received as part of DL PRS assistance data in LPP, see TS 37.355 [49], by looking up the corresponding SSB configuration using the field physicalCellId.

-continued

| 6.2.1.4 UE sounding procedure for positioning purposes |
|---|
| pathlossReferenceRS-Pos-r16     CHOICE { |
|    ssb-IndexServing-r16     SSB-Index, |
|    ssb-Ncell-r16     SSB-InfoNcell-r16, |
|    dl-PRS-r16     DL-PRS-Info-r16 |
|   } |
| OPTIONAL, -- Need M |

| ssb-IndexSevingcell |
|---|
| Indicates SSB index belonging to a serving cell |
| ssb-NCell |
| This field indicates a SSB configuration from neighboring cell |

As a starting point for the enhancements, once the non-serving cell's PCI/SSB/RS are configured for the UE, they may be further configured for QCL/TCI states for the UE. Therefore, the Rel-16 scheme for a non-serving cell's SSB/RS configuration can be reused as much as possible.

As analyzed above, Rel-17 design should reuse the Rel-16 scheme for neighbor cell SSB/RS configuration as much as possible. However, in Rel-16, the neighbor cells may have different parameters such as BWP bandwidth, SCS, etc., than the serving cell's, and hence those parameters may need to be configured for the UE. In Rel-17 M-TRP, however, those parameters are the same as the serving cell's, and hence the UE may ignore those parameters, or to avoid any ambiguity, those parameters may be removed from the configuration. As an example:

```
SSB-R17 ::=                SEQUENCE {
    pci                    PhysCellId
    periodicity            ENUMERATED {sf5, sf10, sf30, sf40,
sf80, spare3, spare2, spare1}
        ssb-Timingoffset   INTEGER (0..127),
        ssb-Duration       ENUMERATED {sf1, sf2, sf3, sf4,
                           sf5},
    tag-Id       Tag-Id
}
SSB-Configuration-r17 ::=  SEQUENCE {
    carrierFreq-r17            ARFCN-ValueNR,
    halfFrameIndex-r17         ENUMERATED {zero, one},
    ssbSubcarrierSpacing-r17   SubcarrierSpacing,
    ssb-periodicity-r17        ENUMERATED { ms5, ms10,
ms30, ms40, ms80, ms160, spare2,spare1 }   OPTIONAL, -- Need S
    smtc-r17                   SSB-MTC
OPTIONAL, -- Need S
    sfn-Offset-r17             INTEGER (0..maxNrofFFS-r16),
    sfn-SSB-Offset-r17         INTEGER (0..15),
    ss-PBCH-BlockPower-r17     INTEGER (−60..50)
OPTIONAL -- Cond Pathloss
        tag-Id       Tag-Id
}
SSB-InfoNcell-r17 ::=      SEQUENCE {
    physicalCellId-r17         PhysCellId,
    ssb-IndexNcell-r17         SSB-Index,
    ssb-Configuration-r17        OPTIONAL -- Need M
}
```

When configuring the neighbor cell's SSB to the UE, due to the synchronization offset between the serving cell and the neighbor cell, the UE may need to perform a search within a time window for the PSS/SSS. This is a bit similar to LTE DRS design. Then the SSB search time window should be optionally configured for the UE. That is, the network may configure an optional SSB search time window when configuring a neighbor cell's SSB/PCI to a UE. In an embodiment, a TRS search time window may also be considered.

Then TRS/CSI-RS/DMRS/SRS of the inter-cell TRP can be QCLed to the SSB, directly or indirectly via other RS. For example, in the case of SDM with overlapping time/frequency resources, the multiple PDSCH DMRS ports are QCLed to TRS/CSI-RS of the respective TRPs (e.g., QCL Type A), and the TRS/CSI-RS are further QCLed to the SSBs of the respective TRPs (e.g., QCL Type C); in this case, the PDSCH DMRS ports are QCLed to the SSBs indirectly but the TRS/CSI-RS are QCLed to the SSBs directly. For another example, in the case of SDM with overlapping time/frequency resources, the multiple PDSCH DMRS ports may be directly QCLed to the SSBs of the respective TRPs (e.g., QCL Type A). Note that the PDSCH DMRS ports cannot be in one CDM group as they are for inter-cell TRPs, and DMRS ports in one CDM groups should be QCLed to the same source RS directly or indirectly. Likewise, PDCCH DMRS ports also need to have such QCL/TCI states configured, but the PDCCH DMRS ports for one PDCCH are all from one TRP except for SFN. FDM/TDM can also be considered in similar but generally simpler ways.

In addition, the UL signal relation to some other signals, such as the pathloss RS relation, the spatial relation info, the relation defined by SRI, etc., may be generally viewed as extended QCL relation. Thus, each UL signal, such as SRS and PUCCH/PUSCH DMRS, can be "QCLed" to a SSB directly or indirectly.

Therefore, allowing all existing QCL types and DL-UL spatial relation information and SRI and PL RS relation, and allowing source RS to be SSB, TRS, CSI-RS, and SRS, and target RS to be TRS, CSI-RS, DL DMRS, SRS, and UL DMRS would be advantageous in M-TRP scenarios.

Table 1 below shows numbers of PCID per carrier, for existing 3GPP standards (Releases) and new embodiments. For all existing configurations, at most 1 PCID/RG/TAG configuration can be allowed for a carrier, even if multiple TRPs may be on the carrier. With the embodiment designs, more than 1 PCID/RG/TAG configuration may be allowed for a carrier.

TABLE 1

|  | # PCIDs/carrier | # RGs/carrier |
|---|---|---|
| R15 | 1 | 1 |
| R16 intra-cell M-TRP | 1 | 1 |
| CA | 1 | 1 |
| DC | 1 | 1 |
| Embodiment intra-cell M-TRP | 1 | 2 |
| Embodiment inter-cell M-TRP | 2 | 2 |

FIG. 7 illustrates a table 700 showing example M-TRP scenarios for RGs and observation as a result of analysis of the scenarios. In this example, "Cell w/SSB" refers to a standalone cell with a standalone SSB/PCID; a TRP of the cell broadcasts the SSB/PCID. "TRP w/o SSB" refers to a non-standalone TRP without a standalone SSB/PCID, or non-standalone TRP that can share a SSB/PCID with a standalone cell; the TRP itself does not transmit a SSB/ PCID. "Tightly synched" refers to two TRPs synchronized with a timing error of at most a few percent of a CP length, i.e., generally negligible. Table 700 shows 8 example scenarios (scenarios 1-8) including situations such as cell and TRPs (cell/TRPs) that are tightly synchronized, cell/TRPs that are not tightly synchronized, cell/TRPs with fast backhaul, cell/TRPs with no fast backhaul, cell/TRPs with single-downlink control information (S-DCI) or multi-DCI (M-DCI). The analysis shows that at least for large cells or not-tightly synched cell/TRPs, separate RGs are desirous. In all the scenarios, separate RGs may be configured for separate TRPs, for better UL/DL transmission quality. RGs may not be cell-based, but TRP-based, e.g., a cell with an associated SSB may be configured as a TRP, not as a serving cell.

Figure 8:
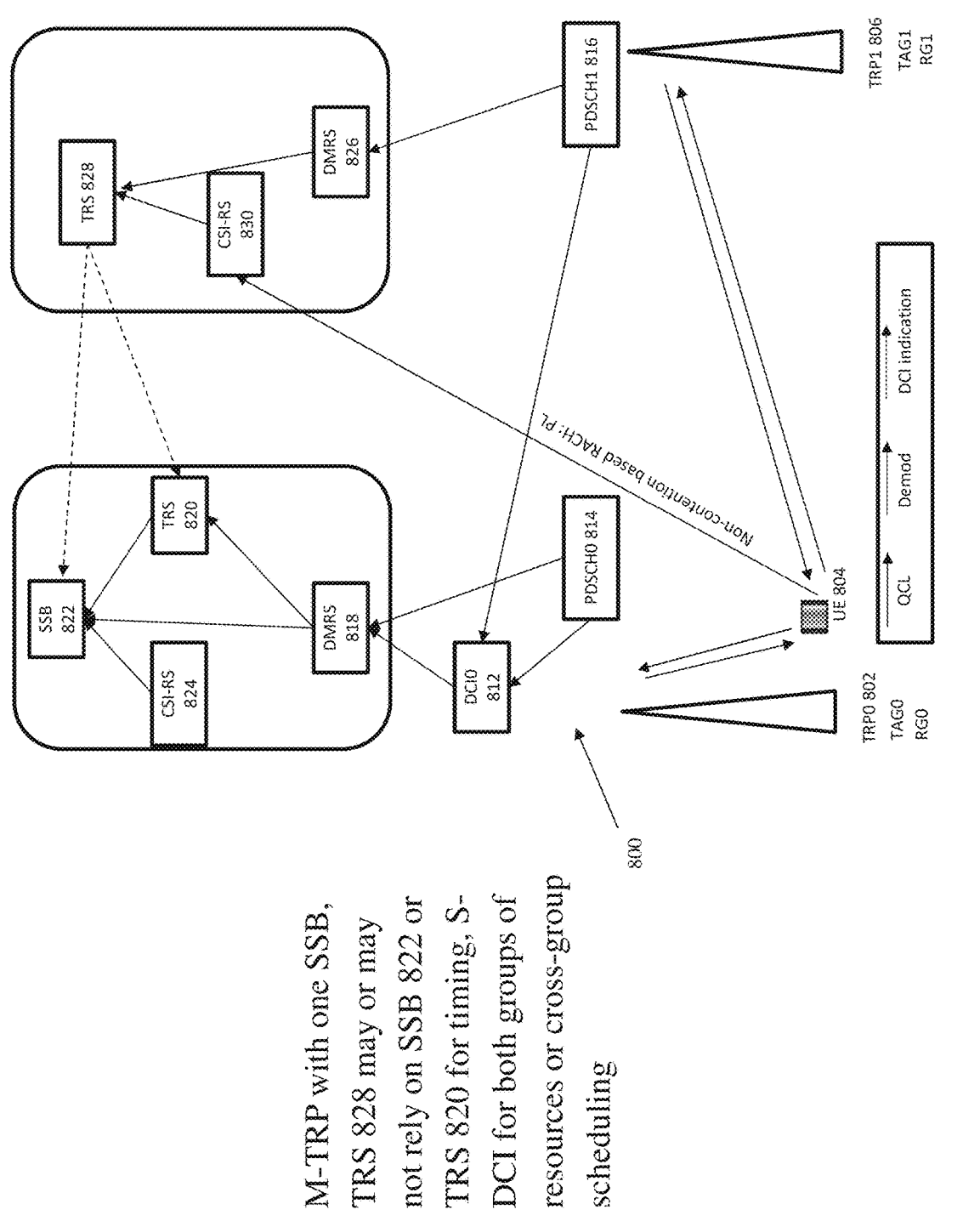
FIG. 8 illustrates a diagram of an example scenario in FIG. 7 according to example embodiments presented herein.

FIG. 8 illustrates a diagram 800 of the example scenario 1 shown in Table 700 of FIG. 7. The diagram 800 shows a TRP0 802 configured as a serving cell of a UE 804 over a carrier. A TRP1 806 not configured as a serving cell of the UE 804 over the same carrier is non-co-located with the TRP0 802. The TRP0 802 and the TRP1 806 provide M-TRP communication services to UEs in the serving cell. In this example, the TRP0 802 and the TRP1 806 are synchronized with each other and have fast backhaul between the TRP0 802 and the TRP1 806. Separate RGs (i.e., RG0 and RG1) may be configured for the TRP0 802 and the TRP1 806. The resulting benefits include improved UL/DL spectrum efficiency (SE). Using TA acquisition as an example because it involves almost all signals/channels in UL/DL. The TRP0 802 transmits, to the UE 804, a PDCCH order instructing the UE 804 to initiate a random access procedure, and the PDCCH order may indicate which of the TRP0 802 and the TRP1 806 that the UE 804 is to perform the random access procedure with. For example, the PDCCH order may request the UE 804 to send a RACH preamble to the TRP1 806, or to the TRP0 802. The TRP0 802 also transmits DCI (DCI0 812) to the UE 804 scheduling a PDSCH (PDSCH0 814) from the TRP0 802, or a PDSCH (PDSCH1 816) from the TRP1 806, and the DCI/ PDSCH may be the RAR as part of the random access procedure, or may be for other DL data transmissions. In this example, only the TRP0 802 sends DCI to the UE 804 (i.e., S-DCI). DMRS (DMRS 818) is used for modulation/de- modulation of the DCI0 812 and the PDSCH0 814. The DMRS 818 may be QCLed to a TRS 820 of the TRP0 802. The TRS 820 of the TRP0 802 may be QCLed to a SSB 822 associated with the serving cell (the TRP0 802). The TRP0 802 may also transmit CSI-RS 824 to the UE 804 for channel measurement. The CSI-RS 824 may be QCLed to the SSB 822 or QCLed to the TRS 820. DMRS (DMRS 826) is used for modulation/demodulation of the PDSCH1 816 of the TRP1 806. The DMRS 826 may be QCLed to a TRS 828 of the TRP1 806. The TRP1 806 not configured as the serving cell does not have an associated SSB. The TRP1 806 transmits the TRS 828, and the TRS 828 may be QCLed to the SSB 822 or QCLed to the TRS 820 with a weak QCL assumption (such as QCL Type C, or even QCL for average delay only). In general, for TRPs not co-located, they may only share rough/coarse time/frequency synchronization such as slot/OFDM symbol boundaries and subcarrier/PRB alignment, but not Doppler shift, Doppler spread, average gain, delay spread, spatial receive parameters, etc. However, if the TRPs are not too far away from each other and tightly synchronized, QCL Type C to the SSB 822 or TRS 820 may be assumed. The TRP1 806 may send CSI-RS 830 to the UE 804, base on which the UE 804 may estimate PL between the UE 804 and the TRP1 806, and send a RACH preamble (e.g., non-contention based) in a random access procedure to the TRP1 806 based on the estimated PL. The CSI-RS 830 may be QCLed to the TRS 828. In this example, the PL is based on the CSI-RS of the TRP1 806, and the RACH to the TRP1 806 is based on the PL. However, other steps of the random access procedure are performed between the UE 804 and the TRP0 802 based on the TRP0 802 and a PCID associated with the SSB 822 (this is similar to what is specified in R16). An example configuration of the separate TAGs for the TRP0 802 and the TRP1 806 is shown. In an embodiment, the TRS 828 is not QCLed to SSB 822 or TRS 820, but the UE needs to search the TRS 828 similar to a discovery signal (DS) within a search time window.

Figure 9:
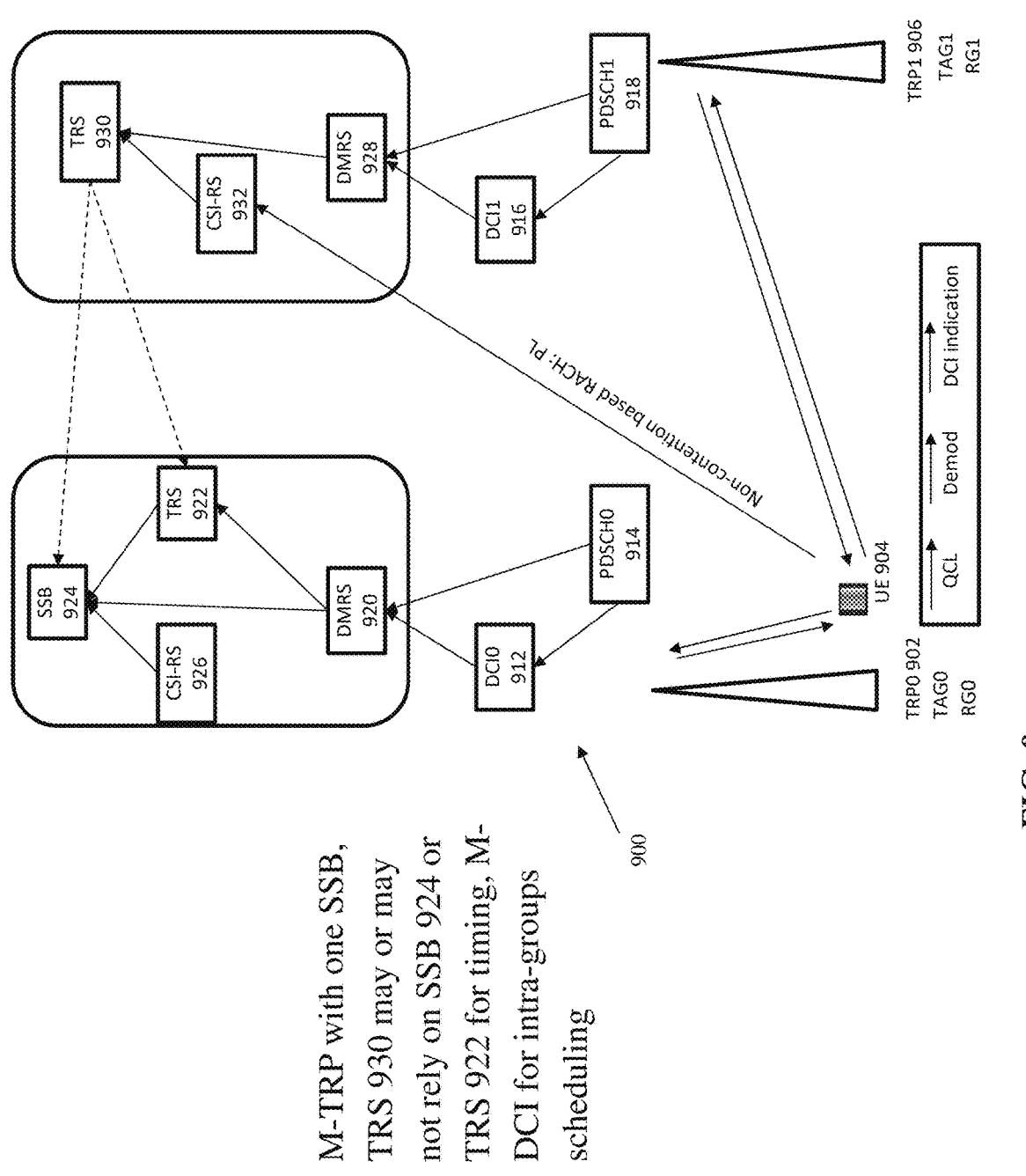
FIG. 9 illustrates a diagram of another example scenario in FIG. 7 according to example embodiments presented herein.

FIG. 9 illustrates a diagram 900 of the example scenario 2 shown in Table 700 of FIG. 7. The diagram 930 shows a TRP0 902 configured as a serving cell of a UE 904 over a carrier. A TRP1 906 not configured as a serving cell of the UE 904 is co-channel with the TRP0 902. The TRP0 902 and the TRP1 906 provide M-TRP communication services to UEs in the serving cell. In this example, the TRP0 902 and the TRP1 906 are synchronized with each other and have fast backhaul between the TRP0 902 and the TRP1 906. Separate RGs (i.e., RG0 and RG1) are configured for the TRP0 902 and the TRP1 906.

Different from the scenario 1 of FIG. 8, in this example, each of the TRP0 902 and the TRP1 906 may send a PDCCH order instructing the UE 904 to initiate a random access procedure with a TRP, i.e., the TRP0 902 or the TRP1 906. For example, the TRP0 902 may send a PDCCH order requesting the UE 904 to send a RACH preamble to the TRP0 902 or to the TRP1 906. Similarly, the TRP1 906 may send a PDCCH order requesting the UE 904 to send a RACH preamble to the TRP0 902 or to the TRP1 906. In an example, the PDCCH order may include an indication to indicate which of the TRP0 902 or the TRP1 906 that the UE 904 is to send the RACH preamble to. In another example, the PDCCH order does not include such indication, and the UE 904 determines that the TRP who sends the PDCCH order is the one that the UE 904 is to send the RACH preamble to. The TRP0 902 and the TRP1 906 transmit their respective DCI for scheduling their respective PDSCHs. For example, as shown, the TRP0 902 transmits DCI (DCI0 912) to the UE 904 scheduling a PDSCH (PDSCH0 914) from the TRP0 902. The TRP1 906 transmits DCI (DCI0 916) to the UE 904 scheduling a PDSCH (PDSCH1 918) from the TRP1 906. In this example, both the TRP0 902 sends DCI to the UE 904 (i.e., M-DCI). The DCI/PDSCH may be the RAR as part of the random access procedure, or may be for other DL data transmissions.

DMRS (DMRS 920) is used for modulation/demodula- tion of the DCI0 912 and the PDSCH0 914. The DMRS 920 may be QCLed to a TRS 922 of the TRP0 902. The TRS 922 of the TRP0 902 may be QCLed to a SSB 924 associated with the serving cell (the TRP0 902). A CSI-RS 926 of the TRP0 902 may be QCLed to the SSB 924. DMRS (DMRS 928) is used for modulation/demodulation of the DCI1 916 and the PDSCH1 918 of the TRP1 906. The DMRS 928 may be QCLed to a TRS 930 of the TRP1 906. The TRP1 906 not configured as a serving cell of the UE 904 does not have an associated SSB. The TRP1 906 may send CSI-RS 932 to the UE 904, base on which the UE 904 may estimate PL between the UE 904 and the TRP1 906, and send a RACH preamble (e.g., non-contention based) in a random access procedure to the TRP1 906 based on the estimated PL. The CSI-RS 932 may be QCLed to the TRS 930. In this example, the PL is based on the CSI-RS of the TRP1 906, and the RACH to the TRP1 906 is based on the PL. However, other steps of the random access procedure are performed between the UE 904 and the TRP0 902 based on the TRP0 902 and a PCID associated with the SSB 924 (this is similar to what is specified in R16). An example configuration of the separate TAGs for the TRP0 902 and the TRP1 906 is shown. In an embodiment, the TRS 930 is not QCLed to SSB 924 or TRS 922, but the UE needs to search the TRS 930 similar to a discovery signal (DS) within a search time window.

Figure 10:
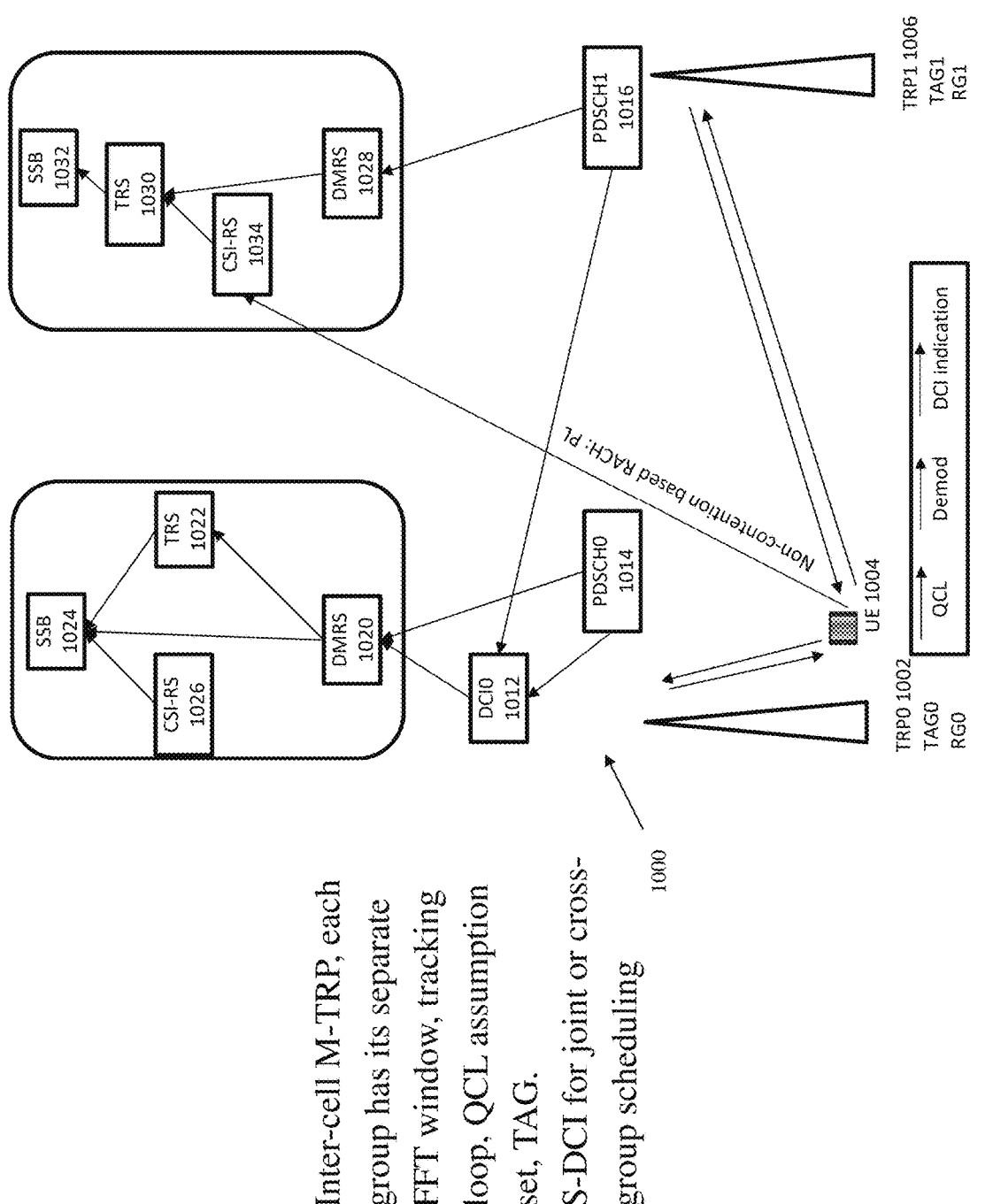
FIG. 10 illustrates a diagram of another example scenario in FIG. 7 according to example embodiments presented herein.

FIG. 10 illustrates a diagram 1000 of the example scenario 5 shown in Table 700 of FIG. 7. The diagram 1000 shows a TRP0 1002 configured as a serving cell of a UE 1004 over a carrier. The serving cell is associated with a SSB 1024. A TRP1 1006 is associated with a SSB 1030 but not configured as a secondary cell of the UE 1004. The TRP0 1002 and the TRP1 1006 provide M-TRP communication services to UEs over the carrier. In this example, the TRP0 1002 and the TRP1 1006 are synchronized with each other for communication between the TRP0 1002 and the TRP1 1006. Separate RGs (i.e., RG0 and RG1) are configured for the TRP0 1002 and the TRP1 1006. The TRP0 1002 may transmit, to the UE 1004, a PDCCH order instructing the UE 1004 to initiate a random access procedure, and may indicate which of the TRP0 1002 and the TRP1 1006 that the UE 1004 is to send a RACH preamble. For example, the PDCCH order may request the UE 1004 to send a RACH preamble to the TRP1 1006, or to the TRP0 1002. The TRP0 1002 transmits DCI (DCI0 1012) to the UE 1004 for scheduling a PDSCH (PDSCH0 1014) from the TRP0 1002, or a PDSCH (PDSCH1 1016) from the TRP1 1006, as part of the random access procedure, or may be for other DL data transmissions. In this example, only the TRP0 1002 sends DCI to the UE 1004 (i.e., S-DCI). DMRS (DMRS 1018) is used for modulation/demodulation of the DCI0 1012 and the PDSCH0 1014. The DMRS 1018 may be QCLed to a TRS 1020 of the TRP0 1002. The TRS 1020 of the TRP0 1002 may be QCLed to the SSB 1022 associated with the serving cell (the TRP0 1002). The TRP0 1002 may also transmit CSI-RS 1024 to the UE 1004 for channel measurement. The CSI-RS 1024 may be QCLed to the SSB 1022. DMRS (DMRS 1026) is used for modulation/demodulation of the PDSCH1 1016 of the TRP1 1006. The DMRS 1026 may be QCLed to a TRS 1028 of the TRP1 1006. Different from the scenario 1 of FIG. 8, in this example, the TRP1 1006 is associated with the SSB 1030. The SSB 1030 may be configured to associate with the TAG1, but not configured as a secondary cell (SCell) of the UE 1404. The TRS 1028 may be QCLed to the SSB 1030. The TRP1 1006 may send a CSI-RS 1032 to the UE 1004, base on which the UE 1004 may estimate PL between the UE 1004 and the TRP1 1006, and send a RACH preamble (e.g., non-contention based) in a random access procedure to the TRP1 1006 based on the estimated PL. The CSI-RS 1032 may be QCLed to the TRS 1028. In this example, the PL is based on the CSI-RS of the TRP1 1006, and the RACH to the TRP1 1006 is based on the PL. However, other steps of the random access procedure are performed between the UE 1004 and the TRP0 1002 based on the TRP0 1002 and a PCID associated with the SSB 1022 (this is similar to what is specified in R16). An example configuration of the separate TAGs for the TRP0 1002 and the TRP1 1006 is shown. The scrambling IDs used with TRP1 1006 may be based on the associated non-serving SSB, or may be configured for one or more of signals/channels for transmissions with the TRP1 1006.

Figure 11:
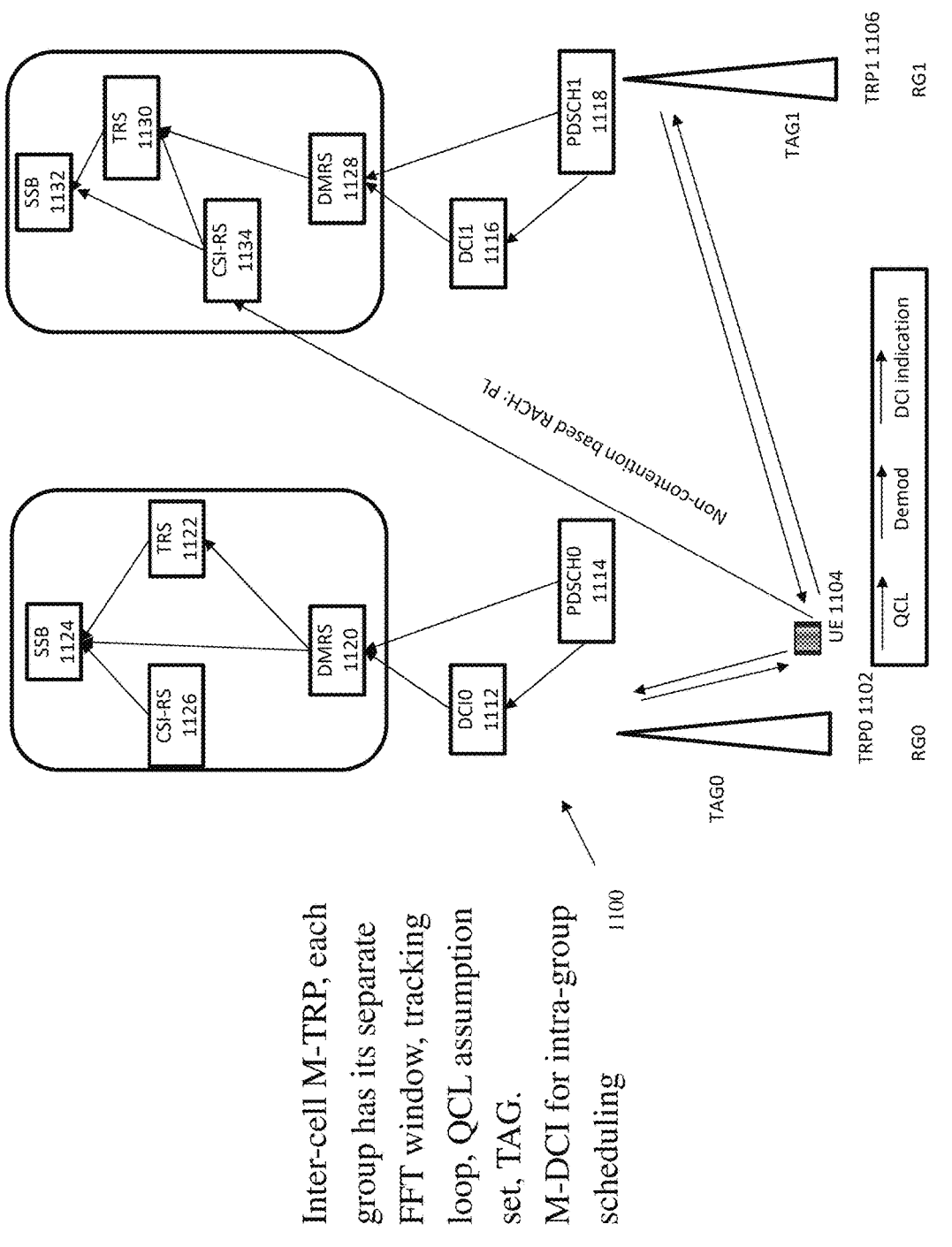
FIG. 11 illustrates a diagram of three example scenarios in FIG. 7 according to example embodiments presented herein.
Figure 12A:
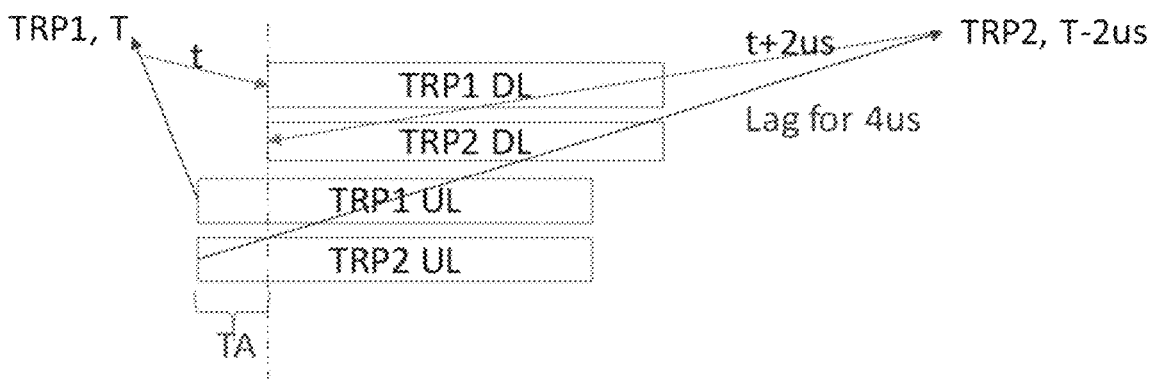
FIGS. 12A-12D illustrate examples of different TA offset options under different TRP synchronization settings according to example embodiments presented herein.
Figure 12B:
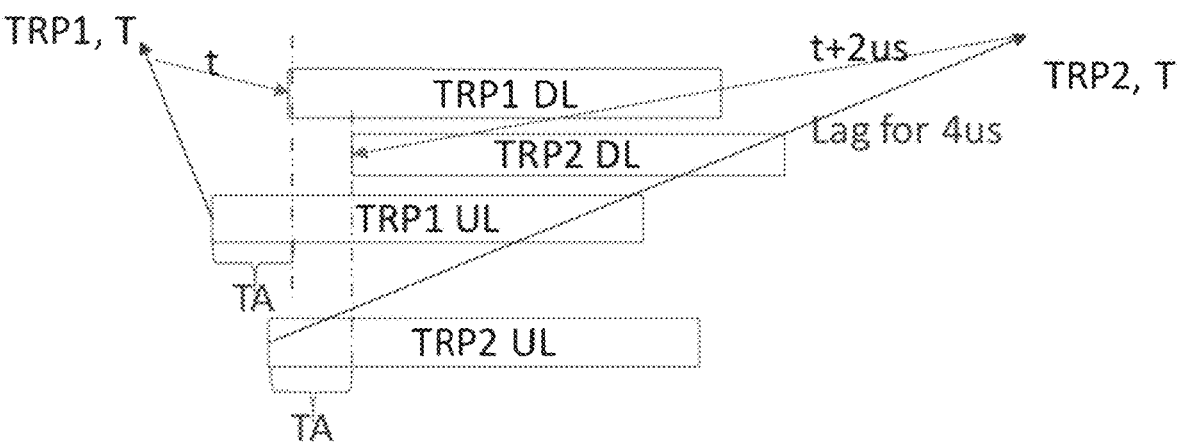
Figure 12C:
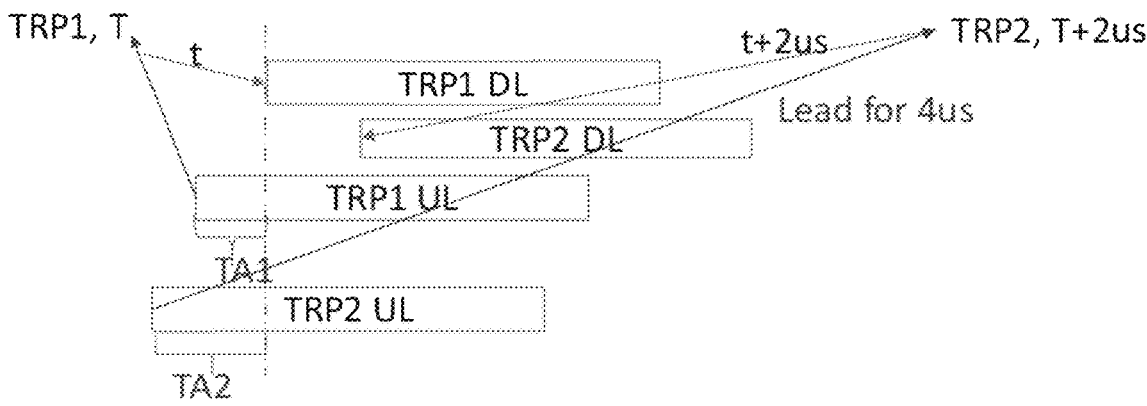
Figure 12D:
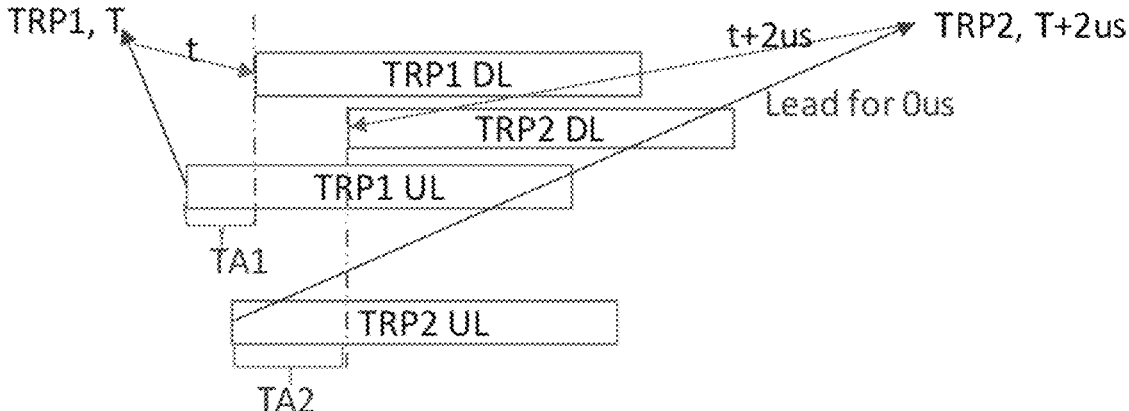

FIG. 11 illustrates a diagram 1100 of the example scenarios 6, 7, and 8 as shown in Table 700 of FIG. 7. The diagram 1100 shows a TRP0 1102 configured as a serving cell of a UE 1104 over a carrier. The serving cell is associated with a SSB 1124. A TRP1 1106 is associated with a SSB 1130, and the TRP1 1106 may be or not be configured as a secondary cell of the UE 1104 over the carrier. The TRP0 1102 and the TRP1 1106 provide M-TRP communication services to UEs over the carrier. In this example, the TRP0 1102 and the TRP1 1106 may be or may not be synchronized with each. Separate RGs (i.e., RG0 and RG1) are configured for the TRP0 1102 and the TRP1 1106. TRP0 1102 transmits TRS/CSI-RS/DMRS which can be QCLed to the associated SSB 1124, directly or indirectly via other RS. TRP1 1106 transmits TRS/CSI-RS/DMRS which can be QCLed to the associated SSB 1132, directly or indirectly via other RS. For example, in the case of spatial division multiplex (SDM) with overlapping time/frequency resources, multiple PDSCH DMRS ports are QCLed to TRS/CSI-RS of the respective TRPs (e.g., QCL Type A), and the TRS/CSI-RS are further QCLed to the SSBs of the respective TRPs (e.g., QCL Type A). For another example, in the case of SDM with overlapping time/frequency resources, the multiple PDSCH DMRS ports are directly QCLed to the SSBs of the respective TRPs (e.g., QCL Type A). Note that the PDSCH DMRS ports may not be in one CDM group as they are for different TRPs with non-negligible timing difference or far away from each other. Likewise, PDCCH DMRS ports may also need to have such QCL/TCI states configured, but the PDCCH DMRS ports for one PDCCH are all from one TRP. FDM/TDM may also be considered in similar but generally simpler ways.

Each of the TRP0 1102 and the TRP1 1106 may send a PDCCH order instructing the UE 1104 to initiate a random access procedure. In this example, a PDCCH order is linked to a TRP. That is, The PDCCH order itself implies that the UE 1104 initiate a random access procedure to the TRP linked with the PDCCH order. The TRP0 1102 and the TRP1 1106 transmit their respective DCI scheduling their respective PDSCHs. For example, as shown, the TRP0 1102 transmits DCI (DCI0 1112) to the UE 1104 scheduling a PDSCH (PDSCH0 1114) from the TRP0 1102. The TRP1 1106 transmits DCI (DCI0 1116) to the UE 1104 scheduling a PDSCH (PDSCH1 1118) from the TRP1 1106. In this example, both the TRP0 1102 sends DCI to the UE 1104 (i.e., M-DCI). DMRS (DMRS 1120) is used for modulation/demodulation of the DCI0 1112 and the PDSCH0 1114. The DMRS 1120 may be QCLed to a TRS 1122 of the TRP0 1102. The TRS 1122 of the TRP0 1102 may be QCLed to the SSB 1124 associated with the serving cell (the TRP0 1102). A CSI-RS 1126 may be QCLed to the SSB 1124. DMRS (DMRS 1128) is used for modulation/demodulation of the DCI 1116 and the PDSCH1 1118 of the TRP1 1106. The DMRS 1128 may be QCLed to a TRS 1130 of the TRP1 1106. The TRS 1130 of the TRP1 1106 may be QCLed to the SSB 1132 associated with the TRP1 1106.

The SSB 1132 may be configured to associate with the TAG1, but not configured as a SCell of the UE 1104. The TRS 1130 may be QCLed to the SSB 1132. The TRP1 1106 may send a CSI-RS 1134 to the UE 1104, base on which the UE 1104 may estimate PL between the UE 1104 and the TRP1 1106, and send a RACH preamble (e.g., non-contention based) in a random access procedure to the TRP1 1106 based on the estimated PL. The CSI-RS 1134 may be QCLed to the TRS 1140 or the SSB 1132. In this example, the PL is based on the CSI-RS of the TRP1 1106, and the RACH to the TRP1 1106 is based on the PL. However, other steps of the random access procedure (e.g., RAR) are performed between the UE 1104 and the TRP0 1102 based on the TRP0 1102 and a PCID associated with the SSB 1124 (this is similar to what is specified in R16). An example configuration of the separate TAGs for the TRP0 1102 and the TRP1 1106 is shown. The scrambling IDs used with TRP1 1106 may be based on the associated non-serving SSB 1132, or may be configured for one or more of signals/channels for transmissions with the TRP1 1106.

Embodiments for M-TRP PUCCH enhancement are provided here. In URLLC, to meet 1E-5 BLER requirement for data transmission, PUCCH reliability needs to be at least the same or better (i.e., lower) than 1E-5 BLER, preferably an order of magnitude better. In Rel-16, separate and/or joint A/N feedback in PUCCH is supported; for separate A/N, TDMed long and/or short PUCCH is supported, and each PUCCH resource may be associated with a higher layer index per CORESET; whereas for joint A/N, joint semi-static HARQ-ACK codebook can be used and A/N bits are concatenated in a certain order; switching between separate and joint A/N feedback is supported via RRC configuration. An embodiment is to extend above enhancement of PUCCH with ACK/NACK to PUCCH with CSI, including: 1) Allow separate and/or joint CSI feedback in PUCCH; 2) Distinguish URLLC-oriented CSI reporting vs non-URLLC-oriented CSI reporting, in terms the contents, format, repetition, collision handling, etc., an explicit bit may be used to signal the UE that a CSI is associated with higher priority so other transmission is dropped when colliding with the PUCCH carrying the CSI with higher priority; 3) TDM of M-TRP PUCCH, and PUCCH repetition in time domain (UE transmitting the same PUCCH multiple times to the same TRP) and spatial domain (UE transmitting the same PUCCH multiple times to multiple TRPs, respectively). An embodiment is to allow one PDCCH/PDSCH transmission followed by multiple (i.e., repetition) PUCCH A/N feedback; the UE may perform repeated A/N transmissions to one of the TRPs or both TRPs. This may be useful if the reliability of ACK/NACK feedback cannot reach the target BLER. An embodiment allows for soft combining/joint reception at the network side; whether it is feasible to perform soft combining/joint reception by multiple TRPs may depend on backhaul assumptions between the TRPs. However, for the same TRP, soft combining of repeated PUCCH transmission is always feasible.

In one embodiment, two options to enable TDMed PUCCH transmissions with different multiple spatial relation information are possible:

Option 1: multiple separate PUCCH resources, each associated with one spatial relation information; or Option 2: one PUCCH resource with multiple spatial relation information.

First, to enable TDMed PUCCH transmission with different beams towards different TRPs, multiple PUCCH spatial relation info needs to be configured/activated. There could be several ways to accomplish this. One is to specify multiple spatial relation info for the same PUCCH resource, and when the PUCCH resource is targeted to TRP1 then the spatial relation info 1 is to be used, and when the PUCCH resource is targeted to TRP2 then the spatial relation info 2 is to be used. However, it is questionable why the same PUCCH resource has to be used. The transmissions to the different TRPs differ in many respects, including spatial relation info, pathloss RS, power control parameters, TA, etc., and one could be configured with hopping whereas the other without hopping, or one could be of long format and the other be of short format, and so on. Therefore, a more natural way is to configure/activate separate PUCCH resources, each of which has its own parameters including the spatial relation info. If the PUCCH resources are mostly configured/activated/transmitted together (in a TDM fashion), they could be specified together as a PUCCH resource pair with an explicit/implicit association between them, so that the pair is activated/transmitted together, e.g., when one is activated, the other is also activated automatically, which may help reduce some signaling overhead in some cases.

In another embodiment, for M-TRP PUCCH power control, multiple separate sets of PUCCH power control parameters are configured, each set being associated with one TRP and including TRP-specific open-loop parameters, closed-loop parameters, and spatial relation info and/or pathloss RS.

In some implementations, one PUCCH resource is suggested to facilitate potential network-side soft combining over multiple PUCCH resources. However, it is possible to configure 2 PUCCH resources with the same number of REs, so that they encode the same UCI into same coded bits. So soft combining based on the 2 PUCCH resources is also possible. To enable soft combining, the 2 PUCCH transmissions need to have the same coding-related parameters but other parameters can be the same or different.

By the same token, multiple separate sets of PUCCH power control parameters should be configured. Each set is associated with a PUCCH resource or a PUCCH resource set if the resource set is specified to be used for a particular TRP. The association to a TRP is generally not explicit in the standards, and can be done via the pathloss RS which is associated with, or QCLed to a CSI-RS/SSB of a TRP, and/or via PUCCH spatial relation info which is associated with or QCLed to a CSI-RS/SSB/SRS. For the same signal/channel, the SSB/TRS that it is associated with or QCLed to, directly or indirectly via a pathloss RS and/or spatial relation info and/or SRI, may be unique. If it is associated with SSB1 using one set of QCL/association, and associated with SSB2 using another set of QCL/association, the UE expects that SSB1 and SSB2 are the same or QCLed with each other. Each set of PUCCH power control parameters may be assigned with an ID (which is not available as of the latest standards), and the ID is associated with a PUCCH resource or resource set. The power control parameters associated with one ID can include TRP-specific open-loop parameters such as Po, closed-loop parameters such as two closed-loop supported or not, TPC command configuration, spatial relation info and/or pathloss RS, etc. This implies that the UE's capability and maximum numbers of certain parameters may be increased. For example, with one TRP, the UE may support two closed-loop power control, but with two TRPs, the UE may need to support four closed-loop power control. The TPC field in existing DCI formats 1_1/1_2 should also be doubled, which is a flexible and clean solution than the alternatives. For example, the option of one TPC field with one TPC value applied to both PUCCH beams lacks the flexibility needed when the channels to the two TRPs are not highly correlated. An option is a joint design of the TPC field to include two decoupled TPC values, but due to the decoupling, no signaling overhead reduction can be achieved with this design. Thus, we support that a second TPC field is added in DCI formats 1_1/1_2. Furthermore, for GC DCI format 2_2, the same enhancement can be done to support a second TPC field for PUCCH and also extend to PUSCH. Regarding the closedLoopIndex, in the S-TRP case, the closedLoopIndex may be i0 or i1. Then in the M-TRP case, the closedLoopIndex may be i0, i1, i2, or i3 if all the closed-loops are numbered jointly, or may still be i0 or i1 for each TRP if each TRP has its own configuration/indication field. The latter seems to be a more reasonable design. Hence, when the "closedLoopIndex" values associated with the two PUCCH spatial relation info's are for different closed-loops", two TPC fields should be used.

In current standards, the PUCCH GC DCI format 2_2 is configured as follows:

```
PUCCH-TPC-CommandConfig ::=    SEQUENCE {
   tpc-IndexPCell              INTEGER (1..15)  OPTIONAL, -- Cond
                                                PDCCH-OfSpcell
   tpc-IndexPUCCH-SCell        INTEGER (1..15)  OPTIONAL, -- Cond
PDCCH-ofSpCellOrPUCCH-Scell
   ...
}
```

If M-TRP PUCCH is to be supported, the GC DCI has to differentiate which TRP a TPC command is to be applied. However, a TRP is implicit in the standards, so a potential association to a TRP via the TCI state index or CORESET- PoolIndex may be used. A few embodiments are possible. One is to duplicate the existing field with the index added, i.e., two fields in RRC configuration, Another is to keep one field in RRC configuration, but add more elements with the indexes.

Embodiment 1

```
PUCCH-TPC-CommandConfig ::=    SEQUENCE {
   tpc-IndexPCell              INTEGER (1..15)  OPTIONAL, -- Cond
                                                PDCCH-OfSpcell
   tpc-IndexPUCCH-SCell        INTEGER (1..15)  OPTIONAL, -- Cond
PDCCH-ofSpCellOrPUCCH-Scell
   CORESETPoolIndex            INTEGER (0..1)   OPTIONAL, -- Cond
                                                M-TRP
   ...
}
```

Embodiment 2

```
PUCCH-TPC-CommandConfig ::=    SEQUENCE {
   tpc-IndexPCell          INTEGER (1..15)   OPTIONAL, -- Cond PDCCH-OfSpcell
   tpc-IndexPUCCH-SCell    INTEGER (1..15)   OPTIONAL, -- Cond PDCCH-ofSpCellOrPUCCH-Scell
   tpc-IndexPCellTCI0      INTEGER (1..15)   OPTIONAL, -- Cond PDCCH-OfSpcell, M-TRP
   tpc-IndexPUCCH-SCell0   INTEGER (1..15)   OPTIONAL, -- Cond PDCCH-ofSpCellOrPUCCH-Scell, M-
TRP
   tpc-IndexPCellTCI1      INTEGER (1..15)   OPTIONAL, -- Cond PDCCH-OfSpcell, M-TRP
   tpc-IndexPUCCH-SCell1   INTEGER (1..15)   OPTIONAL, -- Cond PDCCH-ofSpCellOrPUCCH-Scell, M-
TRP ...
}
```

US 12,701,524 B2 n another embodiment for M-TRP PUCCH repetition configuration/indication, a Rel-15 like framework is reused and extended to all PUCCH formats.

Regarding the configuration/indication of the number of PUCCH repetitions, in existing standards, the following is supported: For PUCCH formats 1, 3, or 4, a UE can be configured a number of slots, $$N_{PUCCH}^{repeat},$$

for repetitions of a PUCCH transmission by respective nrofSlots.

This framework seems to be general enough and can be readily extended to Rel-17. Therefore, Alt.1: Using a Rel-15 similar framework, should work well. This can also be extended to support intra-slot repetition. The other alternative of dynamic indication of the number of PUCCH repetitions can also work, but it requires more DCI overhead, and it may not be well aligned with the general thinking that most parameters of PUCCH are pre-configured (except for PUCCH resource ID in data scheduling and TPC commands). For periodic PUCCH transmissions, there may not be any DCI except for the TPC command information. In an embodiment, the GC DCI for PUCCH may be enhanced to include repetition information. Note that the DCI may also need to indicate information such as whether the transmissions to both TRPs are to be performed or only to one of them (for TRP selection), which requires additional 2 bits in the DCI, and hence to add more bits in DCI for repetition indication may not be preferred.

In another embodiment, for M-TRP PUCCH repetition, Alt1 for both inter-slot repetition and intra-slot repetition/intra-slot beam hopping is supported.

The number of repetitions given by nrofSlots is 2, 4, or 8. For multi-TRP inter-slot repetition, the number of repetitions can reuse existing nrofSlots of 2, 4, or 8 slots, with 2 options: 1) nrofSlots is for either of the M-TRPs individually or 2) nrofSlots is for both of the M-TRPs jointly. So for each TRP, the numbers of repetitions include 1 (i.e., no repetition baseline), 2, and 4 based on Option 1), and 1 (i.e., no repetition baseline), 2, 4, and 8 based on Option 2). The only difference is to decide whether the UE should perform totally 16 transmissions or not in the M-TRP case. This requires a lot UE power and capability, but it can provide the network with more choices in extreme cases if needed.

For PUCCH inter-slot/intra-slot repetition, both can be supported. Intra-slot repetition allows the UCI to be received with minimum latency and can be useful for URLLC, and thanks to the multi-TRP diversity, the additional gain from time diversity offered by inter-slot repetition on top of intra-slot repetition may be quite small. The intra-slot beam hopping is naturally needed to support intra-slot transmissions toward different TRPs and should also be supported. Inter-slot repetition can also be supported, as it provides more flexibility (i.e., more OFDM symbols to use) for the UE to transmit the PUCCH in a TDM way.

In another embodiment for M-TRP PUSCH enhancement M-DCI based PUSCH transmission/repetition scheme(s) based on Rel-16 PUSCH repetition Type A and Type B is implemented.

Embodiments for M-TRP PUSCH enhancement are provided here. In an embodiment, TDM of M-TRP PUSCH is supported; PUSCH repetition in time domain (repeated for the same TRP) and spatial domain (repeated for multiple TRPs) can be supported. The repetition should be for same TB, but the same or different RVs may be used for the multiple PUSCHs. In an embodiment, single-DCI and multi-DCI to schedule PUSCH are supported, similar to single-DCI and multi-DCI to schedule PDSCH. In an embodiment, the network and UE distinguish URLLC-oriented PUSCH vs non-URLLC-oriented PUSCH, in terms the contents, format, repetition, collision handling, etc., an explicit bit may be used to signal the UE that a PUSCH is associated with higher priority so other transmission is dropped when colliding with the PUSCH with higher priority. The PUSCH may carry URLLC UL data, URLLC related A/N feedback, and/or URLLC related CSI report.

Some further enhancement may be considered for PUSCH. S-DCI based PUSCH transmission/repetition scheme(s) based on Rel-16 PUSCH repetition Type A and Type B are to be supported. An M-DCI approach can be applied to more deployment scenarios, such as when the TRPs are not connected with fast backhaul. In addition, M-DCI to schedule M-TRP PDSCH has already been standardized in Rel-16. For the scenarios where M-DCI is used for PDSCH scheduling, it is natural to schedule PUSCH with M-DCI, but unreasonable to restrict to use only S-DCI for PUSCH. Hence, M-DCI approach should be supported, and both Type A and Type B repetitions should be supported.

In another embodiment for M-TRP PUSCH enhancement, TDMed PUSCH repetition scheme(s) and selection scheme(s) to reduce UE transmission power consumption for both M-DCI and S-DCI based schemes are implemented.

PUSCH repetition schemes are considered to be supported in Rel-17. On the other hand, PUSCH selection schemes should also be considered. There are a few justifications for this. One is that the selection scheme can have performance very similar to repetition schemes if the path-loss difference between the TRPs is not very small. Additionally, selection scheme can help conserve UE power. Supporting both repetition scheme and selection scheme can provide the network and UE with more ability to optimize the operations. The repetition should be for same TB, but the same or different RVs may be considered.

Similarly to the PUCCH transmission discussion above, two separate sets of PUSCH configurations and transmission parameters should be the most versatile way. This includes two separate sets of power control parameters, each set associated with one TRP and including TRP-specific open-loop parameters, closed-loop parameters, and pathloss RS; two separate sets of SRI/TPMI parameters; and so on.

An issue worth mentioning is the UL TA issue. For UL TA, detailed analysis is as follows. Note that a TA offset is relative to a certain DL timing, such as DL OFDM symbol starting time (based on the strongest path, or first path, or up to UE implementation) or the like, and the DL timing is referred to as the UL TA reference timing. Under M-TRP, say TRP1 and TRP2, the UE may have several options to determine its UL timing. First, the UE may use only one TA offset, i.e., the TA offset is based on TRP1 and will be applied to transmissions to both TRP1 and TRP2. An alternative to this is that the UE may adopt TRP-specific TA offsets. Second, the UE may need to determine a UL TA reference timing, i.e., a TA offset will be applied on top of a reference time such as the DL received time/DL symbol starting time or the like. The UL TA reference timing may be based on one of the TRPs or be TRP-specific. The four options are listed below and illustrated in FIGS. 12A-D.

Option 1: Only 1 TA offset (based on TRP1), and only 1 UL TA reference timing (based on TRP1). See FIG. 12A.

Option 2: Only 1 TA offset (based on TRP1), and multiple UL TA reference timings (based on each TRP). See FIG. 12B.

Option 3: multiple TA offsets (based on each TRP), and 1 UL TA reference timing (based on TRP1). See FIG. 12C.

Option 4: multiple TA offsets (based on each TRP), and multiple UL TA reference timings (based on each TRP). See FIG. 12D.

The TRP receive timing offset can be computed for these options and under different TRP synchronization settings. Table 1 shows a few typical cases with some example values. Relative to TRP1's transmit timing and TRP1's propagation delay, there could be a few cases for TRP2's transmit timing and propagation delay, which are listed in the columns of TRP2-A, TRP2-B, and TRP2-C. The key observation is that, for options 1-3, there always exist some cases that a TRP will experience UL receive timing offset much longer (such as twice as long) than TRP timing synchronization difference or propagation delay difference. Even if in DL, the M-TRP signals can be fit into one CP length, this will not be the case for UL in general. Therefore, UL TA needs to adopt Option 4.

TABLE 1

| UL TA analysis for different TRP synchronization settings and different TA offset options | | | |
|---|---|---|---|
| | TRP1 | TRP2-A | TRP2-B | TRP2-C |
|---|---|---|---|---|
| TRP Tx timing (us) | T | T | T + p | T + p |
| Propagation delay (us) | t | t + d | t | t + d |
| UE Rx timing | T + t | T + t + d | T + t + p | T + t + d + p |
| Option 1: Only 1 TA offset (based on TRP1), and only 1 UL TA reference timing (based on TRP1) | | | | |
| TA offset (based on TRP1) | s | s | s | s |
| UL TA reference timing (based on TRP1) | T + t | T + t | T + t | T + t |
| UE Tx timing | T + t − s | T + t − s | T + t − s | T + t − s |
| TRP Rx timing | T + 2t − s | T + 2t − s | T + 2t − s | T + 2t − s |
| TRP Rx timing offset | 2t − s | 2t − s + d | 2t − s − p | 2t − s + d − p |
| TRP Rx timing offset eg1: s = 2t, d = 2us, p = 2us | 0 | 2 | −2 | 0 |
| TRP Rx timing offset eg2: s = 2t, d = 2us, p = −2us | 0 | 2 | 2 | 4 |
| Option 2: Only 1 TA offset (based on TRP1), and multiple UL TA reference timings (based on each TRP) | | | | |
| TA offset (based on TRP1) | s | s | s | s |
| UL TA reference timing (based on each TRP) | T + t | T + t + d | T + t + p | T + t + d + p |
| UE Tx timing | T + t − s | T + t + d − s | T + t + p − s | T + t + d + p − s |
| TRP Rx timing | T + 2t − s | T + 2t + 2d − s | T + 2t + p − s | T + 2t + 2d + p − s |
| TRP Rx timing offset | 2t − s | 2t − s + 2d | 2t − s | 2t − s + 2d |
| TRP Rx timing offset eg1: s = 2t, d = 2us, p = 2us | 0 | 4 | 0 | 4 |
| TRP Rx timing offset eg2: s = 2t, d = 2us, p = −2us | 0 | 4 | 0 | 4 |
| Option 3: multiple TA offsets (based on each TRP), and 1 UL TA reference timing (based on TRP1) | | | | |
| TA offset (based on each TRP) | 2t | 2t + 2d | 2t | 2t + 2d |
| UL TA reference timing (based on each TRP) | T + t | T + t | T + t | T + t |
| UE Tx timing | T − t | T − t − 2d | T − t | T − t − 2d |
| TRP Rx timing | T | T − d | T | T − d |
| TRP Rx timing offset | 0 | −d | −p | −d − p |
| TRP Rx timing offset eg1: d = 2us, p = 2us | 0 | −2 | −2 | −4 |
| TRP Rx timing offset eg2: d = 2us, p = −2us | 0 | −2 | 2 | 0 |
| Option 4: multiple TA offsets (based on each TRP), and multiple UL TA reference timings (based on each TRP) | | | | |
| TA offset (based on each TRP) | 2t | 2t + 2d | 2t | 2t + 2d |
| UL TA reference timing (based on each TRP) | T + t | T + t + d | T + t + p | T + t + d + p |
| UE Tx timing | T − t | T − t − d | T − t + p | T − t − d + p |
| TRP Rx timing | T | T | T + p | T + p |
| TRP Rx timing offset | 0 | 0 | 0 | 0 |

The key observation from the detailed analysis is that, for Options 1-3 with only one UL TA offset and/or only one UL TA reference timing, there always exist some cases that a TRP will experience UL receive timing offset much longer (such as twice as long) than the TRP timing synchronization difference or propagation delay difference. Thus, the UL timing issue is a much more severe issue than DL timing issue. Even if in DL, the M-TRP signals can be fit into one CP length, this will not be the case for UL in general. For example, if the DL timings at the UE side have a difference of 2 us, which may be within the CP length for 15 kHz SCS, the UL timing error seen at the TRP side may become 4 us, which is comparable to the CP length and can degrade the performance. UL TA needs to adopt Option 4, in which multiple TA offsets (i.e., TRP-specific TA offsets) are needed and multiple UL TA reference timings (i.e., TRP-specific reference timings to be used for the respective UL transmissions) are needed.

In another embodiment for M-TRP PUSCH enhancement, two separate sets of PUSCH configurations are implemented, including:

Two separate set of power control parameters, each set associated with one TRP and including TRP-specific open-loop parameters, closed-loop parameters, TPC command field, closed-loop indexes and closed-loop, and pathloss RS;

Two separate sets of SRI/TPMI parameters;

Two separate TRP-specific TA offsets, each associated with a set of PUSCH configurations and all other UL transmissions QCLed/associated with it, and the TA offset is relative to the associated TRP-specific DL reference timing (e.g., the associated DL symbol starting time).

In current standards, the PUSCH GC DCI format 2_2 is configured as follows:

```
PUSCH-TPC-CommandConfig ::=       SEQUENCE {
    tpc-Index          INTEGER (1..15)  OPTIONAL, -- Cond SUL
    tpc-IndexSUL       INTEGER (1..15)  OPTIONAL, -- Cond SUL-Only
    targetCell         ServCellIndex    OPTIONAL, -- Need S
    ...
}
```

If M-TRP PUSCH is to be supported, the GC DCI has to differentiate which TRP a TPC command is to be applied. However, a TRP is implicit in the standards, so a potential association to a TRP via the TCI state index or CORESETPoolIndex may be used. A few embodiments are possible. One is to duplicate the existing field with the index added, i.e., two fields in RRC configuration, and another is to keep one field in RRC configuration but add more elements with the indexes.

Embodiment 1

```
PUSCH-TPC-CommandConfig ::=       SEQUENCE {
    tpc-Index             INTEGER (1..15)   OPTIONAL, --
                                            CondSUL
    tpc-IndexSUL          INTEGER (1..15)   OPTIONAL, --
                                            Cond SUL-Only
```

```
    CORESETPoolIndex      INTEGER (0..1)    OPTIONAL, --
                                            Cond M-TRP
    targetCell            ServCellIndex     OPTIONAL, --
                                            Need S
    ...
}
```

Embodiment 2

```
PUSCH-TPC-CommandConfig ::=       SEQUENCE {
    tpc-Index        INTEGER (1..15)   OPTIONAL, -- CondSUL
    tpc-IndexSUL     INTEGER (1..15)   OPTIONAL, --
                                       Cond SUL-Only
    tpc-IndexTCI0    INTEGER (1..15)   OPTIONAL, -- Cond SUL,
                                       M-TRP
    tpc-IndexTCI1    INTEGER (1..15)   OPTIONAL, -- Cond SUL,
                                       M-TRP
    targetCell       ServCellIndex     OPTIONAL, -- Need S
    ...
}
```

In another embodiment to enable a PDCCH transmission with two TCI states, at least Alt 3 (Two SS sets associated with corresponding CORESETs) and Option 2 (repetition) are implemented.

Embodiments for M-TRP PDCCH enhancement are provided here. In an embodiment, PDCCH repetition in time domain (repeated by the same TRP) and spatial domain (repeated by multiple TRPs) are supported. For example, DCI 1 may be sent from TRP 1, and DCI 1 could be a S-DCI to schedule PUSCHs/PDSCHs jointly for TRPs 1 and 2, or one of the M-DCIs to schedule PUSCH/PDSCH only for TRP 1. DCI 1 may be repeated in a later OFDM symbol, sent by TRP 1, TRP 2, or even both. The PDCCH repetition can be useful for higher reliability. However, one issue needs to be resolved. When the UE receives multiple PDCCH transmissions, each schedules a PDSCH (or a PUSCH), the UE may not understand that these PDCCH transmissions are actually the repetition and they should lead to only one PDSCH (or only one PUSCH). The UE may incorrectly assume it is scheduled for two PDSCH transmissions (or two PUSCH transmissions) at the same time and decide to drop one or both of the transmissions. This is an example showing that PDCCH repetitions have to be explicitly signaled to the UE, otherwise UE assumptions should be standardized so that the UE assumes PDCCH repetition based on identical resource allocation in the multiple DCIs. The explicit signaling may be a field in the DCI as a flag, and DCIs with the same flag are assumed to schedule the same PDSCH or PUSCH. Embodiments also include cross-TRP (TRP1 DCI to schedule TRP2 PDSCH/PUSCH or vice versa) scheduling, joint DCI (S-DCI to schedule for both TRPs) sent from either TRP, or joint transmission of the same DCI (for one or separate PDSCH/PUSCH transmissions in one or both TRPs). To support these enhancements, the QCL/TCI states and CORESET pool indexes should be enhanced to ensure that the transmissions are correctly associated with the intended TRP(s).

For a PDCCH transmission with two TCI states, there can be the following alternatives Alt 1: One CORESET with two active TCI states Alt 2: One SS set associated with two different CORESETs Alt 3: Two SS sets associated with corresponding CORESETs For Alt 1 (one CORESET with two active TCI states), there could further be:

Alt 1-1: One PDCCH candidate (in a given SS set) is associated with both TCI states of the CORESET.

Alt 1-2: Two sets of PDCCH candidates (in a given SS set) are associated with the two TCI states of the CORESET, respectively Alt 1-3: Two sets of PDCCH candidates are associated with two corresponding SS sets, where both SS sets are associated with the CORESET and each SS set is associated with only one TCI state of the CORESET.

For non-SFN based metro PDCCH reliability enhancements, there could be the following options:

Option 1 (no repetition): One encoding/rate matching for a PDCCH with two TCI states.

Option 2 (repetition): Encoding/rate matching is based on one repetition, and the same coded bits are repeated for the other repetition. Each repetition has the same number of CCEs and coded bits, and corresponds to the same DCI payload. This could be intra-slot repetition and inter-slot repetition.

Option 3 (multi-chance): Separate DCIs that schedule the same PDSCH/PUSCH/RS/TB/etc. or result in the same outcome. The DCIs could be in the same slot and DCIs in different slots.

Combined schemes are identified and summarized below:

SFN schemes: Alt1-1, 1 CORESET, each PDCCH candidate in the CORESET may be for both TRP1 and TRP2 simultaneously, i.e., each PDCCH candidate in the CORESET may be associated with two TCI states at the same time.

Non-SFN schemes: see below table.

TABLE 2

| | List of combined non-SFN schemes | | |
|---|---|---|---|
| | Option 1: No repetition: a PDCCH with two TCI states | Option 2: Repetition: identical coded bits & #CCEs from 2 TRPs | Option 3: Multi-chance: different coded bits, e.g., new coding design, different #CCEs from 2 TRPs, with a different scrambling sequence, etc. |
| Alt1-1, 1 CORESET, each candidate for both TRP1 and TRP2 simultaneously | 1 CORESET, TRP1 and TRP2 jointly transmit 1 PDCCH on a PDCCH candidate. Seems to be SDM (deprioritize for evaluation and study due to complexity concerns) | 1 CORESET, TRP1 transmits PDCCH1 on a candidate, TRP2 transmits PDCCH2 (same bits) on the same candidate. Seems to be SDM (deprioritize for evaluation and study due to complexity concerns) | 1 CORESET, TRP1 transmits PDCCH1 in on a candidate, TRP2 transmits PDCCH2 (different coded bits) on the same candidate. Seems to be SDM (deprioritize for evaluation and study due to complexity concerns) |
| Alt1-2, 1 CORESET, half candidates for TRP1, half for TRP2 | N/A | 1 CORESET, $1^{st}$ half candidates for TRP1, $2^{nd}$ half for TRP2, and PDCCH1 in $1^{st}$ half, PDCCH2 (same bits) in $2^{nd}$ half. TDM/FDM | 1 CORESET, $1^{st}$ half candidates for TRP1, $2^{nd}$ half for TRP2, and PDCCH1 in $1^{st}$ half, PDCCH2 (different coded bits) in $2^{nd}$ half. TDM/FDM |
| Alt1-3, 1 CORESET and 2 SS sets, SS set 1 for TRP1, SS set 2 for TRP2 | N/A | 1 CORESET and 2 SS sets, SS set 1 for TRP1, SS set 2 for TRP2, and PDCCH1 in SS set 1, PDCCH2 (same bits) in SS set 2. TDM/FDM | 1 CORESET and 2 SS sets, SS set 1 for TRP1, SS set 2 for TRP2, and PDCCH1 in SS set 1, PDCCH2 (different coded bits) in SS set 2. TDM/FDM |
| Alt2, 2 CORESETs and 1 SS set, CORESET1 for TRP1, CORESET2 for TRP2 | N/A | 2 CORESETs and 1 SS set, CORESET1 for TRP1, CORESET2 for TRP2, and PDCCH1 in CORESET1, PDCCH2 (same bits) in CORESET2. TDM/FDM | 2 CORESETs and 1 SS set, CORESET1 forTRP1, CORESET2 for TRP2, and PDCCH1 in CORESET1, PDCCH2 (different coded bits) in CORESET2. TDM/FDM |
| Alt3, 2 CORESETs and 2 SS set2, CORESET1 & SS set1 for TRP1, CORESET2 & SS set 2 for TRP2 | N/A | 2 CORESETs and 2 SS set2, CORESET1 & SS set1 for TRP1, CORESET2 & SS set 2 for TRP2, and PDCCH1 in CORESET1 & SS set1, PDCCH2 (same bits) in CORESET2 & SS set 2. TDM/FDM | 2 CORESETs and 2 SS set2, CORESET1 & SS set1 for TRP1, CORESET2 & SS set 2 for TRP2, and PDCCH1 in CORESET1 & SS set1, PDCCH2 (different coded bits) in CORESET2 & SS set 2. TDM/FDM |

US 12,701,524 B2

43                                                    44

As we can see, some combinations are not meaningful (such as SDM with multiple layers) and can be removed or deprioritized, unless further clarifications/justifications are provided. Moreover, Alt1-2/1-3/2/3 are similar to each other in terms of how they operate, and they may lead to the same performance if they can be configured to use the same resources. This means that RAN1 may not need to simulate all these combinations due to their performance similarity, but what fundamentally distinguishes them is their configuration complexity and flexibility. Therefore, to downselect from Alt1-2/1-3/2/3, the key is to analyze their configuration complexity and flexibility.

An initial analysis of 1 CORESET versus 2 CORESETs is given below. Whether Alt1-2/1-3/2/3 can achieve the same configured resources depends on how CORESET can be configured. CORESET configuration is quite flexible in frequency domain by a bitmap (each bit for 6 RBs) while not so in time domain (contiguous 1 to 3 symbols). Therefore, Alt2/3 offers more flexibility on time domain resource. In addition, for the case of FR2, PDCCH candidates/SSs for different TRPs on the same symbol (such as FDM) may not be feasible. Though it may be possible to separate candidates/SSs within 1 CORESET to be on different symbols, it will be not possible for some cases (e.g. 1 symbol duration) and difficult for other cases (e.g., 3 symbol duration), and not compatible with the CCE to REG mapping which is time domain first then frequency domain. Therefore, Alt1-2/1-3 are less preferred than Alt2/3. The general observation is similar to those in PUCCH/PUSCH, i.e., it is more natural and flexible to configure two separate sets of parameters/procedures for the two TRPs. This general observation applies to SS sets in a similar way, and thus, Alt 1-2/2 are less preferred than Alt1-3/3.

Regarding Options 1, 2, and 3, Option 1 does not combine with Alt1-1/1-2/1-3/2/3. If Option 1 is meant to be a selection scheme, then an alternative of one PDCCH candidate is associated with either TCI state (but not both) should be provided, which does not match agreed alternatives. This could be considered as Alt1-4: One PDCCH candidate (in a given SS set) is associated with either TCI state of the CORESET. For PDCCH repetition and multi-chance transmissions, the repetition option should be supported. The multi-chance option seems to be not very clear. When two DCIs result in the same outcome, their source bits should be the same, but it is unclear how they can end up with different coded bits if the same DCI format is used. It does not seem justified to provide a different DCI format or a different coding/interleaving/scrambling scheme just for the multi-chance option. Therefore, at least Alt 3 with Option 2 is most relevant.

Alt3 may require to increase the number of CORESETs supported by UE on the PCell, since the PCell needs to maintain CORESET0 and BFR CORESET, and thus the PCell is left with one additional CORESET. However, the CORESET0 may also be utilized in M-TRP PDCCH transmission. In addition, SCells do not have this issue. Regardless of PCell or SCell, a unified approach would be to increase the number of CORESETs to up to 5. This might slightly increase signaling overhead and complexity, but it is a much cleaner solution than others with significant changes of the standards. In addition, the most crucial factor for complexity/capability here is not the number of CORESETs but the number of BDs; as long as the number of BDs is within a limit, up to 5 CORESETs would not cause any complexity/capability issue.

In another embodiment for M-TRP PDCCH reliability enhancements, at least TDM and/or FDM for FR1 and TDM for FR2 is implemented. Each symbol may only be associated with one TCI, one CORESET, and one SS set.

As for TDM/FDM/SFN for PDCCH, FDM/SFN require two panels to receive PDCCH at the same time for FR2, which adds extra complexity to the UE blind detection/blind decoding and may not be desired. In addition, based on preliminary evaluations for FR1, SFN does not. TDM/FDM/SFN can be considered. TDM/FDM/SFN can provide much gain compared to TDM/FDM performance gains over single-TRP PDCCH scheme. In addition, if the timings signals from the TRPs are not well aligned and arrive at the UE at different times, it may be beneficial for the UE to adopt two FFT windows for best performance, in which one FFT window is associated with one TRP/QCL/TCI state. Thus, we have the following proposal:

In another embodiment for Alt 1-2/1-3/2/3, two (or more) PDCCH candidates are explicitly linked together (UE knows the linking before decoding) and a limited set of configured/activated links between the PDCCH candidates are implemented.

With respect to the linkage of the PDCCH candidates, we first point out that the linkage should be explicitly provided to the UE before decoding. Assume that the UE needs to combine (e.g., using chase combining) two PDCCH candidates to successfully decode the PDCCH, that is, either PDCCH candidate does not have sufficient SINR to be decoded alone. Without a known linkage, the UE has to try to combine any candidate from the first TRP with any candidate from the second TRP. If there are n candidates for either TRP, this leads to n2 combinations that the UE has to try, which is practically feasible only if n is small. However, limiting n to be a small number can degrade the performance. Hence, explicit linkage only should be considered. For the same reason, a PDCCH candidate should be explicitly linked to only a small number (say, 4) of the other PDCCH candidates. The explicit linkage should be configured or activated before the UE can attempt the decoding. Examples of the fixed rules may include, e.g., linkage based on the same PDCCH candidate index, based on the same start CCE, based on configuration, etc. However, linkage based on the same PDCCH candidate index or based on the same start CCE has certain restrictions. For instance, they only allow a one-to-one and non-adaptable mapping between the PDCCH candidates, which limits the network's capability of allocating the PDCCH candidates in a more flexible way. The most flexible one is based on RRC configuration, which can be used to configure one-to-one linkage, one-to-multiple linkage, or multiple-to-multiple linkage, and the linkage can be adapted/modified whenever needed. If further flexibility is needed, MAC activation signaling can also be used. In one embodiment, PDCCH candidate 1 may be transmitted with starting CCE n1, starting CCE n2, . . . , starting CCE nk, and PDCCH candidate 2 may be transmitted with starting CCE m1, starting CCE m2, . . . , starting CCE mk. Each of the starting CCEs n1~nk is configured to be associated with one or more (up to p, where p<k) starting CCEs for PDCCH candidate 2. Each of the starting CCEs m1-mk is configured to be associated with one or more (up to p, where p<k) starting CCEs for PDCCH candidate 1. Then the UE BD may take PDCCH candidate 1 and candidate 2 as the linked/repeated for the same DCI only if their starting CCEs are associated as configured. The total number of the linkages configured/activated for a UE on a serving cell should be limited by a maximum number based on UE capability or standard specification.

Regarding the BD count for Option 2+Case 1 with up to two PDCCH candidates, we first clarify a few transmission schemes. With potentially selection diversity and soft combining for non-SFN PDCCH transmissions, the schemes for Option 2+Case 1 include, with the example of AL4:

i) M-TRPs transmissions of AL4+AL4, which further include:

i1) UE soft combining scheme: UE decodes using AL4+AL4, and i2) UE selection scheme: UE decodes with one AL4 selected by the UE;

ii) Dynamic network selection scheme: one TRP transmits AL4, and UE decodes with the AL4.

Therefore, within the framework of Option 2+Case 1, M-TRP/S-TRP dynamic switching and UE/network selection scheme dynamic switching can be supported. UE/network selection and soft combining can be supported by Option 2+Case 1. Other options/cases are not needed. Note that S-TRP transmission may be seen as a special case of network selection.

For Option 2 network selection, a restriction of same AL, same DCI payload, same coded bits do not apply. However, for Option 2 UE selection, a restriction of same AL, same DCI payload, same coded bits are needed, since Option 2 UE selection is UE implementation and transparent to the gNB. Therefore, the gNB still needs to maintain the transmission scheme intended for Option 2, i.e., if both PDCCH candidates are present, they should still have the same AL/DCI payload.

Analysis of the four assumptions follows:

1. Assumption 1: UE only decodes the combined candidate without decoding individual PDCCH candidates
This works well for M-TRP transmissions, soft combining, and UE selection, but does not work for dynamic network selection, since if only one PDCCH candidate is transmitted, the combined candidate is generally not decodable.

2. Assumption 2: UE decodes individual PDCCH candidates
This works well for M-TRP transmissions, UE selection, and dynamic network selection, but cannot utilize the benefit of soft combining.

3. Assumption 3: UE decodes the first PDCCH candidate and the combined candidate This works well for M-TRP transmissions, soft combining, and UE selection, but does not work for dynamic network selection, since if only PDCCH candidate 2 is transmitted, decoding only PDCCH candidate 1 and the combined candidate will not be successful.

4. Assumption 4: UE decodes each PDCCH candidate individually, and also decodes the combined candidate
This works well for all schemes, but the complexity is the highest.

For the BD counts, we suggest to consider two types of bounds:

Worst case or upper bound BDs, which is Assumption 4 and may correspond to a non-optimized, exhaustive search based implementation. However, this could be the "safest" implementation under some cases. For example, if "dynamic network-selection" scheme is supported, i.e., in some transmissions, the network dynamic selects only one TRP for the PDCCH transmission, then the UE has to attempt on candidate 1, candidate 2, and the soft combining of them.

Best case, opportunistic, or lower bound BDs, relies on the UE to smartly and opportunistically choose one or two PDCCH candidates to decode (such as based on the SINR estimates on the DMRS). For example, if one seems to be blocked, the UE uses only the other to decode, otherwise both are used to decode. Then one BD is sufficient in most cases except for dynamic network selection.

For typical cases and typical implementations, the BD numbers may be in between, i.e., between 1 and 3. Moreover, as long as the dynamic network selection is separated from the other schemes (such as the network specifies to the UE whether the dynamic network selection is enabled), then the lower bound of 1 BD is typically possible with smart UE implementation, even though this UE implementation is unlikely to be standardized. The UE implementation can feel free to choose between a non-optimized approach, which relies on more BDs and an optimized approach with fewer BDs based on side information from SINR.

To summarize, if dynamic network selection is not enabled, then 1 BD per DCI is generally feasible and 2 BDs per DCI is an upper bound; if dynamic network selection is enabled, then 3 BDs per DCI is generally required. Whether the dynamic network selection is enabled or not can be based on network configuration via RRC signaling, network activation/deactivation via MAC signaling, and/or network indication via DCI.

For the BD count for Option 2+Case 1 with up to two PDCCH candidates, specify the lower bound as 1 BD per DCI and an upper bound as 3 BDs per DCI. Furthermore, if dynamic network selection is supported and the its status is signaled to the UE, when dynamic network selection is not enabled, the lower bound is 1 BD per DCI and an upper bound is 2 BDs per DCI; otherwise, 3 BDs per DCI is required. That is, the UE BD limits and capabilities may depend on the transmission schemes.

The DL operations under HST-SFN deployment scenario relies on Rel-16 memo multi-TRP based URLLC Scheme 1c with a single DCI. The agreement regarding Scheme 1c is as follows:

To facilitate further down-selection for one or more schemes in RAN1#96bis, schemes for multi-TRP based URLLC, scheduled by single DCI at least, are clarified as following:

Scheme 1 (SDM): n ($n <= N_s$) TCI states within the single slot, with overlapped time and frequency resource allocation § Scheme 1c:

One transmission occasion is one layer of the same TB with one DMRS port associated with multiple TCI state indices, or one layer of the same TB with multiple DMRS ports associated with multiple TCI state indices one by one.

Based on Scheme 1c, the Rel-17 HST-SFN may operate according to the following manner:

Network Configuration

Multiple TRPs are connected with ideal backhaul with the same cell ID to serve UEs on HST.

SSB Configuration

In principle, some TRPs may not need to transmit SSB and transmission of TRP-specific TRS may be sufficient for data transmissions, but since the distances between the TRPs are usually a few hundred meters, it may be desirable to have all TRPs transmit SSBs to cover the entire range. So generally, each TRP can transmit a SSB associated with the common cell ID. The SSB may be the same for some or all TRPs (i.e., SFN for SSB) or TRP-specific SSBs; however, as the SSBs are transmitted directionally along the HST directions, i.e., with different beams, generally the SSBs should be TRP-specific SSBs.

TRS Configuration

There may be two options for TRS pre-compensation for Doppler shifts:

Option 1 TRS design: no or little pre-compensation for Doppler shifts, with TRP-specific TRS For this option, the TRPs are synchronized, and they transmit in a synchronized fashion without pre-compensation for Doppler shifts. Then the UE sees different Doppler shifts for different TRSs, i.e., the TRS are TRP-specific. Based on the TRS, a UE can estimate TRP-specific Doppler shift. Note that different TRPs have significantly different Doppler shifts for HST.

Each TRP-specific TRS can be QCLed (Type A, and for FR2, also Type D) to the corresponding TRP-specific SSB.

Option 2 TRS design: with pre-compensation for Doppler shifts, and SFN for TRS from different TRPs For this option, the TRPs are synchronized, and they transmit in a synchronized fashion with sufficient pre-compensation for Doppler shifts. Then UE sees nearly the same Doppler shifts for different TRSs, and therefore the TRSs can form a SFN. Based on the TRS, a UE can estimate residual Doppler shift if needed.

The TRS can be QCLed to one or more of the SSBs.

PDSCH DMRS Configuration

Multiple TRPs transmit the same PDSCH (and possibly PDCCH) on the same time-frequency resources, forming a SFN essentially based on Scheme 1c.

Note that each TRP can transmit all layers (say L layers), i.e., all TRPs (say n TRPs) transmit all L layers of the same TB/codeword. This is a straightforward generalization of the one layer in Rel-16 Scheme 1c. Note also that the SFN is possible thanks to the ideal backhaul among the TRPs.

There are two options for the DMRS for PDSCH:

Option A: SFN DMRS port(s) for all TRPs

For this option, the UE receives L DMRS ports, and each DMRS port corresponds to a layer from all TRPs. Each DMRS port is formed by the SFN of all TRPs. The DMRS port needs to be simultaneously QCLed to the TRSs:

Option A-1: SFN DMRS port(s) QCLed to TRP-specific TRS

The SFN DMRS needs to be associated with multiple TCI state indices, each TCI state index specifies a QCL relation to the TRP-specific TRS of a TRP. QCL type A (Doppler shift, Doppler spread, average delay, delay spread) should be specified in the TCI state.

An example of the QCL configuration for the DMRS port(s) is:

TCI state 1: QCL A, TRS 1 (for TRP 1)
TCI state 2: QCL A, TRS 2 (for TRP 2)
. . . .
TCI state n: QCL A, TRS n (for TRP n)

Option A-2: SFN DMRS port(s) QCLed to SFN TRS
The SFN DMRS can be associated with one TCI state index, which specifies a QCL relation to the SFN TRS of TRPs. QCL type A (Doppler shift, Doppler spread, average delay, delay spread) should be specified in the TCI state.

An example of the QCL configuration for the DMRS port(s) is:

TCI state: QCL A, TRS (for all TRPs)

Option B: TRP-specific DMRS ports

For this option, the UE receives nxL DMRS ports. The nxL ports can form L sets, each set containing n ports associated with a same layer from the n TRPs. The nxL ports can also form n groups, each group containing L ports associated with a same TRP for the L layers (a group could be a CDM group). Likely the L ports for the same TRP can be a CDM group, but ports for different TRPs should be orthogonalized in time/frequency/sequence domain. This option works only with Option 1 TRS design with TRP-specific TRSs.

Note that though the WID does not list Option B as an example, it is not precluded.

An example of the QCL configuration for the DMRS ports is:

$1^{st}$ group of L DMRS ports: TCI state 1: QCL A, TRS 1 (for TRP 1)
$2^{nd}$ group of L DMRS ports: TCI state 2: QCL A, TRS 2 (for TRP 2)
. . . .
$n^{th}$ group of L DMRS ports: TCI state n: QCL A, TRS n (for TRP n).

From the above description, we can see that the following issues need to be addressed:

Supporting TRS/DMRS options, e.g., Option A (Option A-1 and Option A-2) and/or Option B. Option A has a lower DMRS overhead but the channel estimation on the DMRS with a composite channel from all TRPs may be more complicated and less accurate than Option B. Especially Option A-1 channel estimation may be challenging.

Specify UE behavior/assumption

For either option, the UE assumption and minimum UE behavior (if any) need to be specified. For example, for Option A, the UE needs to assume the channel on a DMRS port is a composite channel, a superposition of individual channels associated with the TRSs. For Option B, the UE needs to assume the channel for PDSCH is a composite channel, a superposition of individual channels associated with the corresponding n DMRS ports.

In order for the network to apply Doppler shift pre-compensation value for each TRP before transmitting the SFN PDSCH, the UE may need to transmit SRS to each TRP, and the SRS may be based on the Doppler shift the UE experiences for that TRP in DL. This may require the UL signal and DL signal to be associated, e.g., with respect to the Doppler shift and possibly spatial filtering (i.e., beams). This can be fit into the generic QCL framework, i.e., the UL/DL signals can be defined as QCLed. In addition, defining the UL/DL signal relation as QCL has a significant advantage, as the QCL/TCI information can be signaled to a UE in a dynamic fashion via DCI, which offers much higher flexibility in a dynamic network deployment scenario (such as a HST) than using RRC/MAC based signaling framework.

Scheme 1 with PDxCH, including

Sub-scheme 1a: Scheme 1 with PDCCH

For this sub-scheme, the TRSs are TRP-specific and separate, but the PDCCH DMRS forms SFN. Each PDCCH candidate and its DMRS are associated with two TCI states simultaneously. This is the Alt1-1

SFN scheme (1 CORESET and 2 simultaneous TCI states) under M-TRP non-PDSCH.

Sub-scheme 1b: Scheme 1 with PDSCH

For this sub-scheme, the TRSs are TRP-specific and separate, but the PDSCH DMRS forms SFN. Each PDSCH and its DMRS ports are associated with two TCI states simultaneously.

Scheme 2 with PDxCH, including

Sub-scheme 2a: Scheme 2 with PDCCH

For this sub-scheme, the TRSs are TRP-specific and separate, and the PDCCH DMRS ports are TRP-specific and separate, but the PDCCH forms SFN. For each PDCCH candidate, two sets of DMRS ports are configured, and each set of DMRS ports is associated with one of the two TCI states which links the set of DMRS ports to the associated TRP-specific TRS. To decode the PDCCH, the UE needs to utilize both sets of DMRS ports.

Sub-scheme 2b: Scheme 2 with PDSCH

For this sub-scheme, the TRSs are TRP-specific and separate, and the PDSCH DMRS ports are TRP-specific and separate, but the PDSCH forms SFN. For each PDSCH, two sets of DMRS ports are configured, and each set of DMRS ports is associated with one of the two TCI states which links the set of DMRS ports to the associated TRP-specific TRS. To decode the PDSCH, the UE needs to utilize both sets of DMRS ports.

The sub-schemes can be combined based on network/UE implementations. Though it is generally preferred to use the same scheme for both PDCCH and PDSCH, the standards may not need to mandate that. Thus, RAN1 can consider all four sub-schemes if no complexity issues are raised.

More SFN schemes may be possible. Consider a chain of QCL relations: PDxCH □ DMRS □ (QCL Type A) TRS □ (QCL Type C) SSB. Note that the DMRS may be QCLed to SSB directly without TRS. For PDxCH and its DMRS, a layer of the PDxCH may be seen as QCLed to its corresponding DMRS port with all QCL types (i.e., having the same properties).

There can be 4 different ways to form a SFN:

1. Standard transparent SFN: SFN formed at SSB and hence TRS/DMRS/PDxCH
2. TRS-SFN: SFN formed at TRS and hence DMRS/PDxCH (separate SSB)
3. Scheme 1: SFN formed at DMRS and hence PDxCH (separate SSB/TRS)
4. Scheme 2: SFN formed at PDxCH (separate SSB/TRS/DMRS)

For the last 3 SFN schemes, new UE behavior/assumption or enhanced QCL may be needed. For each PDxCH layer or a destination RS port, when it is QCLed to 2 source RS ports of the same type at the same time, the UE shall assume a composite channel for the PDxCH layer or a destination RS port and derive the composite channel properties from both source RS ports according to the specified QCL type(s).

With regard to Scheme 1 vs Scheme 2, Scheme 1 has a lower DMRS overhead but the channel estimation on the DMRS with a composite channel from all TRPs may be more complicated and less accurate than Scheme 2. The schemes can be used to achieve different tradeoffs, and hence may be preferred under different scenarios.

HST-SFN can be very effective in reducing handover and related overhead and help smooth the UE experience in HST. To potentially further enhance the UE experience and always benefit from at least 2 TRPs (rather than entering a temporary single-TRP operation mode when one of the TRPs is out of the coverage), it may be preferred by the network and UE to maintain connections with 3 TRPs or even more. To enable this, the UE may need to have a capability to support for maintaining n QCL/TCI states at the same time, where $n \geq 3$. On the other hand, it seems in general 2 QCL/TCI states are already sufficient for most scenarios. In any case, the UE capability for maintaining n QCL/TCI states at the same time needs to be reported to the network, and different UEs, n can take value 1, 2, 3, or even more. On the other hand, it seems in general 2 QCL/TCI states are already sufficient for most scenarios. In addition to UE capability, the standard impact might also be significant, as the new QCL type with 2 TRS sources is already quite complicated and an agreement is yet to be achieved. Embodiments for new QCL types with more than 2 TRS sources are provided below:

Scheme 1: QCL relationship between TRS and DMRS ports

Each TRP can transmit all layers (say L layers), i.e., all TRPs (say n TRPs, i.e., n is the number of QCL/TCI states configured/activated for the UE) transmit all L layers of the same TB/codeword. This is a straightforward generalization of the one layer in Rel-16 Scheme 1c. The UE receives L DMRS ports, and each DMRS port corresponds to a layer from all TRPs. In other words, each DMRS port is formed by the SFN of all TRPs. The DMRS port needs to be simultaneously QCLed to the TRSs. The SFN DMRS needs to be associated with multiple TCI state indices, each TCI state index specifies a QCL relation to the TRP-specific TRS of a TRP. QCL Type A (Doppler shift, Doppler spread, average delay, delay spread) can be specified in the TCI state. UE assumption and minimum UE behavior (if any) need to be specified. For example, the UE needs to assume the channel on a DMRS port is a composite channel, a superposition of individual channels associated with the TRSs. This may also be captured as a new QCL assumption to cover the case that each TRS may have significantly different doppler shifts.

An example of the QCL configuration for the DMRS port(s) is:

TCI state 1: QCL A (with possibly different doppler), TRS 1 (for TRP 1)

TCI state 2: QCL A (with possibly different doppler), TRS 2 (for TRP 2)

. . . .

TCI state n: QCL A (with possibly different doppler), TRS n (for TRP n).

Each MIMO layer of PDSCH is associated/QCLed to TRS 1 through TRS n simultaneously.

Scheme 2: Association of each MIMO layer of PDSCH to DM-RS antenna ports For this option, the UE receives nxL DMRS ports. The nxL ports can form L sets, each set containing n ports associated with a same layer from the n TRPs. The nxL ports can also form n groups, each group containing L ports associated with a same TRP for the L layers (a group could be a CDM group). Likely the L ports for the same TRP can be a CDM group, but ports for different TRPs should be orthogonalized in time/frequency/sequence domain. UE assumption and minimum UE behavior (if any) need to be specified. For example, the UE needs to assume the channel for PDSCH (or PDCCH) is a composite channel, a superposition of individual channels associated with the corresponding n DMRS ports. This may also be captured as a new QCL assumption.

An example of the QCL configuration for the DMRS ports is:

1st group of L DMRS ports: TCI state 1: QCL A, TRS 1 (for TRP 1)

2nd group of L DMRS ports: TCI state 2: QCL A, TRS 2 (for TRP 2)

. . . .

nth group of L DMRS ports: TCI state n: QCL A, TRS n (for TRP n).

The relation between the PDSCH (or PDCCH) and its DMRS ports may need to be redefined, which may be a new QCL type or a new UE assumption/behavior. Previously, a channel and its DMRS ports are always QCLed. With one PDSCH layer linked to more than one DMRS ports at the same time, the existing way may not apply. It is needed to introduce a relation of one PDSCH layer QCLed to several DMRS ports with respect to Doppler shift, Doppler spread, average delay, delay spread in the sense that the UE has to derive these properties from each DMRS port separately first and then combine them into a composite channel.

Scheme differentiation and indication

A HST-capable UE needs to operate under different environments, such as on a HST operating on a SFN scheme (Scheme 1 and/or Scheme 2), or off a HST operating on a single-TRP mode or multi-TRP mode. The schemes need to be differentiated and indicated to the UE to avoid ambiguity and errors. At least the following potential schemes should be differentiated:

Sub-scheme 1a: Scheme 1 with PDCCH

This requires proper CORESET configuration/activation and can be considered in M-TRP PDCCH enhancement [1].

Sub-scheme 1b: Scheme 1 with PDSCH

This can be configured to the UE via RRC configuration signaling, or activated for the UE via MAC CE, or by default to be the same as the PDCCH operation scheme (i.e., if the PDCCH is using Scheme 1, then the PDSCH shall also use Scheme 1), or relies on PDCCH indication with PDCCH decoding delay (according to the standardized application delay of the minimum PDSCH scheduling offset restriction). These different approaches have different levels of complexity and flexibility, and can be considered in RAN1.

To tell this scheme apart from other schemes in a signaling to UE, a PDSCH DMRS port is configured/activated to be associated with 2 TRSs at the same time, i.e., 2 TCI states. To distinguish Sub-scheme 1b from Sub-scheme 2b, note that Sub-scheme 1b is configured/activated with only one set of DMRS ports (e.g., one antenna port(s) field in DCI, and one group of antenna port(s) indicated by DCI or other signaling), and each ports is associated with 2 TCI states (e.g., two TCI fields in DCI, two TCI states in MAC, etc.), whereas Sub-scheme 2b is configured/activated with two sets of DMRS ports (e.g., two antenna port(s) fields in DCI or other signaling, or two groups of antenna port(s) indicated by DCI or other signaling), and each set is associated with only one TCI state (e.g., two TCI fields in DCI, two TCI states in MAC, etc.). That is, at least different DCI/MAC designs with different fields should be provided, or an operation type flag may be signaled in the DCI or MAC or RRC signaling. To distinguish Sub-scheme 1b from non-SFN M-TRP schemes, different DCI types may be used, or alternatively a new field for the number of streams/layers (or equivalently, the number of DMRS ports per PDSCH stream/layer) is added to the DCIs. The number of ports corresponds to the number of layers/streams (i.e., rank) of the transmission. For Sub-scheme 1b, the number of layers is equal to the number of ports in antenna port field 1 (or group 1) and also equal to the number of ports in antenna port field 2 (or group 2), but for non-SFN SDM schemes, the number of layers is equal to the sum of all the numbers of ports.

Sub-scheme 2a: Scheme 2 with PDCCH

To distinguish Sub-scheme 2a from Sub-scheme 1a, Sub-scheme 2a is configured/activated with each PDCCH DMRS port associated with only one of two TRSs, i.e., one QCL/TCI state, whereas Sub-scheme 1a is configured/activated with each PDCCH DMRS port associated with two TRSs, i.e., two QCL/TCI states.

Sub-scheme 2b: Scheme 2 with PDSCH How to distinguish this from other schemes is already covered above. In addition, as described before, the relation/QCL info between the PDSCH and its DMRS ports may be using a different assumption/QCL type, which may be used to distinguish this sub-scheme.

Non-scheme 1 and non-scheme 2

This may include Rel-16 non-SFN M-TRP schemes, single TRP schemes, and so on.

How to distinguish this from other schemes is already covered above.

To summarize, the PDSCH cases are listed below with different parameters:

| | # TRP(s) | # TRS(s) or SSB(s) | # TCI states/ QCL per TRS (1 TRS links to how many SSB) | # TCI states/QCL per DMRS port (1 DMRS port links to how many TRS/SSB) | # DMRS port(s) per PDSCH layer | # total DMRS port(s) | # PDSCH layer(s) | Interpretation |
|---|---|---|---|---|---|---|---|---|
| Case 1 | 1 | 1 | 1 | 1 | 1 | L | L | L layer S-TRP transmission |
| Case 2 | 2 | 1 | 2 (for TRS) or N/A (for SSB) | 1 | 1 | L | L | L layer SFN (SSB/TRS/DMRS/ PDSCH SFN) |
| Case 3 | 2 | 2 | 1 | 1 (TRS1 or 2) | 1 | (L1, L2), L1 = L2 * | L1 = L2 * | M-TRP FDM/TDM |

-continued

| | # TRP(s) | # TRS(s) or SSB(s) | # TCI states/ QCL per TRS (1 TRS links to how many SSB) | # TCI states/QCL per DMRS port (1 DMRS port links to how many TRS/SSB) | # DMRS port(s) per PDSCH layer | # total DMRS port(s) | # PDSCH layer(s) | Interpretation |
|---|---|---|---|---|---|---|---|---|
| Case 4 | 2 | 2 | 1 | 2 (TRS1 & 2) | 1 | L | L | M-TRP SFN Scheme 1 (DMRS/PDSCH SFN) |
| Case 5 | 2 | 2 | 1 | 1 (TRS1 or 2) | 2 ** | 2L ** | L | M-TRP SFN Scheme 2 (PDSCH SFN) |
| Case 6 | 2 | 2 | 1 | 1 (TRS1 or 2) | 1 | L1 or L2, not both * | L1 or L2 * | M-TRP gNB selection scheme |
| Case 7 | 2 | 2 | 1 | 1 (TRS1 or 2) | 1 | (L1, L2) * | L1 + L2 * | M-TRP SDM |

* L1: # of DMRS port(s) QCLed to TRS1 (or SSB1).
* L2: # of DMRS port(s) QCLed to TRS2 (or SSB2).
** 2 or 2L: half of it is QCLed to TRS1 and the other half TRS2.
Case 2 includes the standard-transparent SFN scheme and TRS-SFN scheme described above.

We can see that to differentiate the cases, the network may signal #DMRS port(s) per PDSCH layer or #PDSCH layer(s) or #TCI states per PDSCH layer to UE. The signaling of these parameters may be in RRC configuration signaling, MAC command, or DCI indication. Case 3 and Case 5 have many similarities, but in Case 3, it is associated with parameters such as FDMSchemeA, FDMSchemeB, TDMSchemeA, etc. Its PDSCH contains two identical PRB sets, a layer for each set is associated with only 1 DMRS port. In case 5, the PDSCH contains only one PRB set, and each layer is associated with 2 DMRS ports at the same time.

For PDCCH, according to the current standards, only 1 layer is expected by the UE, but one or two PDCCH (or two PDCCH candidates) may be possible. The PDCCH schemes are summarized below:

| | # TRP(s) | # TRS(s) or SSB(s) | # TCI states/ QCL per TRS (1 TRS links to how many SSB) | # TCI states/QCL per DMRS port (1 DMRS port links to how many TRS/SSB) | # DMRS port(s) per PDCCH | # total PDCCH | Interpretation |
|---|---|---|---|---|---|---|---|
| Case 1 | 1 | 1 | 1 | 1 | 1 | 1 | S-TRP transmission |
| Case 2 | 2 | 1 | 2 (for TRS) or N/A (for SSB) | 1 | 1 | 1 | SFN (SSB/TRS/ DMRS/PDCCH SFN) |
| Case 3 | 2 | 2 | 1 | 1 (TRS1 or 2) | 1 | 2 * | M-TRP FDM/TDM |
| Case 4 | 2 | 2 | 1 | 2 (TRS1 & 2) | 1 | 1 | M-TRP SFN Scheme 1 (DMRS/PDCCH SFN) |
| Case 5 | 2 | 2 | 1 | 1 (TRS1 or 2) | 2 | 1 | M-TRP SFN Scheme 2 (PDCCH SFN) |
| Case 6 | 2 | 2 | 1 | 1 (TRS1 or 2) | 1 | 1 | M-TRP gNB selection scheme |

* 2: one is QCLed to TRS1 and the other TRS2.
Case 2 includes the standard-transparent SFN scheme and TRS-SFN scheme described above.

We can see that to differentiate the cases, the network may signal #TCI states/QCL per DMRS port (1 DMRS port links to how many TRS/SSB) and #DMRS port(s) per PDCCH or #TCI states/QCL per PDCCH to UE. The signaling of these parameters may be in RRC configuration signaling or MAC command. In addition, the number of PDCCH(s) is also useful for the UE to determine the cases and may also be signaled to UE via RRC or MAC signaling. Alternatively, the number of PDCCH(s) for a transmission may be determined by the UE via blind detection. If the UE could only find one PDCCH in FDM/TDM scheme, then it is similar to UE selection scheme which is similar to gNB selection scheme.

As seen from above tables and analysis, the cases/schemes can be distinguished by parameters signaled to the UE. This is an implicit way to inform the UE. An explicit way may also be considered, such as for each of the cases/schemes, a scheme label parameter is standardized and signaled to UE in RRC, MAC, or DCI (for PDSCH schemes only).

When the same DMRS port(s) are associated with two TCI states containing TRS as source reference signal, embodiments of some variants are possible:

a. Variant A: One of the TCI state can be associated with {average delay, delay spread} and another TCI states can be associated with {average delay, delay spread, Doppler shift, Doppler spread} (i.e., QCL-TypeA).

b. Variant B: One of the TCI state can be associated with {average delay, delay spread} and another TCI state with {Doppler shift, Doppler spread} (i.e., QCL-TypeB).

c. Variant C: One of the TCI state can be associated with {delay spread} and another TCI states can be associated with {average delay, delay spread, Doppler shift, Doppler spread} (i.e., QCL-TypeA).

d. Variant E: Both TCI states can be associated with {average delay, delay spread, Doppler shift, Doppler spread} (i.e., QCL-TypeA).

Indication method to apply QCL, e.g., via new QCL-type, or reuse existing QCL-type while UE to ignore certain QCL properties. Each TCI state in the above variants may be additionally associated with {Spatial Rx parameter} (i.e., QCL-TypeD), for FR2. The variants are applicable to scheme 1 and/or TRP based pre-compensation as a reference for evaluation.

The SFN DMRS needs to be associated with multiple TCI state indices, each TCI state index specifies a QCL relation to one of the two TRSs. Based on our understanding, for DMRS SFN (or PDCCH/PDSCH/TRS SFN) formed by two TRPs, the Doppler shifts for the transmissions from the two TRPs should be sufficiently close. Thus UE assumption and minimum UE behavior (if any) need to be specified. For example, the UE needs to assume the channel on a DMRS port is a composite channel, a superposition of individual channels associated with the TRSs. This may also be captured as a new QCL assumption to cover the case that each TRS may have significantly different doppler shifts and doppler spreads.

Figure 13:
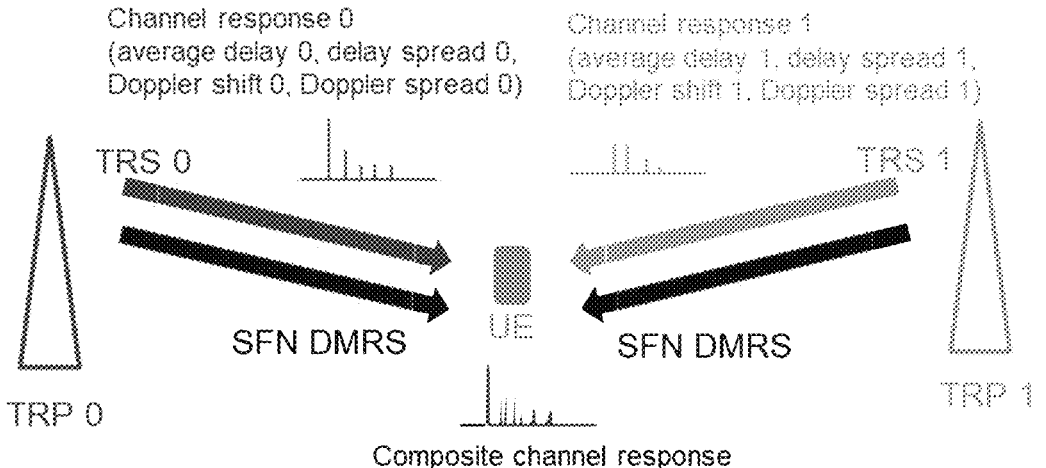
FIG. 13 illustrates an example of a QCL for Scheme 1 according to example embodiments presented herein.

See FIG. 13 illustrating the QCL for Scheme 1. As shown in FIG. 13, the TRPs transmit two TRSs to the UE, based which the UE can acquire the individual channel responses as follows:

a. TRS0: channel 0 which has cluster(s) 0 with average delay 0, delay spread 0, Doppler spread 0, and Doppler shift 0.

b. TRS1: channel 1 which has cluster(s) 1 with average delay 1, delay spread 1, Doppler spread 1, and Doppler shift 1.

The UE then needs to derive the properties for the SFN channel for the SFNed DMRS. In the composite channel, both the clusters (or taps/paths/multipath components) are present, and the SFNed DMRS experiences a composite channel with a superposition of average delay 0, delay spread 0, average delay 1, and delay spread 1.

Depending on the relation between the two TRSs and the two TRPs, there could be at least the following options:

Option 1 TRS design: no or little pre-compensation for TRS Doppler shifts, with TRP-specific TRS: TRP 0 transmits TRS 0, and TRP 1 transmits TRS 1.

For this option, the TRPs are synchronized, and they transmit in a synchronized fashion without pre-compensation for Doppler shifts. Then UE sees different average delays, delay spreads, Doppler spreads, and Doppler shifts for different TRSs, i.e., the TRS are TRP-specific. Based on the TRS, a UE can estimate TRP-specific average delays, delay spreads, Doppler spreads, and Doppler shifts. Note that different TRPs' TRSs have significantly different Doppler shifts for HST.

Each TRP-specific TRS can be QCLed (Type C, and for FR2, also Type D) to the corresponding TRP-specific SSB. This TRS corresponds to the first set of TRS in the agreement.

For the QCL of SFN DMRS to the TRSs:

Delay profile:

The average delay and delay spread of the DMRS have to come from the superposition from the two TRPs, i.e., from both TRSs.

Doppler profile:

The Doppler properties are different for the TRSs but need to be the same on the DMRS. The cases are:

The Doppler properties may be from TRS 0 if the network pre-compensates TRP 1 to match TRP 0, which can be supported by Variant A and requires network indication to QCL to TRS 0; OR The Doppler properties may be from TRS 1 if the network pre-compensates TRP 0 to match TRP 1, which can be supported by Variant A and requires network indication to QCL to TRS 1; OR The Doppler properties may be from both TRSs if the network pre-compensates both TRPs to the average of the TRPs' frequencies, which can be supported by Variant E and requires network indication to QCL to both TRSs.

Therefore, this option can be supported by Variant A or Variant E, exactly which depends on the network implementation and requires network indication. The corresponding UE behaviors are also different for these two variants.

Option 2 TRS design: with pre-compensation for TRS Doppler shift(s), and TRP-specific TRS: TRP 0 transmits TRS 0, and TRP 1 transmits TRS 1

For this option, the TRPs are synchronized, and they transmit in a synchronized fashion with sufficient pre-compensation for Doppler shift(s). The pre-compensation may be based on UE signals sent in the UL, and the network may adjust the frequency for one or both of the TRSs so that the UE will experience the same Doppler shift on TRS 0 and TRS 1. The TRSs may form a SFN if the network chooses to send the TRSs on the same REs, but the network can alternatively choose to send the TRSs on different REs, i.e., this is still Scheme 1.

The TRSs can be QCLed (Type C) to one or more of the SSBs. This TRS can be directly used by the UE in the $3^{rd}$ step in the agreement.

For the QCL of SFN DMRS to the TRSs:

Delay profile:

The channels for the TRSs have different average delays and delay spreads, so both TRSs have to be used for acquiring DMRS average delay and delay spread. That is, DMRS delay profile is from both TRSs.

Doppler profile:

The TRS channels and the DMRS channels have the same Doppler (due to pre-compensation). The cases are:

The Doppler properties may be from TRS 0, which can be supported by Variant A; OR The Doppler properties may be from TRS 1, which can be supported by Variant A; OR The Doppler properties may be from both TRSs, which can be supported by Variant E.

When both are used in Variant E, the accuracy may be improved from Variant A, though at the price of higher processing complexity than Variant A. Also for Variant A, there is no need for the network to indicate TRS 0 or TRS 1; it can be up to the UE implementation.

Therefore, this option can be supported by Variant A or Variant E. The corresponding UE behaviors are similar for these two variants as the Doppler properties are similar on TRS 0 and TRS 1. But the UE behavior for Variant E in Option 1 may be the same or different as the UE behavior for Variant E in Option 2: the former requires the UE to figure out the average but the latter does not.

Option 3 TRS design: with pre-compensation for Doppler shift on a portion of only one TRS: TRP 0 (without pre-compensation) and TRP 1 transmit TRS 0 (with pre-compensation), and TRP 1 transmits TRS 1 (without pre-compensation) For this option, the TRPs are synchronized, and they transmit in a synchronized fashion. TRS 0 is sent by both TRP 0 and TRP 1, without pre-compensation by TRP 0 but with sufficient pre-compensation for Doppler shift by TRP 1 so that TRS 0 forms a SFN by TRP 0 and TRP 1. TRS 1 is sent by TRP 1 without pre-compensation. In other words, after the network receives the UE UL signals, it adjusts TRP 1's frequency to align with TRP 0's frequency, and hence then UE sees one Doppler shift for TRS 0, and another Doppler shift for TRS 1.

The TRSs can be QCLed to one or more of the SSBs. TRS 0 can be directly used by the UE in the 3rd step in the agreement.

For the QCL of SFN DMRS to the TRSs:

Doppler profile:

The Doppler properties have to come from TRS 0 and this requires the network to indicate TRS 0.

Delay profile:

For average delay and delay spread of the DMRS, they are the same as those of TRS 0, but the cluster(s) of TRS 1 is also included in TRS 0, so the cases are:

The average delay and delay spread may be from TRS 0, which can be supported by legacy QCL Type A to TRS 0; OR The average delay and delay spread may be from the superposition of both TRSs, which can be supported by Variant A.

Therefore, this option can be supported by legacy QCL Type A or Variant A, though the use of Variant A is not strongly motivated.

Based on the analysis, at least one of Variant A and Variant E should be supported depending on the scenarios.

Figure 14:
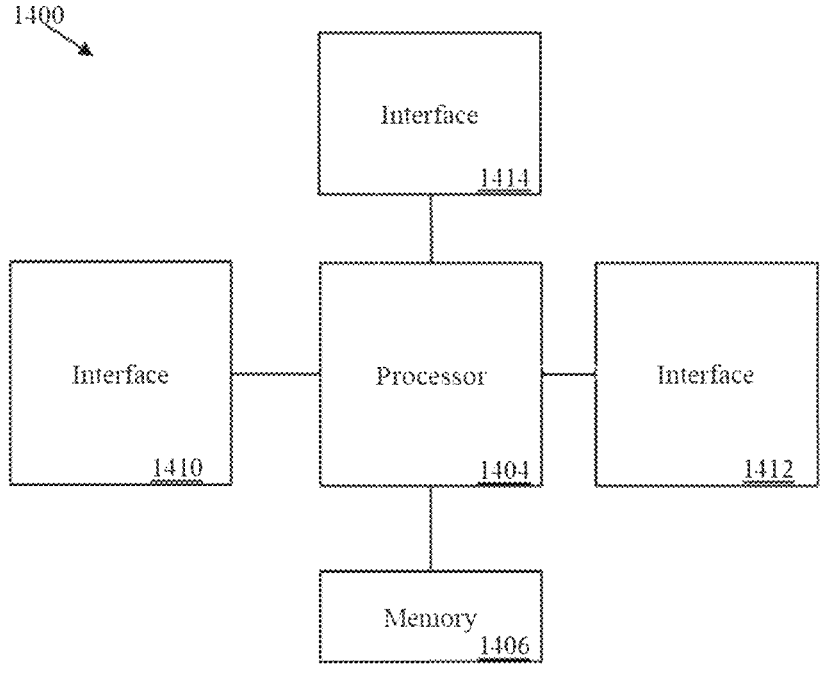
FIG. 14 illustrates a block diagram of an embodiment processing system.

Embodiments of the present disclosure may be implemented as computer-implemented methods. The embodiments may be performed by a processing system. FIG. 14 illustrates a block diagram of an embodiment processing system 1400 for performing methods described herein, which may be installed in a host device. As shown, the processing system 1400 includes a processor 1404, a memory 1406, and interfaces 1410-1414, which may (or may not) be arranged as shown in FIG. 14. The processor 1404 may be any component or collection of components adapted to perform computations and/or other processing related tasks, and the memory 1406 may be any component or collection of components adapted to store programming and/or instructions for execution by the processor 1404. In an embodiment, the memory 1406 includes a non-transitory computer readable medium. The interfaces 1410, 1412, 1414 may be any component or collection of components that allow the processing system 1400 to communicate with other devices/components and/or a user. For example, one or more of the interfaces 1410, 1412, 1414 may be adapted to communicate data, control, or management messages from the processor 1404 to applications installed on the host device and/or a remote device. As another example, one or more of the interfaces 1410, 1412, 1414 may be adapted to allow a user or user device (e.g., personal computer (PC), etc.) to interact/communicate with the processing system 1400. The processing system 1400 may include additional components not depicted in FIG. 14, such as long term storage (e.g., non-volatile memory, etc.).

In some embodiments, the processing system 1400 is included in a network device that is accessing, or part otherwise of, a telecommunications network. In one example, the processing system 1400 is in a network-side device in a wireless or wireline telecommunications network, such as a base station, a relay station, a scheduler, a controller, a gateway, a router, an applications server, or any other device in the telecommunications network. In other embodiments, the processing system 1400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 15:
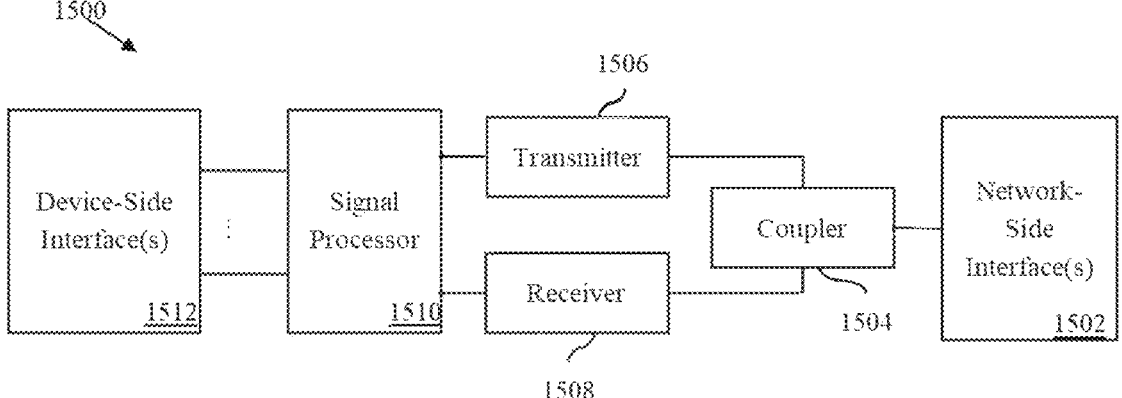
FIG. 15 illustrates a block diagram of an embodiment transceiver.

In some embodiments, one or more of the interfaces 1410, 1412, 1414 connects the processing system 1400 to a transceiver adapted to transmit and receive signaling over the telecommunications network. FIG. 15 illustrates a block diagram of a transceiver 1500 adapted to transmit and receive signaling over a telecommunications network. The transceiver 1500 may be installed in a host device. As shown, the transceiver 1500 comprises a network-side interface 1502, a coupler 1504, a transmitter 1506, a receiver 1508, a signal processor 1510, and a device-side interface 1512. The network-side interface 1502 may include any component or collection of components adapted to transmit or receive signaling over a wireless or wireline telecommunications network. The coupler 1504 may include any component or collection of components adapted to facilitate bi-directional communication over the network-side interface 1502. The transmitter 1506 may include any component or collection of components (e.g., up-converter, power amplifier, etc.) adapted to convert a baseband signal into a modulated carrier signal suitable for transmission over the network-side interface 1502. The receiver 1508 may include any component or collection of components (e.g., down-converter, low noise amplifier, etc.) adapted to convert a carrier signal received over the network-side interface 1502 into a baseband signal. The signal processor 1510 may include any component or collection of components adapted to convert a baseband signal into a data signal suitable for communication over the device-side interface(s) 1512, or vice-versa. The device-side interface(s) 1512 may include any component or collection of components adapted to communicate data-signals between the signal processor 1510 and components within the host device (e.g., the processing system 1400, local area network (LAN) ports, etc.).

The transceiver 1500 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1502 comprises one or more antenna/radiating elements. For example, the network-side interface 1502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:

receiving, by a user equipment (UE), first configuration information and second configuration information of a serving cell, the first configuration information indicating a first timing advance group (TAG) ID of the serving cell, the second configuration information indicating a second TAG ID of the serving cell;

transmitting, by the UE, a first uplink (UL) transmission at a first transmission start time on a UL bandwidth part (BWP) of the serving cell according to a first timing advance (TA) offset value of a first TAG identified by the first TAG ID and according to a first downlink (DL) reference signal (RS) timing, the first transmission start time equaling a first start time corresponding to the first DL RS timing minus a first time offset, the first time offset based on the first TA offset value; and transmitting, by the UE, a second UL transmission at a second transmission start time on the UL BWP of the serving cell according to a second TA offset value of a second TAG identified by the second TAG ID and according to a second DL RS timing, the second transmission start time equaling a second start time corresponding to the second DL RS timing minus a second time offset, the second time offset based on the second TA offset value.

2. The method of claim 1, wherein the first configuration information indicates a first association between the first UL transmission, a first DL RS received by the UE, and the first TAG ID, and wherein the second configuration information indicates a second association between the second UL transmission, a second DL RS received by the UE, and the second TAG ID.

3. The method of claim 1, wherein the first DL RS timing is a first time of a first path of a first DL RS received by the UE, and the second DL RS timing is a second time of a second path of a second DL RS received by the UE.

4. The method of claim 1, wherein a first DL RS for the first DL RS timing is a synchronization signal block (SSB) or is a channel state information RS (CSI-RS) quasi-co-located (QCLed) with the SSB transmitted on a carrier of the serving cell, and a first physical cell identity (PCI) of the SSB is the same as a PCI of the serving cell.

5. The method of claim 4, wherein a second DL RS for the second DL RS timing is an additional SSB configured for the serving cell or is an additional CSI-RS QCLed with the additional SSB configured for the serving cell, and the additional SSB is transmitted on the carrier of the serving cell.

6. The method of claim 5, wherein a second PCI of the additional SSB is different from a PCI of any serving cell configured for the UE on any carrier.

7. The method of claim 1, wherein a first DL RS for the first DL RS timing is associated with a first control resource set (CORESET) pool index, and a second DL RS for the second DL RS timing is associated with a second CORESET pool index.

8. The method of claim 1, wherein the first UL transmission is associated with a first DL RS for the first DL RS timing via a first transmission configuration indication (TCI) state, and wherein the second UL transmission is associated with a second DL RS for the second DL RS timing via a second TCI state.

9. The method of claim 8, further comprising:

receiving, by the UE, a first association message and a second association message, the first association message associating the first DL RS with the first TAG ID, the second association message associating the second DL RS with the second TAG ID.

10. The method of claim 9, the first association message including a first cell ID of the serving cell, the second association message including a second cell ID different from the first cell ID of the serving cell.

11. The method of claim 8, wherein the first TCI state and the second TCI state indicate at least one of a quasi-co-location (QCL) relationship and a pathloss RS relationship between a UL transmission and a DL RS.

12. The method of claim 1, wherein a difference between the first DL RS timing and the second DL RS timing is larger than a cyclic prefix (CP) length of the UL BWP.

13. The method of claim 1, wherein the first UL transmission and the second UL transmission are configured for the UL BWP.

14. The method of claim 1,
wherein a first DL RS for the first DL RS timing and a second DL RS for the second DL RS timing are configured for the UL BWP.

15. A user equipment (UE), comprising:
at least one processor; and
a non-transitory computer readable storage medium storing programming, the programming including instructions that, when executed by the at least one processor, cause the UE to perform operations including:
receiving first configuration information and second configuration information of a serving cell, the first configuration information indicating a first timing advance group (TAG) ID of the serving cell, the second configuration information indicating a second TAG ID of the serving cell;
transmitting a first uplink (UL) transmission at a first transmission start time on a UL bandwidth part (BWP) of the serving cell according to a first timing advance (TA) offset value of a first TAG identified by the first TAG ID and according to a first downlink (DL) reference signal (RS) timing, the first transmission start time equaling a first start time corresponding to the first DL RS timing minus a first time offset, the first time offset based on the first TA offset value; and
transmitting a second UL transmission at a second transmission start time on the UL BWP of the serving cell according to a second TA offset value of a second TAG identified by the second TAG ID and according to a second DL RS timing, the second transmission start time equaling a second start time corresponding to the second DL RS timing minus a second time offset, the second time offset based on the second TA offset value.

16. The UE of claim 15, wherein the first configuration information indicates a first association between the first UL transmission, a first DL RS received by the UE, and the first TAG ID, and wherein the second configuration information indicates a second association between the second UL transmission, a second DL RS received by the UE, and the second TAG ID.

17. The UE of claim 16, wherein the first DL RS timing is a first time of a first path of the first DL RS received by the UE, and the second DL RS timing is a second time of a second path of the second DL RS received by the UE.

18. The UE of claim 15, wherein a first DL RS for the first DL RS timing is a synchronization signal block (SSB) or is a channel state information RS (CSI-RS) quasi-co-located (QCLed) with the SSB transmitted on a carrier of the serving cell, and a first physical cell identity (PCI) of the SSB is the same as a PCI of the serving cell.

19. The UE of claim 18, wherein a second DL RS for the second DL RS timing is an additional SSB configured for the serving cell or is an additional CSI-RS QCLed with the additional SSB configured for the serving cell, and the additional SSB is transmitted on the carrier of the serving cell.

20. The UE of claim 19, wherein a second PCI of the additional SSB is different from a PCI of any serving cell configured for the UE on any carrier.

21. The UE of claim 15, wherein a first DL RS for the first DL RS timing is associated with a first control resource set (CORESET) pool index, and a second DL RS for the second DL RS timing is associated with a second CORESET pool index.

22. The UE of claim 15,
wherein the first UL transmission is associated with a first DL RS for the first DL RS timing via a first transmission configuration indication (TCI) state, and
wherein the second UL transmission is associated with a second DL RS for the second DL RS timing via a second TCI state.

23. The UE of claim 22, the operations further comprising:
receiving a first association message and a second association message,
the first association message associating the first DL RS with the first TAG ID,
the second association message associating the second DL RS with the second TAG ID.

24. The UE of claim 22,
wherein the first TCI state and the second TCI state indicate at least one of a quasi-co-location (QCL) relationship and a pathloss RS relationship between a UL transmission and a DL RS.

25. The UE of claim 15,
wherein a difference between the first DL RS timing and the second DL RS timing is larger than a cyclic prefix (CP) length of the UL BWP.

26. The UE of claim 15,
wherein the first UL transmission and the second UL transmission are configured for the UL BWP.

27. The UE of claim 15,
wherein a first DL RS for the first DL RS timing and a second DL RS for the second DL RS timing are configured for the UL BWP.

28. A non-transitory computer-readable medium having instructions stored thereon that, when executed by a user equipment (UE), cause the UE to perform operations, the operations comprising:
receiving first configuration information and second configuration information of a serving cell, the first configuration information indicating a first timing advance group (TAG) ID of the serving cell, the second configuration information indicating a second TAG ID of the serving cell;
transmitting a first uplink (UL) transmission at a first transmission start time on a UL bandwidth part (BWP) of the serving cell according to a first timing advance (TA) offset value of a first TAG identified by the first TAG ID and according to a first downlink (DL) reference signal (RS) timing, the first transmission start time equaling a first start time corresponding to the first DL RS timing minus a first time offset, the first time offset based on the first TA offset value; and
transmitting a second UL transmission at a second transmission start time on the UL BWP of the serving cell according to a second TA offset value of a second TAG identified by the second TAG ID and according to a second DL RS timing, the second transmission start time equaling a second start time corresponding to the second DL RS timing minus a second time offset, the second time offset based on the second TA offset value.

* * * * *